US007804759B2

(12) United States Patent
Murakami et al.

(10) Patent No.: US 7,804,759 B2
(45) Date of Patent: Sep. 28, 2010

(54) CONTACTLESS OPTICAL WRITING APPARATUS

(75) Inventors: Kazunori Murakami, Izunokuni (JP); Yoshimitsu Ohtaka, Suntou-gun (JP); Toshiyuki Tamura, Mishima (JP); Takayuki Hiyoshi, Suntou-gun (JP); Yasuhiko Mochida, Numazu (JP); Yuji Yasui, Izunokuni (JP)

(73) Assignee: Toshiba Tec Kabushiki Kaisha (JP)

( * ) Notice: Subject to any disclaimer, the term of this patent is extended or adjusted under 35 U.S.C. 154(b) by 485 days.

(21) Appl. No.: 11/986,856

(22) Filed: Nov. 27, 2007

(65) Prior Publication Data

US 2008/0123509 A1 May 29, 2008

(30) Foreign Application Priority Data

Nov. 27, 2006 (JP) ............................ 2006-319084
Feb. 22, 2007 (JP) ............................ 2007-042310
Oct. 18, 2007 (JP) ............................ 2007-271519

(51) Int. Cl.
*G11B 7/00* (2006.01)
*B41J 2/455* (2006.01)

(52) U.S. Cl. ........................ 369/121; 347/233; 347/232

(58) Field of Classification Search .................. 369/97, 369/121, 116, 112.21; 347/232, 233, 236, 347/238, 243; 359/204.1, 204.3
See application file for complete search history.

(56) References Cited

U.S. PATENT DOCUMENTS 5,410,335 A * 4/1995 Sawano et al. .............. 347/172
5,532,726 A * 7/1996 Goto et al. .................. 347/243
5,625,402 A * 4/1997 Sarraf ........................ 347/232
5,856,841 A * 1/1999 Shinohara et al. ........... 347/143
5,923,461 A 7/1999 Allen et al.
6,108,501 A * 8/2000 Nagai ......................... 347/233
6,191,803 B1 2/2001 Kamioka
7,034,973 B2 * 4/2006 Sakai ...................... 359/207.1
2003/0067796 A1 4/2003 Vanhooydonck
2006/0188825 A1 8/2006 Kang et al.

FOREIGN PATENT DOCUMENTS

JP 01078842 3/1989
JP 07-043671 2/1995
JP 07-186445 7/1995
JP 2561098 12/1996
JP 3266922 3/2002

* cited by examiner

*Primary Examiner*—Thang V Tran
(74) *Attorney, Agent, or Firm*—Harness, Dickey & Pierce, P.L.C.

(57) ABSTRACT

A single mode laser beam output from a single mode semiconductor laser and a multimode laser beam output from a multimode semiconductor laser are combined with each other by a polarization beam splitter, the combined laser beam is used by a deflection scanning mechanism to perform main scanning, and an image of the combined laser beam is formed on a surface of a thermal recording medium by a scanning lens.

14 Claims, 19 Drawing Sheets

CONTACTLESS OPTICAL WRITING APPARATUS

CROSS-REFERENCE TO RELATED APPLICATIONS

This application is based upon and claims the benefit of priority from prior Japanese Patent Applications No. 2006-319084, filed Nov. 27, 2006; No. 2007-042310, filed Feb. 22, 2007; and No. 2007-271519, filed Oct. 18, 2007, the entire contents of all of which are incorporated herein by reference.

BACKGROUND OF THE INVENTION

1. Field of the Invention

The present invention relates to a contactless optical writing apparatus for recording information on a rewritable thermal recording medium, the apparatus enabling recording and erasure of information in a contactless manner without direct contact with a heating device such as a thermal head.

2. Description of the Related Art

There is a thermal recording system in which a diazo compound-based heat-sensitive material is utilized. There are reversible thermal recording paper and the like that enable repeating of color development and color disappearance at a specific temperature. In the thermal recording paper, color development and color disappearance take place by heating by means of a heating device such as a thermal head. As a recording system for such thermal recording paper, there is a system in which a recording head such a thermal head is brought into direct contact with the thermal recording paper. In this system, the recording head is brought into direct contact with the thermal recording paper, and hence the following problems are brought about. For example, wear and stain of the recording head are easily caused. Further, the printing surface of the thermal recording paper is rubbed and stained. The service life of the recording head is shortened due to a short circuit caused by an accretion or excessive power supply or the like.

On the other hand, as a technique of information recording using thermal recording paper, there are techniques disclosed in, for example, Japanese Patent No. 3266922 and Japanese Patent No. 2561098. Japanese Patent No. 3266922 relates to a method of developing and disappearing a color in a contactless manner by using a reversible heat-sensitive material, and discloses an information recording medium in which an infrared absorbing layer that absorbs infrared rays to generate heat and a thermal recording layer are stacked in sequence on a substrate. Of these layers, the thermal recording layer is constituted of a heat-sensitive color development layer or a metallic thin film. The thermal recording layer develops or changes a color or is melted and removed by heat of the infrared absorbing layer. Further, Pat. Document 1 discloses a recording method in which an infrared absorbing layer is caused to generate heat by irradiation of infrared laser light, and a thermal recording layer develops or changes a color or is melted and removed by this heat.

Japanese Patent No. 2561098 relates to a laser beam recording apparatus for performing image recording on a heat mode recording material, which comprises first and second semiconductor lasers for emitting laser beam spreading in a direction perpendicular to a pn junction plane and having an elliptic cross-sectional shape, a deflection beam splitter for combining the laser beams emitted from the semiconductor lasers, and a scanning optical system for scanning by using the laser beam combined by the deflection beam splitter. In the laser beam recording apparatus disclosed in Japanese Patent No. 2561098, the laser beam emitted from the first semiconductor laser and the laser beam emitted from the second semiconductor laser are combined with each other, and the semiconductor lasers are arranged in such a manner that a center of the combined laser beam is shifted to one end side in a major axis direction of a cross-sectional shape of one of the laser beams. Further, Pat. Document 2 discloses that main scanning is performed by the scanning optical system in a state where the center of the combined laser beam is positioned on the rear side in the direction of movement in the major axis direction of the cross-sectional shape of one of the laser beams.

However, in Japanese Patent No. 3266922, a laser having a high power output is required as a light source for outputting infrared laser light. For this reason, in Japanese Patent No. 3266922, even when a semiconductor laser small in size and relatively low in price is used, it is a fact that the output is limited to several watts with this semiconductor laser, and a recording speed of the line-type thermal head class cannot be realized. There is a method in which for example, a YAG laser or the like having an output equal to or larger than several tens of watts is used. However, when a YAG laser or the like is used, the price is higher than the semiconductor laser, and the apparatus becomes larger.

In Japanese Patent No. 2561098, the shapes of the laser beams emitted from the first and second semiconductor lasers are elliptic on the recording surface of the heat mode recording material, and are perpendicular to each other in the major axis directions. For this reason, the power of one semiconductor laser having the major axis in the main scanning direction of the laser beam is used for heat recording. However, the power of the other semiconductor laser having the major axis in the sub-scanning direction is not effectively used for heat recording in a part other than a part in which the other semiconductor laser overlaps with the one semiconductor laser. Further, in Japanese Patent No. 2561098, the laser beams are combined with each other by the deflection beam splitter, and hence the number of laser beams to be combined is limited to two.

An object of the present invention is to provide a contactless optical writing apparatus which can resolve the problem of deficient power at the time of thermal recording on a thermal recording medium by effectively utilizing power of a laser beam and can realize enhancement of the recording speed.

BRIEF SUMMARY OF THE INVENTION

A contactless optical writing apparatus according to a main aspect of the present invention comprises: a first semiconductor laser for outputting a first semiconductor laser beam; a first condensing lens for condensing the first semiconductor laser beam; a second semiconductor laser for outputting a second semiconductor laser beam; a second condensing lens for condensing the second semiconductor laser beam; a laser beam combining element for combining the first semiconductor laser beam condensed by the first condensing lens and the second semiconductor laser beam condensed by the second condensing lens with each other, and outputting the combined semiconductor laser beam; and a deflection scanning mechanism for scanning a surface of a thermal recording medium which when heated to a color development temperature higher than the normal temperature, develops a color, and when heated to a color disappearance temperature lower than the color development temperature while the thermal recording medium is kept in a color development state at the normal temperature, disappears the color by using the combined semiconductor laser beam output from the laser beam combining element, wherein the first semiconductor laser has a junction plane of active layers for outputting the first semiconductor laser beam, the second semiconductor laser has a junction plane of active layers for outputting the second semiconductor laser beam, a junction plane direction of the first semiconductor laser and a junction plane direction of the second semiconductor laser are perpendicular to or parallel to a direction of the scanning performed by the deflection scanning mechanism by using the combined semiconductor laser beam, the first semiconductor laser beam has one of output power capable of heating the thermal recording medium to a temperature equal to or lower than the color disappearance temperature by irradiating the thermal recording medium therewith and output power capable of heating the thermal recording medium up to the color disappearance temperature, the second semiconductor laser beam has one of output power capable of heating the thermal recording medium up to the color disappearance temperature by irradiating the thermal recording medium therewith and output power capable of heating the thermal recording medium to a temperature equal to or lower than the color disappearance temperature, and the apparatus has output power capable of heating the thermal recording medium up to the color development temperature by combining the first semiconductor laser beam and the second semiconductor laser beam into a combined semiconductor laser beam and irradiating the thermal recording medium with the combined semiconductor laser beam.

DETAILED DESCRIPTION OF THE INVENTION

A first embodiment of the present invention will be described below with reference to the accompanying drawings.

Figure 1:
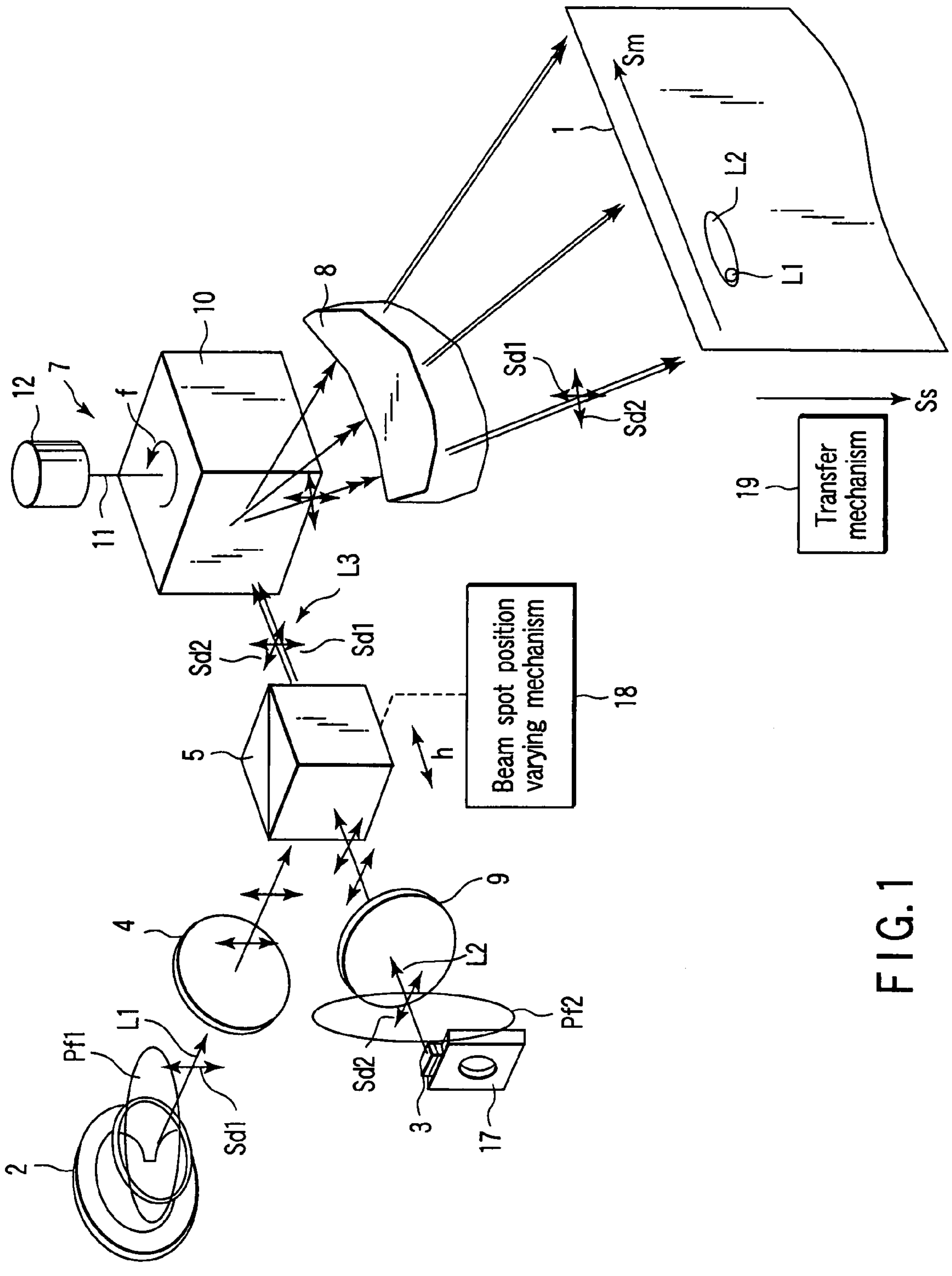
FIG. 1 is a configuration view showing a first embodiment of a contactless optical writing apparatus according to the present invention.

FIG. 1 shows a configuration view of a contactless optical writing apparatus. The contactless optical writing apparatus comprises a single mode semiconductor laser 2 and a multimode semiconductor laser 3 as light sources for emitting laser light with which a thermal recording medium 1 is irradiated. Each of the semiconductor laser 2 and 3 outputs a laser beam having a light emission wavelength in the near-infrared region, for example, a region from 750 nm to 1000 nm, and having high output power of about several watts. Each of the semiconductor lasers 2 and 3 has the same characteristics as those of semiconductor lasers (laser diodes: LDs) which are already used in, for example, a laser printer, laser pointer, DVD player, and the like in large numbers, i.e., a spread angle, output-current characteristic, and temperature characteristic. In each of the semiconductor lasers 2 and 3, an output of the laser beam is large. Hence, in each of the semiconductor lasers 2 and 3, an amount of a supplied current is large in the ampere class, and an amount of generated heat becomes large, thereby necessitating cooling. Accordingly, each of the semiconductor lasers 2 and 3 is fixed to a radiator plate, and the radiator plate is forcedly cooled.

A collimator lens 4, a polarization beam splitter 5 serving as a laser beam combining element, a deflection scanning mechanism 7, and a scanning lens 8 are provided between the single mode semiconductor laser 2 and the thermal recording medium 1 along a laser light irradiation optical path between the single mode semiconductor laser 2 and the thermal recording medium 1. A collimator lens 9, the polarization beam splitter 5, the deflection scanning mechanism 7, and the scanning lens 8 serving as an condensing lens are provided between the multimode semiconductor laser 3 and the thermal recording medium 1 along a laser light irradiation optical path between the multimode semiconductor laser 3 and the thermal recording medium 1.

The polarization beam splitter 5 reflects the single mode laser beam $L_1$ output from the single mode semiconductor laser 2, and transmits the multimode laser beam $L_2$ output from the multimode semiconductor laser 3.

The deflection scanning mechanism 7 includes a polygon mirror 10 serving as a deflecting member, and a rotary drive section 12. The polygon mirror 10 is coupled to the rotary drive section 12 through a rotating shaft 11. The rotary drive section 12 rotates the polygon mirror 10 through the rotating shaft 11 in one direction, for example, a direction indicated by an arrow f.

Figure 2:
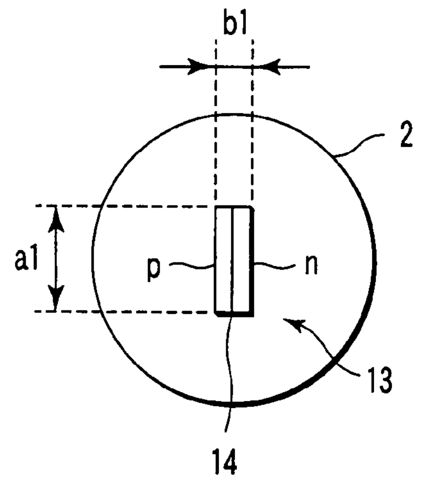
FIG. 2 is a configuration view of a single mode semiconductor laser in the contactless optical writing apparatus.

The single mode semiconductor laser 2 includes a laser emitting section 13 for outputting the single mode laser beam L1 as shown in FIG. 2. In the laser emitting section 13, a pn junction plane (junction plane of active layers) 14 is formed. In the single mode semiconductor laser 2, the junction plane direction of the pn junction plane 14 of the laser emitting section 13 is arranged parallel with the rotating shaft of the deflecting member of the deflection scanning mechanism 7, i.e., the rotating shaft of the polygon mirror 10.

The polarization direction $Sd_1$ of the single mode laser beam $L_1$ is the same as the junction plane direction of the pn junction plane 14. The polarization direction $Sd_1$ of the single mode laser beam $L_1$ is perpendicular to the polarization beam splitter 5. The single mode laser beam $L_1$ is of S-polarization with respect to the polarization beam splitter 5. Accordingly, the polarization beam splitter 5 reflects the single mode laser beam $L_1$ output from the single mode semiconductor laser 2.

The size of a light emitting region in the laser emitting section 13 of the single mode semiconductor laser 2 is, as shown in FIG. 2, about several μm in, for example, the junction plane direction $a_1$ of the pn junction plane 14 and in the direction $b_1$ perpendicular to the junction plane direction $a_1$. More specifically, as for the size of the light emitting region of the laser emitting section 13, $a_1$ in the junction plane direction is about 3 μm, and $b_1$ in the direction perpendicular to the junction plane direction is about 1 μm. The single mode laser beam $L_1$ emitted from the laser emitting section 13 spreads with a profile $Pf_1$ shown in FIG. 1 as it advances. The beam profile $Pf_1$ has a Gaussian distribution.

Figure 3:
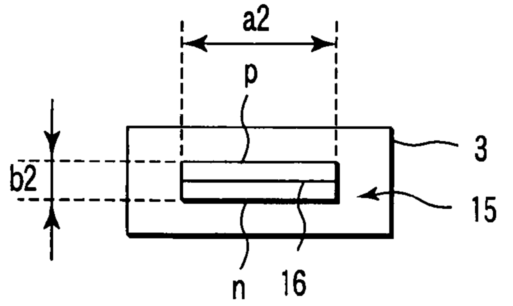
FIG. 3 is a configuration view of a multimode semiconductor laser in the contactless optical writing apparatus.

The multimode semiconductor laser 3 includes a laser emitting section 15 for outputting the multimode laser beam $L_2$ as shown in FIG. 3. A pn junction plane 16 is formed in the laser emitting section 15. The multimode semiconductor laser 3 is arranged in such a manner that the junction plane direction of the pn junction plane 16 in the light emitting region is perpendicular to the rotating shaft of the deflecting member of the deflection scanning mechanism, i.e., the rotating shaft 11 of the polygon mirror 10. In other words, the multimode semiconductor laser 3 is arranged perpendicular to the junction plane direction of the pn junction plane 14 in the light emitting region of the single mode semiconductor laser 2.

The polarization direction $Sd_2$ of the multimode laser beam $L_2$ is the same as the junction plane direction of the pn junction plane 16. The polarization direction $Sd_2$ of the multimode laser beam $L_2$ is perpendicular to the rotating shaft 11 of the polygon mirror 10. The polarization direction $Sd_2$ of the multimode laser beam $L_2$ output from the laser emitting section 15 is horizontal direction with the polarization beam splitter 5. The multimode laser beam $L_2$ is of p-polarization with respect to the polarization beam splitter 5. Accordingly, the polarization beam splitter 5 reflects the multimode laser beam $L_2$ output from the multimode semiconductor laser 3.

In the light emitting region in the laser emitting section 15 of the multimode semiconductor laser 3, as shown in FIG. 3, for example, $a_2$ in the junction plane direction of the pn junction plane (junction plane of active layers) and $b_2$ in the direction perpendicular to the junction plane direction $a_2$ are different from each other. More specifically, as for the size of the light emitting region of the laser emitting section 15, $a_2$ in the junction plane direction is about 50 to 200 μm, and $b_2$ in the direction perpendicular to the junction plane direction is about 1 μm. The multimode laser beam $L_2$ emitted from the laser emitting section 15 spreads with a profile $Pf_2$ shown in FIG. 1 as it advances. The beam profile $Pf_2$ has no fine Gaussian distribution. The multimode semiconductor laser 3 is provided on a mount 17.

The first collimator lens 4 is provided on the progression optical path of the single mode laser beam $L_1$ output from the single mode semiconductor laser 2. The first collimator lens 4 condense the single mode laser beam $L_1$ output from the single mode semiconductor laser 2 into a substantially parallel light flux.

The second collimator lens 9 is provided on the progression optical path of the multimode laser beam $L_2$ output from the multimode semiconductor laser 3. The second collimator lens 9 condense the multimode laser beam $L_2$ output from the multimode semiconductor laser 3 into a substantially parallel light flux.

The polarization beam splitter 5 is provided at an intersection position at which the progression optical path of the single mode laser beam $L_1$ output from the single mode semiconductor laser 2 and the progression optical path of the multimode laser beam $L_2$ output from the multimode semiconductor laser 3 intersect each other. The single mode laser beam $L_1$ output from the single mode semiconductor laser 2 and the multimode laser beam $L_2$ output from the multimode semiconductor laser 3 are incident on the polarization beam splitter 5. However, the polarization beam splitter 5 reflects the single mode laser beam $L_1$ output from the single mode semiconductor laser 2, further transmits the multimode laser beam $L_2$ output from the multimode semiconductor laser 3, and outputs a combined laser beam $L_3$ formed by combining the single mode laser beam $L_1$ and the multimode laser beam $L_2$ with each other.

The deflection scanning mechanism 7 scans, as the main scanning, the thermal recording medium 1 by using the combined laser beam $L_3$ output from the polarization beam splitter 5 by means of the rotation of the polygon mirror 10 in the direction indicated by the arrow f. The multimode semiconductor laser 3 is set to such a direction that the polarization direction $Sd_2$ of the P-polarization of the multimode laser beam $L_2$ is perpendicular to the direction of the rotating shaft 11 of the polygon mirror 10. As a result of this, the deflection scanning mechanism 7 performs the main scanning by using the combined laser beam $L_3$ in the same direction as the polarization direction $Sd_2$ of the multimode laser beam $L_2$. That is, the direction Sm of the main scanning performed by the deflection scanning mechanism 7 using the combined laser beam $L_3$ and the polarization direction $Sd_2$ of the multimode laser beam $L_2$ coincide with each other. As a result of this, the oblong shape longitudinal direction of the beam profile $Pf_2$ of the multimode laser beam $L_2$ coincides with the main scanning direction Sm on the thermal recording medium 1.

However, the multimode semiconductor laser 3 is arranged in such a manner that the junction plane direction of the pn junction plane 16 of the laser emitting section 15 is parallel with the direction of the main scanning performed by the deflection scanning mechanism 7 using the combined laser beam $L_3$. Further, the single mode semiconductor laser 2 is arranged in such a manner that the junction plane direction of the pn junction plane 14 is perpendicular to the junction plane direction of the pn junction plane 16 of the multimode semiconductor laser 3.

The scanning lens 8 is arranged within the scanning range in the direction Sm of the main scanning performed by the deflection scanning mechanism 7 using the combined laser beam $L_3$. The scanning lens 8 forms an image of the combined laser beam $L_3$ used by the deflection scanning mechanism 7 for the main scanning on the surface of the thermal recording medium 1. That is, images of the laser beam $L_1$ and the laser beam $L_2$ included in the combined laser beam $L_3$ are respectively formed on the surface of the thermal recording medium 1 by the scanning lens 8.

Figure 4:
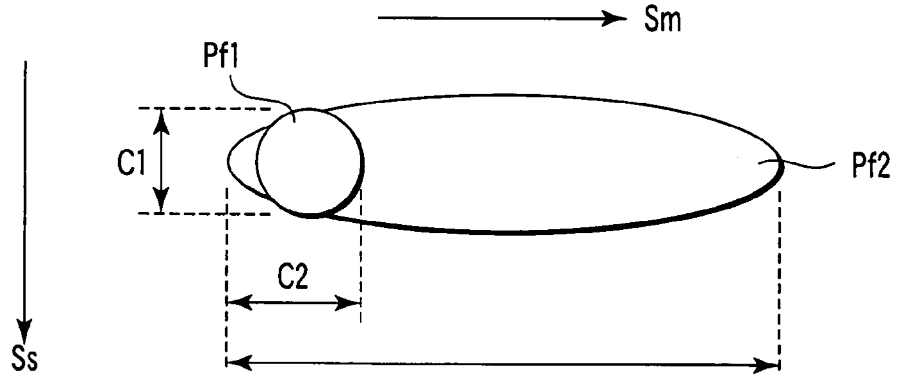
FIG. 4 is a view showing a beam profile of a laser beam formed by combining a single mode laser beam and a multimode laser beam with each other by the contactless optical writing apparatus on a thermal recording medium.
Figure 5:
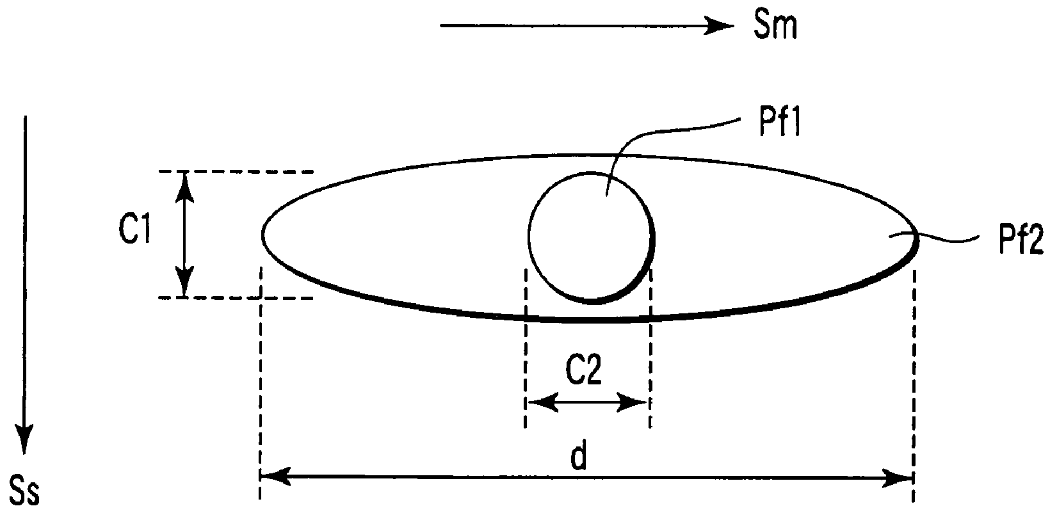
FIG. 5 is a view showing a beam profile of a laser beam formed by combining a single mode laser beam and a multimode laser beam with each other by the contactless optical writing apparatus on a thermal recording medium.

FIGS. 4 and 5 respectively show beam profiles of the single mode laser beam $L_1$ and the multimode laser beam $L_2$ formed on the thermal recording medium 1 by the scanning lens 8. The single mode laser beam $L_1$ is formed as a circular beam profile $Pf_1$ on the thermal recording medium 1. The multimode laser beam $L_2$ is formed as an oblong beam profile $Pf_2$ on the thermal recording medium 1.

The shape of the laser emitting section 13 of the single mode semiconductor laser 2 has a length of about several μm in each of the direction parallel with the pn junction plane 14 and the direction perpendicular thereto. Accordingly, it is easy to make the beam profile of the single mode laser beam $L_1$ a small and substantially circular shape by condensing the single mode laser beam $L_1$ by means of the scanning lens 8. For example, the single mode laser beam $L_1$ is condensed into a substantially circular shape of about 100 μm (1/e2).

On the other hand, the shape of the laser emitting section 15 of the multimode semiconductor laser 3 has a larger length in the direction parallel with the pn junction plane 16 than the length in the direction perpendicular to the pn junction plane, and furthermore, the larger length is, for example, as large as about 50 to 200 μm. For this reason, it is difficult to make the beam profile $Pf_2$ of the multimode laser beam $L_2$ a small and substantially circular shape by condensing the multimode laser beam $L_2$ by means of the scanning lens 8. Therefore, the beam profile $Pf_2$ of the multimode laser beam $L_2$ becomes a shape oblong in the direction of the pn junction plane 16.

Accordingly, as shown in FIGS. 4 and 5, an image of the combined laser beam $L_3$ is formed on the thermal recording medium 1 as a form in which a substantially circular beam profile $Pf_1$ is superposed on an oblong beam profile $Pf_2$.

Incidentally, each of the single mode laser beam $L_1$ and the multimode laser beam $L_2$ has a profile of a substantially Gaussian distribution. It is advisable to vary the combining position in the beam profile $Pf_2$ of the multimode laser beam $L_2$ at which the multimode laser beam $L_2$ is combined with the single mode laser beam $L_1$ in accordance with recording conditions and environmental conditions. Further, when the single mode laser beam L1 is condensed into a substantially circular shape of about 100 μm (1/e2), the combination is not limited to the case where the single mode laser beam $L_1$ and the multimode laser beam $L_2$ are combined with each other in a superposing manner, and they may be combined with each other so as to be close to each other. In this case, it is desirable that central positions of the single mode laser beam $L_1$ and the multimode laser beam $L_2$ be aligned with each other in the sub-scanning direction Ss.

FIG. 5 shows a profile of a combined beam formed by combining the single mode laser beam $L_1$ having a circular beam profile $Pf_1$ with the multimode laser beam $L_2$ within the oblong beam profile $Pf_2$ of the multimode laser beam $L_2$ at a central position on the thermal recording medium 1 in the main scanning direction (scanning direction) Sm. In this combined beam profile, the center of the single mode laser beam $L_1$ and the center (peak of power) of the multimode laser beam $L_2$ coincide with each other. In such a combination of the single mode laser beam $L_1$ and the multimode laser beam $L_2$, it is possible to cause the instantaneous power peaks of the single mode laser beam $L_1$ and the multimode laser beam $L_2$ coincide with each other. As a result, it is possible to improve the utilization efficiency of the laser beam energy.

Incidentally, the beam profile $Pf_1$ of the beam used in the scanning on the thermal recording medium 1 is formed so as to allow both a beam size $c_1$ in the height direction and a beam size $c_2$ in the lateral direction to be, for example, about 100 μm as shown in FIG. 4. The beam profile $Pf_2$ of the beam used in the scanning on the thermal recording medium 1 is formed so as to allow a beam size $c_1$ in the height direction to be, for example, about 100 μm, and a beam size d in the lateral direction to be, for example, a little over 1 mm as shown in FIG. 5.

Figure 6:
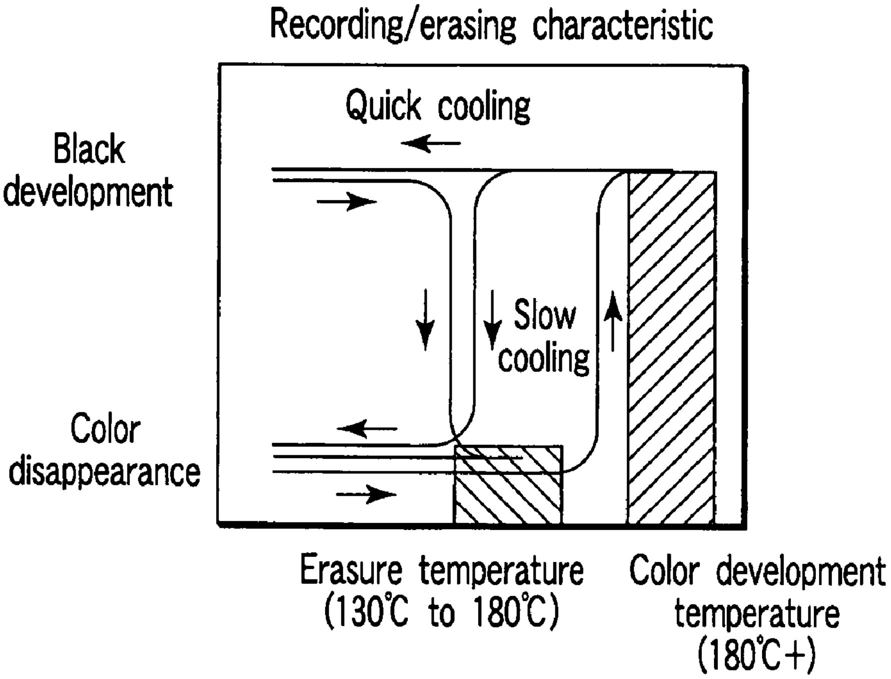
FIG. 6 is a view showing a recording/erasing characteristic of the thermal recording medium in the contactless optical writing apparatus.

The thermal recording medium 1 is a rewritable and reversible medium which enables repeating of color development and color disappearance by heating control at a specific temperature, and enables thermal recording and thermal erasure. As shown in FIG. 6, when the thermal recording medium 1 is subjected to a temperature higher than the melting point 180° C., the thermal recording medium 1 is set to a state where a dye and a developer contained in the printing layer melt together. When the thermal recording medium 1 is quickly cooled in this state, the mixture of the dye and the developer is crystallized as it is, thereby developing a color. On the other hand, when the thermal recording medium 1 is slowly cooled, each of the dye and the developer is separately crystallized. As a result, the thermal recording medium 1 cannot maintain the color development state, thereby setting the thermal recording medium 1 to the color disappearance state. Further, when the thermal recording medium is heated at a temperature lower than the melting points of the dye and the developer for a fixed period of time, the dye and the developer are gradually separated from each other so as to be crystallized, thereby setting the thermal recording medium 1 to the color disappearance state in some cases. The temperature of the color disappearance region is, for example, about 130° C. to 180° C.

Figure 7:
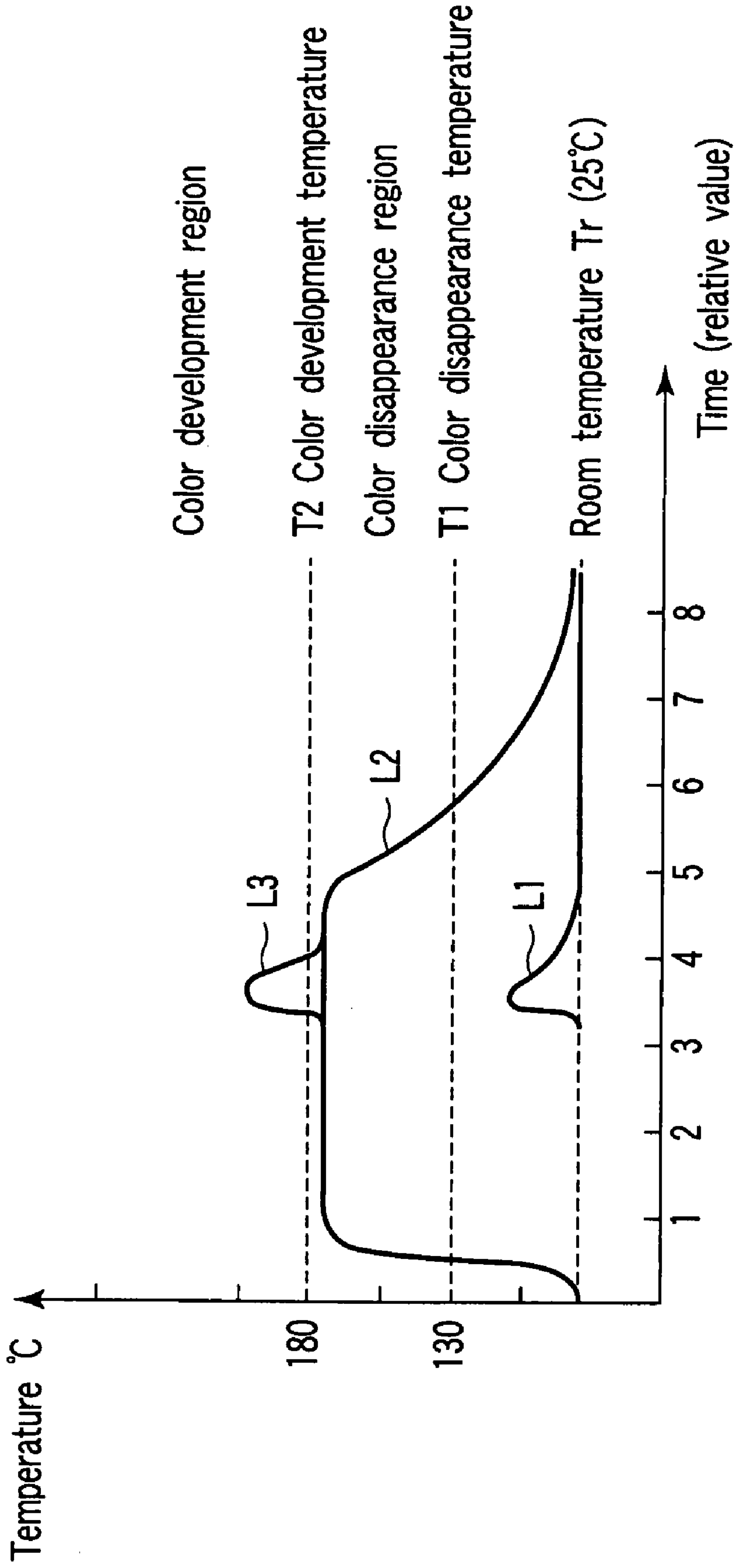
FIG. 7 is a graph showing a relationship between a medium temperature and color development/color disappearance obtained when the thermal recording medium is irradiated with the single mode laser beam and the multimode laser beam of the contactless optical writing apparatus.

FIG. 7 shows a relationship between the temperature on the thermal recording medium 1 and the color development/color disappearance obtained when the thermal recording medium 1 is irradiated with the single mode laser beam $L_1$ and the combined laser beam $L_3$. When heated, starting from the room temperature Tr (for example, 25° C.), at a temperature higher than the color development temperature $T_2$ (for example, 180° C.), and then quickly cooled, the thermal recording medium 1 develops a color. When the thermal recording medium 1 in the the color development state is heated, starting from the room temperature Tr, temporarily at the color disappearance temperature $T_1$ (for example, 130° C.) lower than the color development temperature $T_2$, and then cooled, the color is disappeared.

However, the single mode laser beam $L_1$ singly has output power capable of heating the printing layer of the thermal recording medium 1 up to a temperature equal to or lower than the color disappearance temperature $T_1$ by irradiating the thermal recording medium 1 therewith. The thermal recording medium 1 does not develop a color by the power.

On the other hand, the multimode laser beam $L_2$ singly has output power capable of heating the printing layer of the thermal recording medium 1 up to the color disappearance temperature $T_1$ by irradiating the thermal recording medium 1 therewith, although the color disappearance temperature $T_1$ is equal to or lower than the color development temperature $T_2$. As a result, the temperature rise to be observed when the thermal recording medium 1 is irradiated singly with the multimode laser beam $L_2$ is equal to or higher than the color disappearance temperature $T_1$ and equal to or lower than the color development temperature $T_2$, and hence the temperature of the thermal recording medium 1 is raised to the color disappearance region in which the developed color of the thermal recording medium 1 can be disappeared.

Incidentally, when the single mode laser beam $L_1$ has output power capable of heating the thermal recording medium 1 up to a temperature lower than the color disappearance temperature $T_1$, the multimode laser beam $L_2$ has output power capable of heating the thermal recording medium 1 up to the color disappearance temperature $T_1$ by irradiating the thermal recording medium 1 therewith. When the single mode laser beam $L_1$ has output power capable of heating the thermal recording medium 1 up to the color disappearance temperature $T_1$ by irradiating the thermal recording medium 1 therewith, the multimode laser beam $L_2$ has output power capable of heating the thermal recording medium 1 up to a temperature lower than the color disappearance temperature $T_1$.

When the thermal recording medium 1 is subjected to the main scanning using the combined laser beam $L_3$, the thermal recording medium 1 is first irradiated with the multimode laser beam $L_2$. As a result, the printing layer of the thermal recording medium 1 is quickly heated up to the color disappearance temperature $T_1$.

Then, the thermal recording medium 1 is irradiated with superposition of the multimode laser beam $L_2$ and the single mode laser beam $L_1$. As a result, the printing layer of the thermal recording medium 1 in the state where it is heated up to the color disappearance temperature $T_1$ is further heated quickly up to the color development temperature $T_2$.

Then, the irradiation of the superposition of the multimode laser beam $L_2$ and the single mode laser beam $L_1$ is terminated. Subsequently, the irradiation of the multimode laser beam $L_2$ is terminated. As a result, the printing layer of the thermal recording medium 1 is quickly cooled. Thus, it becomes possible to record information on the thermal recording medium 1 while erasing information originally recorded on the thermal recording medium 1.

A transfer mechanism 19 transfers the thermal recording medium 1 in the same direction as the sub-scanning direction Ss at, for example, a fixed transfer speed. The sub-scanning direction Ss is perpendicular to the main scanning direction Sm.

Incidentally, when the transfer speed of the thermal recording medium 1 becomes lower, energy per unit area of the laser beam with which the thermal recording medium 1 is irradiated becomes larger. That is, the product of the power and the irradiation time of the multimode laser beam $L_2$ and the single mode laser beam $L_1$ becomes larger. On the other hand, the output power is increased or decreased depending on the combination of the single mode laser beam $L_1$ output from the single mode semiconductor laser 2 and the multimode laser beam $L_2$ output from the multimode semiconductor laser 3. Accordingly, the transfer speed of the thermal recording medium 1 is set in accordance with the output power of each of the single mode semiconductor laser 2 and the multimode semiconductor laser 3 in such a manner that the thermal recording medium 1 is heated up to the color disappearance temperature $T_1$ by irradiation of the multimode laser beam $L_2$, and the thermal recording medium 1 is heated at the color development temperature $T_2$ by subsequent irradiation of the single mode laser beam $L_1$.

A beam spot position varying mechanism 18 varies the combining position of the beam profile $Pf_1$ in the beam profile $Pf_2$ of the multimode laser beam $L_2$. The beam spot position varying mechanism 18 moves the polarization beam splitter 5 in the traveling direction h of the multimode laser beam $L_2$ output from the multimode semiconductor laser 3. Alternatively, the beam spot position varying mechanism 18 moves the polarization beam splitter 5 in the traveling direction of the single mode laser beam $L_1$. The beam spot position varying mechanism 18 varies the combining position of the beam spot $Pf_1$ by rotating the polarization beam splitter 5 around a rotation axis parallel with the polarization direction $Sd_1$ of the S-polarization.

Figure 8A:
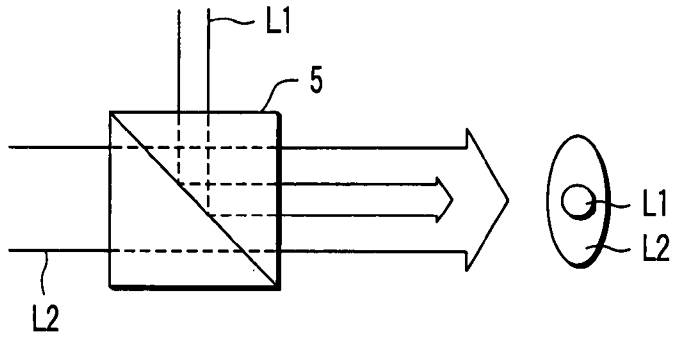
FIG. 8A is a view showing a function of a beam spot position varying mechanism in the contactless optical writing apparatus.
Figure 8B:
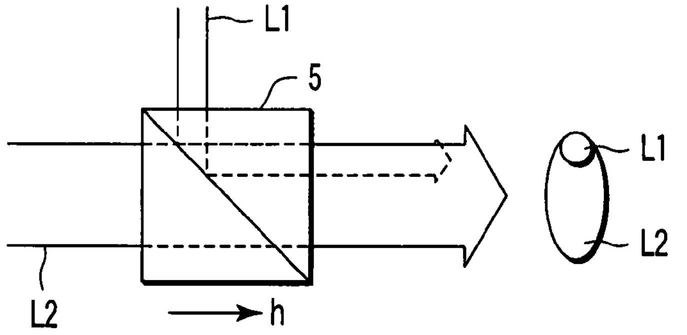
FIG. 8B is a view showing a function of a beam spot position varying mechanism in the contactless optical writing apparatus.

FIGS. 8A to 8D each show a positional relationship of combination between the multimode laser beam $L_2$ and the single mode laser beam $L_1$ which are image-formed on the thermal recording medium 1 and moved by the beam spot position varying mechanism 18. In FIG. 8A, the combining position of the beam spot $Pf_1$ is the central position of the beam profile $Pf_2$ of the multimode laser beam $L_2$. When the polarization beam splitter 5 is moved in the traveling direction h of the multimode laser beam $L_2$ from this state as shown in FIG. 8B, the incidence position of the single mode laser beam $L_1$ on the polarization beam splitter 5 is changed. In response to this, the reflection position of the single mode laser beam $L_1$ in the polarization beam splitter 5 is changed. As a result, the combining position of the beam spot $Pf_1$ in the beam profile $Pf_2$ of the multimode laser beam $L_2$ is varied.

Figure 8C:
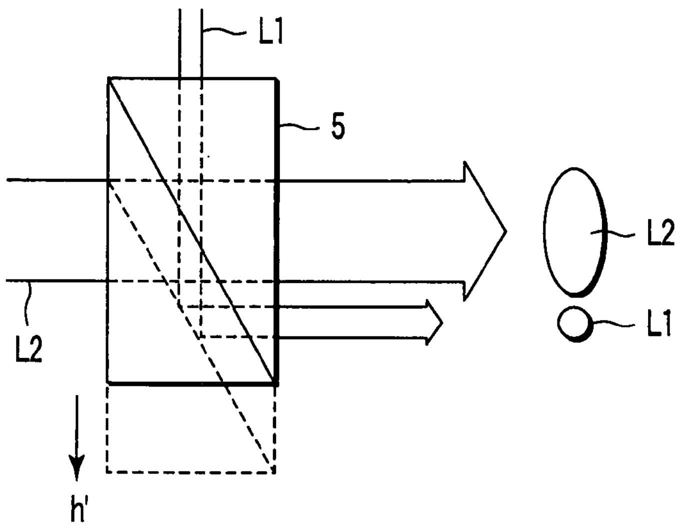
FIG. 8C is a view showing a function of a beam spot position varying mechanism in the contactless optical writing apparatus.
Figure 8D:
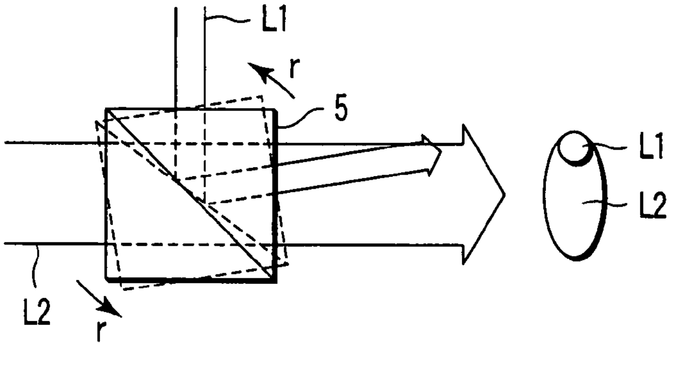
FIG. 8D is a view showing a function of a beam spot position varying mechanism in the contactless optical writing apparatus.

FIG. 8C shows the combining position of the beam spot $Pf_1$ in the beam profile $Pf_2$ of the multimode laser beam $L_2$ observed when the polarization beam splitter 5 is moved in the traveling direction h' of the first semiconductor laser beam. FIG. 8D shows the combining position of the beam spot $Pf_1$ in the beam profile $Pf_2$ of the multimode laser beam $L_2$ observed when the polarization beam splitter 5 is rotated in the rotational direction r around a rotation axis parallel with the vibration direction of the S-polarization of the single mode laser beam $L_1$.

Next, a recording operation performed by the apparatus configured as described above.

The single mode semiconductor laser 2 outputs a single mode laser beam $L_1$ of the S-polarization from the laser emitting section 13 to the polarization beam splitter 5. The single mode laser beam $L_1$ has a polarization direction $Sd_1$ of the S-polarization identical with the junction plane direction of the pn junction plane 14. The single mode laser beam $L_1$ is condensed into a substantially parallel light flux by the first collimator lens 4, and is made incident on the polarization beam splitter 5.

On the other hand, the multimode semiconductor laser 3 outputs a multimode laser beam $L_2$ of the P-polarization from the laser emitting section 15 to the polarization beam splitter 5. The multimode laser beam $L_2$ has a polarization direction $Sd_2$ of P-polarization identical with the junction plane direction of the pn junction plane 16. The multimode laser beam $L_2$ is condensed into a substantially parallel light flux by the second collimator lens 9, and is made incident on the polarization beam splitter 5.

The polarization beam splitter 5 reflects the single mode laser beam $L_1$ output from the single mode semiconductor laser 2, transmits the multimode laser beam $L_2$ output from the multimode semiconductor laser 3, and outputs them as the combined laser beam $L_3$. The combined laser beam $L_3$ output from the polarization beam splitter 5 is made incident on the deflection scanning mechanism 7.

The deflection scanning mechanism 7 continuously rotates the polygon mirror 10 in the arrow direction f by the drive of the rotary drive section 12 through the rotating shaft 11. As a result of this, the polygon mirror 10 scans the thermal recording medium 1 in the main scanning direction Sm by using the combined laser beam $L_3$ output from the polarization beam splitter 5. The multimode semiconductor laser 3 is set in such a manner that the polarization direction $Sd_2$ of the P-polarization of the multimode laser beam $L_2$ is perpendicular to the direction of the rotating shaft 11 of the polygon mirror 10. As a result of this, the deflection scanning mechanism 7 performs the main scanning by using the combined laser beam $L_3$ in the same direction as the polarization direction $Sd_2$ of the multimode laser beam $L_2$.

The scanning lens 8 forms the image of the combined laser beam $L_3$ used by the deflection scanning mechanism 7 for the main scanning on the surface of the thermal recording medium 1 as shown in FIGS. 4 and 5. That is, the image of the combined laser beam $L_3$ is formed on the surface of the thermal recording medium 1 as a form in which a circular beam profile $Pf_1$ is superposed on an oblong beam profile $Pf_2$ of the multimode laser beam $L_2$.

The combined laser beam $L_3$ an image of which is formed on the thermal recording medium 1 is used to scan the thermal recording medium 1 in the same direction as the oblong shape longitudinal direction of the beam profile $Pf_2$ of the multimode laser beam $L_2$. When the main scanning is performed on the thermal recording medium 1 using the combined laser beam $L_3$, the surface of the thermal recording medium 1 is first irradiated singly with the multimode laser beam $L_2$ included in the combined laser beam $L_3$. The temperature on the surface of the thermal recording medium 1 observed when the medium 1 is irradiated singly with the multimode laser beam $L_2$ is equal to or lower than the color development temperature $T_2$ as shown in FIG. 7, the thermal recording medium 1 is quickly heated up to the color disappearance temperature $T_1$, and hence the temperature is raised.

Then, the surface of the thermal recording medium 1 is irradiated with superposition of the multimode laser beam $L_2$ and the single mode laser beam $L_1$ included in the combined laser beam $L_3$. The thermal recording medium 1 is further quickly heated up to the color development temperature $T_2$ from the state where it is heated up to the color disappearance temperature $T_1$, and hence the temperature on the surface of the thermal recording medium 1 observed at this time is raised. As a result, it becomes possible to record information on the thermal recording medium 1.

Then, the irradiation of the single mode laser beam $L_1$ is terminated, subsequently the irradiation of the multimode laser beam $L_2$ is terminated, and the printing layer of the thermal recording medium 1 is quickly cooled. As a result, a part of the printing layer of the thermal recording medium 1 irradiated singly with the multimode laser beam $L_2$ is color-disappeared if there is a black part originally recorded and color-developed. Further, a part of the printing layer of the thermal recording medium 1 that has been irradiated with the superposition of the multimode laser beam $L_2$ and the single mode laser beam $L_1$ is color-developed black.

Accordingly, by turning on/off the output of the single mode laser beam $L_1$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

As described above, according to the first embodiment, the single mode laser beam $L_1$ output from the single mode semiconductor laser 2 and the multimode laser beam $L_2$ output from the multimode semiconductor laser 3 are combined with each other by the polarization beam splitter 5, the combined laser beam $L_3$ is used by the deflection scanning mechanism 7 to perform the main scanning, and the image of the combined laser beam $L_3$ is formed on the surface of the thermal recording medium 1 by the scanning lens 8. As a result, it is possible to settle the deficiency of power at the time of recording information on the thermal recording medium 1 by effectively utilizing the laser beam power. A printing speed at the same level as that of, for example, a printer using a thermal head can be assured. A speedup of the recording speed can be realized. Further, it is possible to give heat to the thermal recording medium 1 in a contactless manner by using the single mode semiconductor laser 2 and the multimode semiconductor laser 3.

By the use of one multimode semiconductor laser 3, the temperature of the thermal recording medium 1 can be raised only to the color disappearance region of the thermal recording medium 1. By the single use of the other one single mode semiconductor laser 2, information cannot be recorded on the thermal recording medium 1 due to the small power. Even under such circumstances, by combining the single mode laser beam $L_1$ of the single mode semiconductor laser 2 and the multimode laser beam $L_2$ of the multimode semiconductor laser 3 with each other, information can be recorded on the thermal recording medium 1.

The single mode semiconductor laser 2 includes a laser emitting section 13 having a dimension of about several μm in each of directions parallel with and perpendicular to the pn junction plane 14. As a result, it is easy to condense the single mode laser beam $L_1$ output from the single mode semiconductor laser 2 into a circular beam profile $Pf_1$, which is suitable for recording information such as an image.

On the other hand, in the multimode semiconductor laser 3, the laser emitting section has a large length of about 100 μm in the direction parallel with the pn junction plane 16. As a result, when the multimode laser beam $L_2$ output from the multimode semiconductor laser 3 is condensed, a beam profile $Pf_2$ having an oblong shape is obtained. Accordingly, performing the main scanning in the main scanning direction Sm on the thermal recording medium 1 by using the multimode laser beam $L_2$ makes it possible to use the beam profile $Pf_2$ for color disappearance and preheating. By effectively utilizing the merits of the single mode semiconductor laser 2 and the multimode semiconductor laser 3, it is possible to record information on the thermal recording medium 1.

Both the single mode laser beam $L_1$ and the multimode laser beam $L_2$ have substantially the same beam size $c_1$ in the sub-scanning direction Ss. Hence, the single mode laser beam $L_1$ can be combined with the multimode laser beam $L_2$ at a position in the beam profile $Pf_2$ of the multimode laser beam $L_2$ and in the rear part thereof in the main scanning direction Sm as shown in FIG. 4. Further, the single mode laser beam $L_1$ can be combined with the multimode laser beam $L_2$ at a position in the beam profile $Pf_2$ of the multimode laser beam $L_2$ and in the center thereof in the main scanning direction Sm as shown in FIG. 5. As a result, the power of the multimode laser beam $L_2$ can be effectively utilized.

When the surface of the thermal recording medium 1 is scanned, the surface of the thermal recording medium 1 is first irradiated singly with the multimode laser beam $L_2$. Then, the surface of the thermal recording medium 1 is irradiated with superposition of the multimode laser beam $L_2$ and the single mode laser beam $L_1$. Then, the irradiation of the single mode laser beam $L_1$ is terminated, and subsequently, the irradiation of the multimode laser beam $L_2$ is terminated.

Thus, it is possible to record information such as an image at a part on the thermal recording medium 1 that has been irradiated with the superposition of the multimode laser beam $L_2$ and the single mode laser beam $L_1$. Further, by irradiating the surface of the thermal recording medium 1 singly with the multimode laser beam $L_2$, information on the surface of the thermal recording medium 1 can be erased. By irradiating the surface of the thermal recording medium 1 singly with the multimode laser beam $L_2$, and then irradiating the surface of the thermal recording medium 1 with superposition of the multimode laser beam $L_2$ and the single mode laser beam $L_1$, information on the surface of the thermal recording medium 1 can be erased, and new information can be recorded thereon. That is, information can be rewritten.

Next, a second embodiment of the present invention will be described below with reference to the accompanying drawings. Incidentally, the same parts as those shown in FIG. 1 are denoted by the same reference symbols, and a detailed description of them is omitted.

Figure 9:
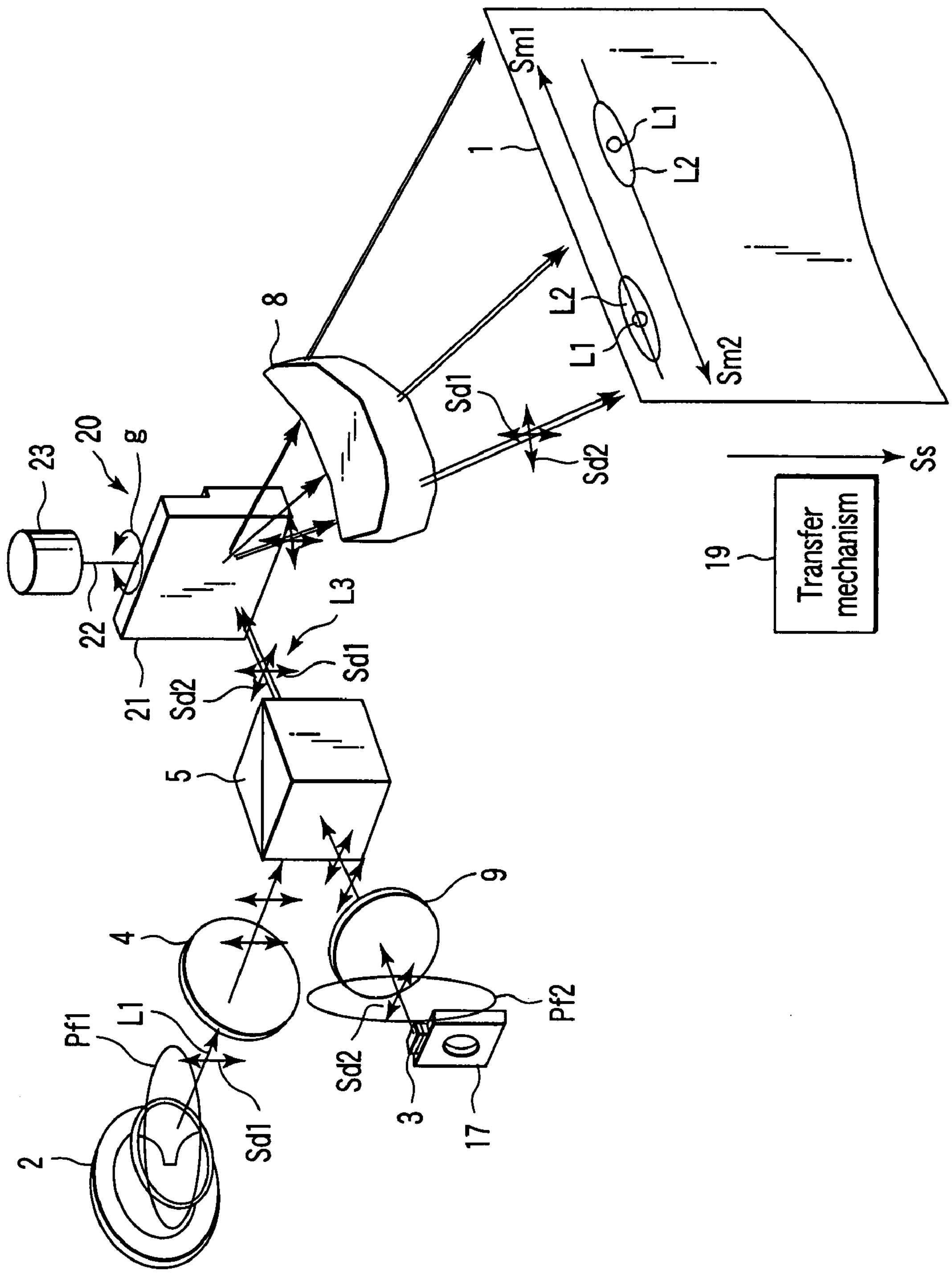
FIG. 9 is a configuration view showing a second embodiment of a contactless optical writing apparatus according to the present invention.

FIG. 9 shows a configuration view of a contactless optical writing apparatus. A polarization beam splitter 5 reflects a single mode laser beam $L_1$, at the same time, transmits a multimode laser beam $L_2$, and combines the single mode laser beam $L_1$ and the multimode laser beam $L_2$ with each other. A combined laser beam $L_3$ output from the polarization beam splitter 5 is made incident on a deflection scanning mechanism 20.

The deflection scanning mechanism 20 includes a galvano-mirror 21, and a rotary drive section 23. The galvano-mirror 21 is coupled to the rotary drive section 23 through a rotating shaft 22. The rotary drive section 23 repeatedly swings the galvano-mirror 21 in the arrow directions g in a reciprocating manner. The rotating shaft 22 of the galvano-mirror 21 is provided in a direction parallel with the polarization direction $Sd_1$ of the single mode laser beam $L_1$ and perpendicular to the polarization direction $Sd_2$ of the multimode laser beam $L_2$. As a result, the deflection scanning mechanism 20 performs the main scanning on the thermal recording medium 1 in a reciprocating manner using the combined laser beam $L_3$ output from the polarization beam splitter 5 by the repeated and reciprocatory swing of the galvano-mirror 21 in the arrow directions g. This main scanning is performed in the same direction as the polarization direction $Sd_2$ of the multimode laser beam $L_2$. This main scanning is constituted of the scanning in the main scanning direction $Sm_1$ of the forward travel and the scanning in the main scanning direction $Sm_2$ of the backward travel.

Next, the recording operation performed by the apparatus configured as described above will be described below.

The single mode semiconductor laser 2 outputs a single mode laser beam $L_1$ of S-polarization from a laser emitting section 13 to the polarization beam splitter 5. The single mode laser beam $L_1$ is condensed into a substantially parallel light flux by a collimator lens 9, and made incident on the polarization beam splitter 5.

The polarization beam splitter 5 reflects the single mode laser beam $L_1$, at the same time, transmits the multimode laser beam $L_2$, combines the multimode laser beam $L_2$ and the single mode laser beam $L_1$ with each other, and outputs the combined laser beam $L_3$.

The deflection scanning mechanism 20 repeatedly swings the galvano-mirror 21 in the arrow directions g in a reciprocating manner through the rotation shaft 22 by the drive of the rotary drive section 23. As a result of this, the combined laser beam $L_3$ output from the polarization beam splitter 5 is used to perform the main scanning as the scanning in the main scanning direction $Sm_1$ of the forward travel and the scanning in the main scanning direction $Sm_2$ of the backward travel. An image of the combined laser beam $L_3$ used in the forward scanning and the backward scanning is formed on the surface of the thermal recording medium 1 by a scanning lens 8.

Figure 10:
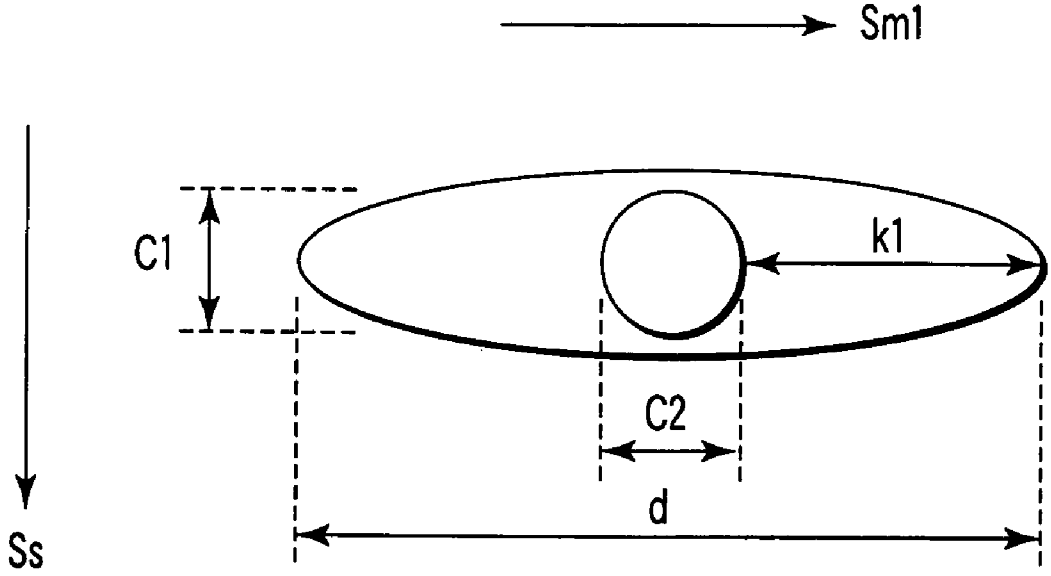
FIG. 10 is a view showing a beam profile of a laser beam formed by combining a single mode laser beam and a multimode laser beam with each other by the contactless optical writing apparatus on a thermal recording medium.
Figure 11:
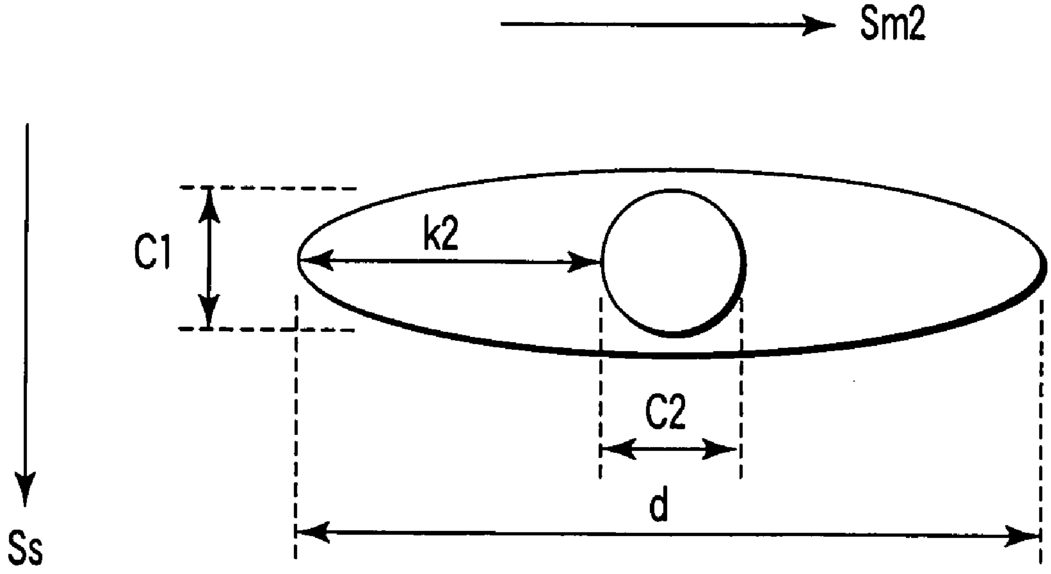
FIG. 11 is a view showing a beam profile of a laser beam formed by combining a single mode laser beam and a multimode laser beam with each other by the contactless optical writing apparatus on a thermal recording medium.

That is, the image of the combined laser beam $L_3$ is formed, as shown in, for example, FIGS. 10 and 11, on the surface of the thermal recording medium 1 as a shape in which a circular beam profile $Pf_1$ of the single mode laser beam $L_1$ is superposed on an oblong beam profile $Pf_2$ of the multimode laser beam $L_2$. The forward and backward scanning directions of the combined laser beam $L_3$ coincide with the oblong shape longitudinal directions of the beam profile $Pf_2$ of the multimode laser beam $L_2$ on the surface of the thermal recording medium 1. Incidentally, the combining position of the beam spot of the single mode laser beam $L_1$ in the beam profile $Pf_2$ of the multimode laser beam $L_2$ is the central position in the main scanning direction (scanning direction) Sm as shown in FIGS. 10 and 11.

First, in the main scanning direction $Sm_1$ of the forward travel, a forward travel head region $k_1$ in the beam profile $Pf_2$ of the multimode laser beam $L_2$ included in the combined laser beam $L_3$ is singly irradiated as shown in FIG. 10. The forward travel head region $k_1$ is the region on the head side in the main scanning direction $Sm_1$ of the forward travel of the combined laser beam $L_3$. Although the temperature on the surface of the thermal recording medium 1 observed when the medium 1 is irradiated singly with the multimode laser beam $L_2$ is equal to or lower than the color development temperature $T_2$ as shown in FIG. 7, the thermal recording medium 1 is quickly heated up to the color disappearance temperature $T_1$, and the temperature is raised.

Then, the surface of the thermal recording medium 1 is irradiated with superposition of the multimode laser beam $L_2$ and the single mode laser beam $L_1$ which are included in the combined laser beam $L_3$. The thermal recording medium 1 is further heated quickly up to the color development temperature $T_2$ from the state where the medium 1 is heated up to the color disappearance temperature $T_1$, and hence the temperature on the surface of the thermal recording medium 1 is raised at this time. As a result of this, it becomes possible to record information on the thermal recording medium 1.

Then, the irradiation of the single mode laser beam $L_1$ is terminated, and subsequently, when the irradiation of the multimode laser beam $L_2$ is terminated, the printing layer of the thermal recording medium 1 is quickly cooled. As a result, a part of the printing layer of the thermal recording medium 1 irradiated singly with the multimode laser beam $L_2$ is color-disappeared if there is a black part already color-developed. Further, a part of the printing layer of the thermal recording medium 1 that has been irradiated with the superposition of the multimode laser beam $L_2$ and the single mode laser beam $L_1$ is color-developed black.

Accordingly, by turning on/off the output of the single mode laser beam $L_1$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

Then, in the main scanning direction $Sm_2$ of the backward travel, the backward travel head region $k_2$ in the beam profile $Pf_2$ of the multimode laser beam $L_2$ included in the combined laser beam $L_3$ is singly irradiated as shown in FIG. 11. The backward travel head region $k_2$ is the region on the head side in the main scanning direction $Sm_2$ of the backward travel of the combined laser beam $L_3$. Although the temperature on the surface of the thermal recording medium 1 observed when the medium 1 is irradiated singly with the multimode laser beam $L_2$ is equal to or lower than the color development temperature $T_2$ as shown in FIG. 7, the thermal recording medium 1 is quickly heated up to the color disappearance temperature $T_1$, and the temperature is raised.

Then, the surface of the thermal recording medium 1 is irradiated with superposition of the multimode laser beam $L_2$ and the single mode laser beam $L_1$ which are included in the combined laser beam $L_3$. The thermal recording medium 1 is further heated quickly up to the color development temperature $T_2$ from the state where the medium 1 is heated up to the color disappearance temperature $T_1$, and hence the temperature on the surface of the thermal recording medium 1 is raised at this time. As a result of this, it becomes possible to record information on the thermal recording medium 1.

Then, the irradiation of the single mode laser beam $L_1$ is terminated, and subsequently, when the irradiation of the multimode laser beam $L_2$ is terminated, the printing layer of the thermal recording medium 1 is quickly cooled. As a result, a part of the printing layer of the thermal recording medium 1 irradiated singly with the multimode laser beam $L_2$ is color-disappeared if there is a black part already color-developed. Further, a part of the printing layer of the thermal recording medium 1 that has been irradiated with the superposition of the multimode laser beam $L_2$ and the single mode laser beam $L_1$ is color-developed black.

Accordingly, by turning on/off the output of the single mode laser beam $L_1$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

As described above, according to the second embodiment, the single mode laser beam $L_1$ output from the single mode semiconductor laser 2 and the multimode laser beam $L_2$ output from the multimode semiconductor laser 3 are combined with each other by the polarization beam splitter 5, the combined laser beam $L_3$ is used by the deflection scanning mechanism 20 to perform the main scanning on the surface of the thermal recording medium 1 in the main scanning direction $Sm_1$ of the forward travel and in the main scanning direction $Sm_2$ of the backward travel in a reciprocating manner.

As a result, the same advantage as the first embodiment can be obtained.

The combined laser beam $L_3$ is used to perform the main scanning on the surface of the thermal recording medium 1 in the main scanning direction $Sm_1$ of the forward travel and in the main scanning direction $Sm_2$ of the backward travel in the same direction as the oblong shape longitudinal direction of the beam profile $Pf_2$ of the multimode laser beam $L_2$. As a result, it is possible to raise the temperature of the thermal recording medium 1 to the color disappearance region by the forward travel head region $k_1$ in the main scanning direction $Sm_1$ of the forward travel. Further, in the main scanning direction $Sm_2$ of the backward travel too, it is possible to raise the temperature of the thermal recording medium 1 to the color disappearance region by the backward travel head region $k_2$. As a result of this, the power of the multimode laser beam $L_2$ can be effectively utilized. Furthermore, the combined laser beam $L_3$ is used to perform the main scanning in the main scanning direction $Sm_1$ of the forward travel and in the main scanning direction $Sm_2$ of the backward travel in a reciprocating manner, and hence the speedup of recording of information on the entire surface of the thermal recording medium 1 can be more enhanced than in the first embodiment.

Next, a third embodiment of the present invention will be described below with reference to the accompanying drawings. Incidentally, the same parts as those shown in FIG. 1 are denoted by the same reference symbols, and a detailed description of them is omitted.

Figure 12:
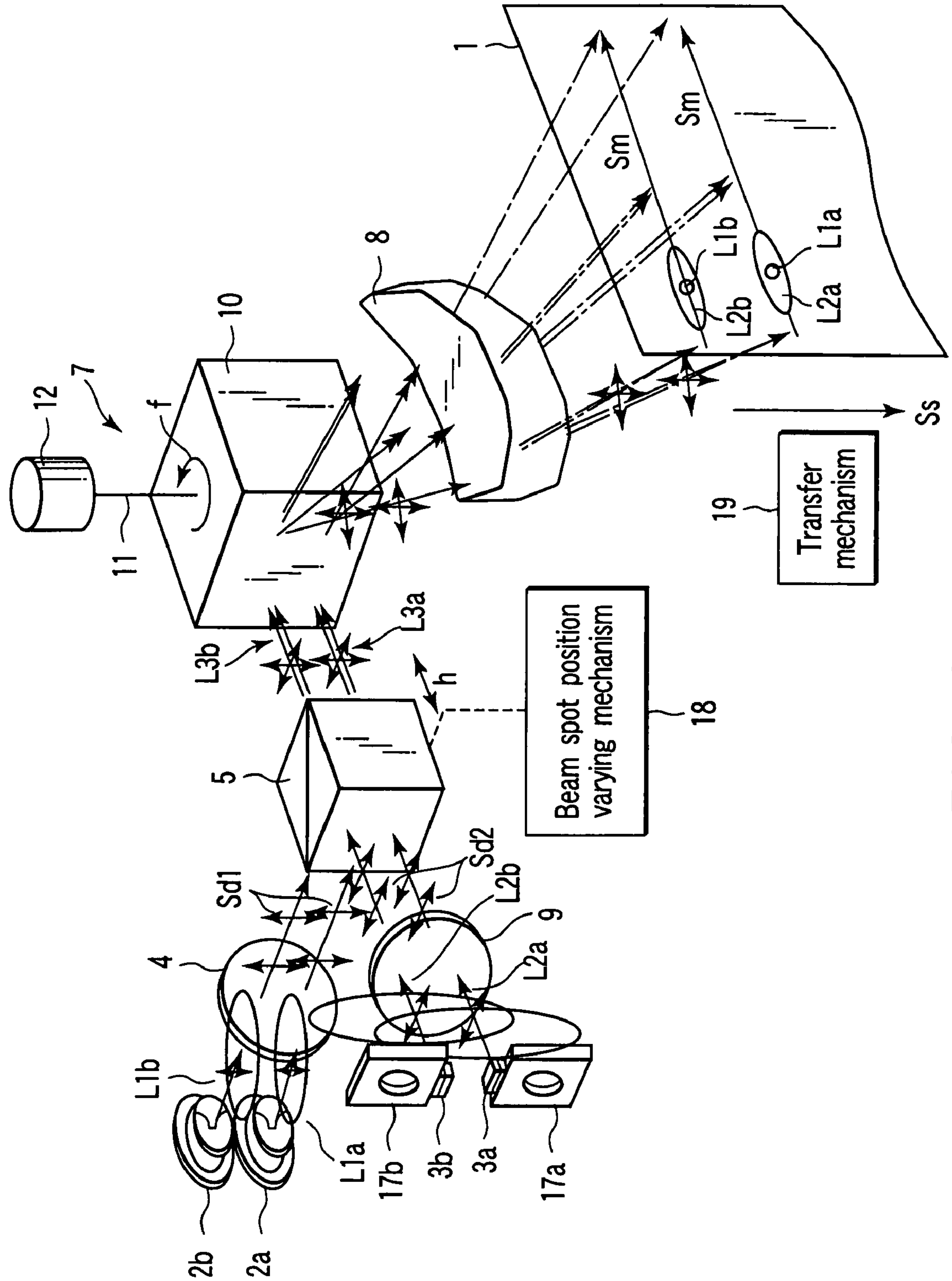
FIG. 12 is a configuration view showing a third embodiment of a contactless optical writing apparatus according to the present invention.

FIG. 12 shows a configuration view of a contactless optical writing apparatus. A plurality of single mode semiconductor lasers, for example, two single mode semiconductor lasers 2*a* and 2*b* are provided. Each of the single mode semiconductor lasers 2*a* and 2*b* is identical with the aforementioned single mode semiconductor laser 2. Each single mode semiconductor laser 2*a* or 2*b* outputs a single mode laser beam $L_1a$ or $L_1b$ of S-polarization to a polarization beam splitter 5. Each single mode semiconductor laser 2*a* or 2*b* is provided parallel with the polarization direction $Sd_1$ of each single mode laser beam $L_1a$ or $L_1b$ of S-polarization output to the polarization beam splitter 5.

A plurality of multimode semiconductor lasers, for example, two multimode semiconductor lasers 3*a* and 3*b* are provided. Each multimode semiconductor laser 3*a* or 3*b* is identical with the aforementioned multimode semiconductor laser 3. Each multimode semiconductor laser 3*a* or 3*b* outputs a multimode laser beam $L_2$a or $L_2$b of P-polarization to the polarization beam splitter 5. Each multimode semiconductor laser 3*a* or 3*b* is provided perpendicular to the polarization direction $Sd_2$ of each multimode laser beam $L_2$a or $L_2$b output therefrom. Incidentally, each multimode semiconductor laser 3*a* or 3*b* is provided on each mount 17*a* or 17*b*.

Next, the recording operation performed by the apparatus configured as described above will be described below.

Each single mode semiconductor laser 2*a* or 2*b* outputs a single mode laser beam $L_1$a or $L_1$b of S-polarization from each laser emitting section 13 to the polarization beam splitter 5.

Each single mode laser beam $L_1$a or $L_1$b is condensed into a substantially parallel light flux by a collimator lens 4, and is simultaneously made incident on the polarization beam splitter 5.

On the other hand, each multimode semiconductor laser 3*a* or 3*b* outputs a multimode laser beam $L_2$a or $L_2$b from each laser emitting section 15 to the polarization beam splitter 5. Each multimode laser beam $L_2$a or $L_2$b is condensed into a substantially parallel light flux by a collimator lens 9, and is simultaneously made incident on the polarization beam splitter 5.

The polarization beam splitter 5 reflects each single mode laser beam $L_1$a or $L_1$b, at the same time, transmits each multimode laser beam $L_2$a or $L_2$b, combines each single mode laser beam $L_1$a or $L_1$b and each multimode laser beam $L_2$a or $L_2$b with each other, and outputs each combined laser beam $L_3$a or $L_3$b. Each combined laser beam $L_3$a or $L_3$b is made incident on a deflection scanning mechanism 7.

The deflection scanning mechanism 7 continuously rotates a polygon mirror 10 in the arrow direction f. As a result, the deflection scanning mechanism 7 performs the main scanning on the thermal recording medium 1 in the main scanning direction Sm using each combined laser beam $L_3$a or $L_3$b output from the polarization beam splitter 5. In this case, a rotating shaft 11 of the polygon mirror 10 is provided parallel with the polarization direction $Sd_1$ of each single mode laser beam $L_1$a or $L_1$b, and perpendicular to the polarization direction $Sd_2$ or $Sd_2$ of each multimode laser beam $L_2$a or $L_2$b.

However, each combined laser beam $L_3$a or $L_3$b is used by the deflection scanning mechanism 7 to perform the main scanning in the same direction as the polarization direction $Sd_2$ or $Sd_2$ of each multimode laser beam $L_2$a or $L_2$b.

An image of each combined laser beam $L_3$a or $L_3$b is formed on the surface of the thermal recording medium 1 by a scanning lens 8.

Each combined laser beam $L_3$a or $L_3$b is used to synchronously perform the main scanning on the thermal recording medium 1 in the same direction as each oblong shape direction of each multimode laser beam $L_2$a or $L_2$b formed into each oblong beam profile $Pf_2$ or $Pf_2$. The main scanning directions Sm and Sm of the respective combined laser beams $L_3$a and $L_3$b are parallel with each other.

An image of each combined laser beam $L_3$a or $L_3$b is formed on the surface of the thermal recording medium 1 as a form in which each circular beam profile $Pf_1$ of each single mode laser beam $L_1$a or $L_1$b is superposed on each oblong beam profile $Pf_2$ of each multimode laser beam $L_2$a or $L_2$b as shown in, for example, FIG. 4 or 5. The combining position of a beam spot of each single mode laser beam $L_1$a or $L_1$b in each beam profile $Pf_2$ or $Pf_2$ of each multimode laser beam $L_2$a or $L_2$b is in the beam profile $Pf_2$ of each multimode laser beam $L_2$a or $L_2$b and in the rear part thereof in the main scanning direction Sm as shown in, for example, FIG. 4. Alternatively, the combining position of a beam spot of each single mode laser beam $L_1$a or $L_1$b in each beam profile $Pf_2$ or $Pf_2$ of each multimode laser beam $L_2$a or $L_2$b is in the beam profile $Pf_2$ of each multimode laser beam $L_2$a or $L_2$b and in the center thereof in main scanning direction Sm as shown in, for example, FIG. 5.

When the surface of the thermal recording medium 1 is scanned by using each multimode laser beam $L_2$a or $L_2$b, first, as described above, the surface of the thermal recording medium 1 is irradiated singly with each multimode laser beam $L_2$a or $L_2$b. Then, the surface of the thermal recording medium 1 is irradiated with superposition of each multimode laser beam $L_2$a or $L_2$b and each single mode laser beam $L_1$a or $L_1$b. Then, the irradiation of each single mode laser beam $L_1$a or $L_1$b is terminated, and subsequently, the irradiation of each multimode laser beam $L_2$a or $L_2$b is terminated. As a result, it is possible to record information such as an image at a part that has been irradiated with the superposition of each multimode laser beam $L_2$a or $L_2$b and each single mode laser beam $L_1$a or $L_1$b. As a result of this, it becomes possible to record information such as a character, a mark, a pattern, and the like on the thermal recording medium 1 simultaneously in two lines.

As described above, according to the third embodiment, for example, two single mode semiconductor lasers 2*a* and 2*b* are provided, further, for example, two multimode semiconductor lasers 3*a* and 3*b* are provided, and the main scanning is performed on the thermal recording medium 1 by the polygon mirror 10 using each combined laser beam $L_3$a or $L_3$b. As a result, it is possible to obtain the same advantage as the first embodiment, perform the main scanning on the surface of the thermal recording medium 1 by using the respective combined laser beams $L_3$a and $L_3$b in parallel with the main scanning direction Sm and simultaneously, and record information such as a character, a mark, a pattern, and the like simultaneously in two lines.

Next, a fourth embodiment of the present invention will be described below with reference to the accompanying drawings. Incidentally, the same parts as those shown in FIG. 12 are denoted by the same reference symbols, and a detailed description of them is omitted.

Figure 13:
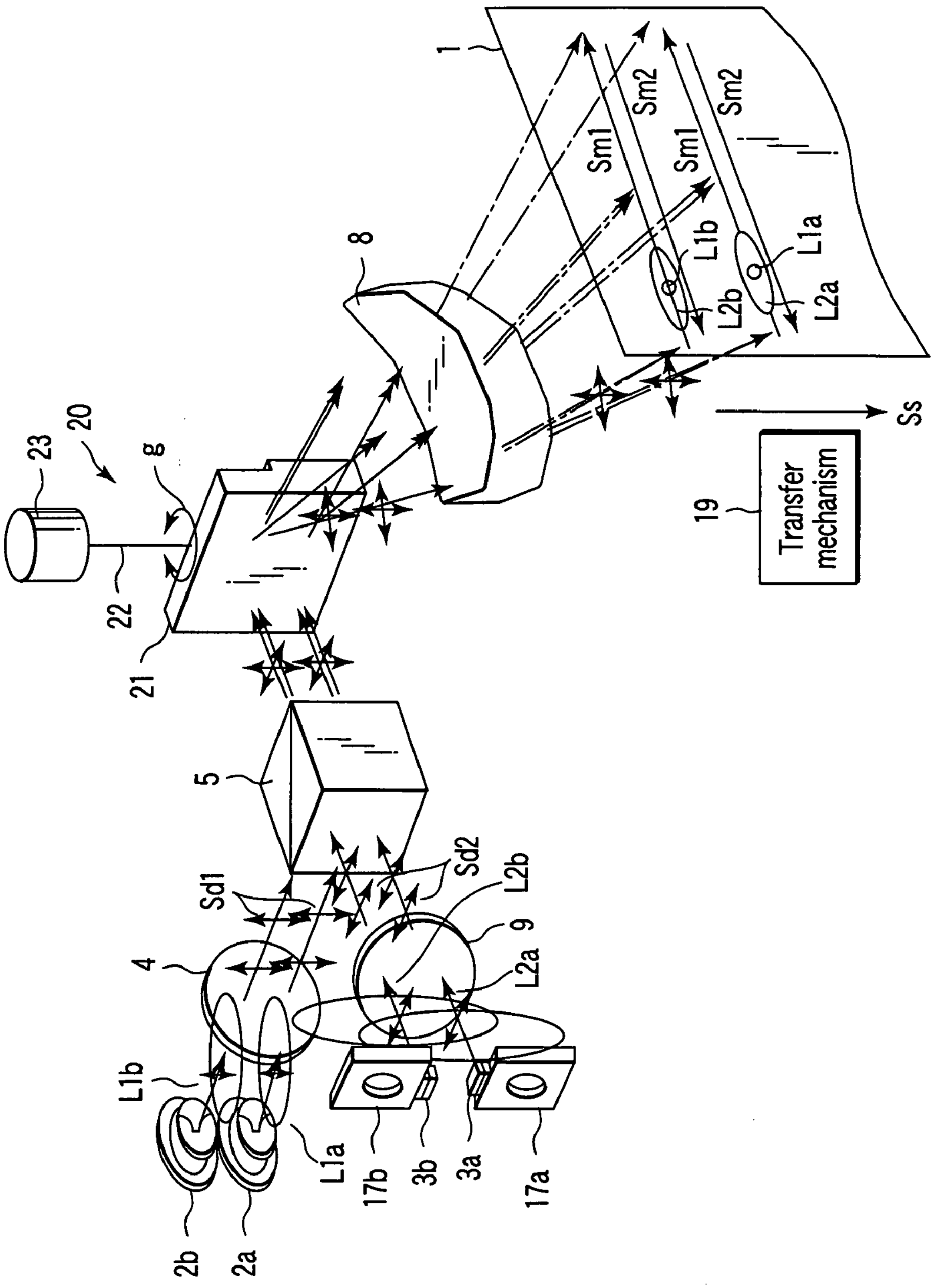
FIG. 13 is a configuration view showing a fourth embodiment of a contactless optical writing apparatus according to the present invention.

FIG. 13 shows a configuration view of a contactless optical writing apparatus. A deflection scanning mechanism 20 is identical with the deflection scanning mechanism 20 in the second embodiment. The deflection scanning mechanism 20 includes a galvano-mirror 21, and a rotary drive section 23. The deflection scanning mechanism 20 performs main scanning on a thermal recording medium 1 in the main scanning direction $Sm_1$ of the forward travel and in the main scanning direction $Sm_2$ of the backward travel in a reciprocating manner by using each combined laser beam $L_3$a or $L_3$b output from a polarization beam splitter 5 by a repeatedly reciprocating swing of the galvano-mirror 21 in the arrow directions g.

A rotating shaft 22 of the galvano-mirror 21 is provided parallel with each polarization direction $Sd_1$ or $Sd_1$ of each single mode laser beam $L_1$a or $L_1$b with respect to the polarization beam splitter 5, and perpendicular to each polarization direction $Sd_2$ or $Sd_2$ of each multimode laser beam $L_2$a or $L_2$b with respect to the polarization beam splitter 5. As a result, the deflection scanning mechanism 20 performs the main scanning in the main scanning direction $Sm_1$ of the forward travel, and in the main scanning direction $Sm_2$ of the backward travel by using each combined laser beam $L_3$a or $L_3$b in the same direction as each polarization direction $Sd_2$ or $Sd_2$ of each multimode laser beam $L_2$a or $L_2$b.

Next, the recording operation performed by the apparatus configured as described above will be described below.

Each single mode semiconductor laser 2*a* or 2*b* outputs a single mode laser beam $L_1$a or $L_1$b of S-polarization to the polarization beam splitter 5. Each single mode laser beam $L_1$a or $L_1$b is condensed into a substantially parallel light flux by a collimator lens 4, and is simultaneously made incident on the polarization beam splitter 5.

On the other hand, each multimode semiconductor laser 3*a* or 3*b* outputs a multimode laser beam $L_2$a or $L_2$b of P-polarization to the polarization beam splitter 5. Each multimode laser beam $L_2$a or $L_2$b is condensed into a substantially parallel light flux by a collimator lens 9, and is simultaneously made incident on the polarization beam splitter 5.

The polarization beam splitter 5 reflects each single mode laser beam $L_1$a or $L_1$b, transmits each multimode laser beam $L_2$a or $L_2$b, combines each single mode laser beam $L_1$a or $L_1$b and each multimode laser beam $L_2$a or $L_2$b with each other, and outputs each combined laser beam $L_3$a or $L_3$b. Each combined laser beam $L_3$a or $L_3$b is made incident on the deflection scanning mechanism 20.

The deflection scanning mechanism 20 repeatedly swings the galvano-mirror 21 in the arrow directions g by the drive of the rotary drive section 23 through a rotating shaft 22. As a result, each combined laser beam $L_3$a or $L_3$b output from the polarization beam splitter 5 is used for the main scanning performed on the thermal recording medium 1 in the main scanning direction $Sm_1$ of the forward travel and in the main scanning direction $Sm_2$ of the backward travel in a reciprocating manner. An image of the combined laser beam $L_3$a or $L_3$b used by the deflection scanning mechanism 20 for the main scanning performed in a reciprocating manner is formed on the surface of the thermal recording medium 1 by a scanning lens 8.

That is, the image of the combined laser beam $L_3$a or $L_3$b is formed on the surface of the thermal recording medium 1 as a form in which a beam profile $Pf_1$ of each single mode laser beam $L_1$a or $L_1$b is superposed on a beam profile $Pf_2$ of each multimode laser beam $L_2$a or $L_2$b in the same manner as shown in, for example, FIGS. 10 and 11. The forward and backward scanning directions of the combined laser beam $L_3$a or $L_3$b coincide with the oblong shape longitudinal directions of the beam profile $Pf_2$ of each multimode laser beam $L_2$a or $L_2$b on the surface of the thermal recording medium 1.

Incidentally, the combining position of the beam spot of each single mode laser beam $L_1$a or $L_1$b in the beam profile $Pf_2$ of each multimode laser beam $L_2$a or $L_2$b is in the center thereof in the main scanning direction (scanning direction) on the thermal recording medium 1 as in the case shown in FIGS. 10 and 11.

First, the surface of the thermal recording medium 1 is irradiated singly with each multimode laser beam $L_2$a or $L_2$b. Then, the surface of the thermal recording medium 1 is irradiated with superposition of each multimode laser beam $L_2$a or $L_2$b and each single mode laser beam $L_1$a or $L_1$b. Then, the irradiation of each single mode laser beam $L_1$a or $L_1$b is terminated, and subsequently, the irradiation of each multimode laser beam $L_2$a or $L_2$b is terminated. As a result, as in the case described previously, information such as an image can be recorded on a part that has been irradiated with the superposition of each multimode laser beam $L_2$a or $L_2$b and each single mode laser beam $L_1$a or $L_1$b.

Then, in the main scanning direction $Sm_2$ of the backward travel, the surface of the thermal recording medium 1 is irradiated singly with each multimode laser beam $L_2$a or $L_2$b. Then, the surface of the thermal recording medium 1 is irradiated with superposition of each multimode laser beam $L_2$a or $L_2$b and each single mode laser beam $L_1$a or $L_1$b. Then, the irradiation of each single mode laser beam $L_1$a or $L_1$b is terminated, and subsequently, the irradiation of each multimode laser beam $L_2$a or $L_2$b is terminated. As a result, as in the case described previously, information such as an image can be recorded on a part that has been irradiated with the superposition of each multimode laser beam $L_2$a or $L_2$b and each single mode laser beam $L_1$a or $L_1$b.

As a result of this, it becomes possible to record information such as a character, a mark, a pattern, and the like on the thermal recording medium 1 simultaneously in two lines.

As described above, according to the fourth embodiment, a plurality of single mode semiconductor lasers 2, for example, two single mode semiconductor lasers 2*a* and 2*b* are provided, further a plurality of multimode semiconductor lasers 3, for example, two multimode semiconductor lasers 3*a* and 3*b* are provided, the main scanning is performed on the thermal recording medium 1 using the combined laser beams $L_3$a and $L_3$b in the main scanning direction $Sm_1$ of the forward travel and in the main scanning direction $Sm_2$ of the backward travel simultaneously and in a reciprocating manner by means of the galvano-mirror 21. As a result, it is possible to obtain the same advantage as the first embodiment, perform the main scanning on the thermal recording medium 1 by simultaneously using the respective combined laser beams $L_3$a and $L_3$b in parallel with the main scanning direction Sm, and record information such as a character, a mark, a pattern, and the like simultaneously in two lines.

Next, a fifth embodiment of the present invention will be described below with reference to the accompanying drawings. Incidentally, the same parts as those shown in FIG. 9 are denoted by the same reference symbols, and a detailed description of them is omitted.

Figure 14:
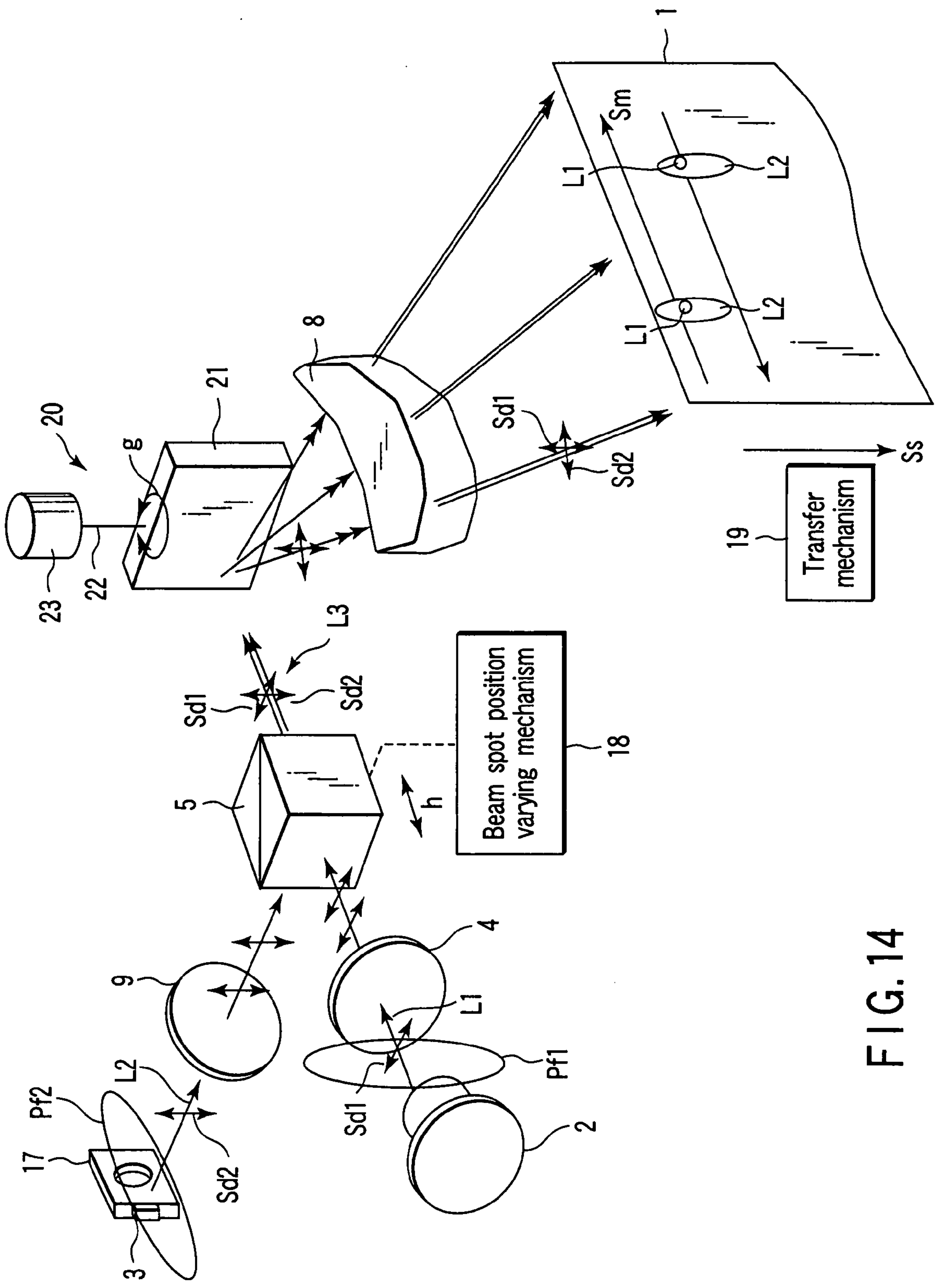
FIG. 14 is a configuration view showing a fifth embodiment of a contactless optical writing apparatus according to the present invention.

FIG. 14 shows a configuration view of a contactless optical writing apparatus. In the apparatus, the arrangement positions of the single mode semiconductor laser 2 and the multimode semiconductor laser 3 are replaced with each other, and the polarization direction $Sd_1$ of the single mode laser beam $L_1$ and the polarization direction $Sd_2$ of the multimode laser beam $L_2$ are also set to be replaced with each other. In accordance with the replacement of the arrangement positions of the single mode semiconductor laser 2 and the multimode semiconductor laser 3, the arrangement positions of the collimator lens 4 and the collimator lens 9 are also replaced with each other.

The junction plane direction of the pn junction plane in the single mode semiconductor laser 2 is arranged perpendicular to the direction of the rotating shaft 22 of the galvano-mirror 21. The polarization direction $Sd_1$ of the single mode laser beam $L_1$ output from the single mode semiconductor laser 2 is the same as the junction plane direction of the pn junction plane 14. As a result, the polarization direction $Sd_1$ of the single mode laser beam $L_1$ is perpendicular to the rotating shaft 22 of the galvano-mirror 21. The single mode laser beam $L_1$ output from a laser emitting section 13 of the single mode semiconductor laser 2 is of P-polarization with respect to the polarization beam splitter 5.

The junction plane direction of the pn junction plane 16 in the multimode semiconductor laser 3 is arranged parallel with the direction of the rotating shaft 22 of the galvano-mirror 21. The polarization direction $Sd_2$ of the multimode laser beam $L_2$ output from the multimode semiconductor laser 3 is the same as the junction plane direction of the pn junction plane 16. As a result, the polarization direction $Sd_2$ of the multimode laser beam $L_2$ is parallel with the rotation shaft 22 of the galvano-mirror 21. The multimode laser beam $L_2$ output from the multimode semiconductor laser 3 is of S-polarization with respect to the polarization beam splitter 5.

The polarization beam splitter 5 reflects the multimode laser beam $L_2$ output from the multimode semiconductor laser 3, transmits the single mode laser beam $L_1$ output from the single mode semiconductor laser 2, and outputs a combined laser beam $L_3$ obtained by combining the multimode laser beam $L_2$ and the single mode laser beam $L_1$ with each other.

A beam spot position varying mechanism 18 moves the polarization beam splitter 5 in the traveling direction h of the single mode laser beam $L_1$, or rotates the polarization beam splitter 5 around a rotating axis parallel with the vibration direction of the S-polarization. As a result, the beam spot position varying mechanism 18 varies the combining position of the single mode laser beam $L_1$ in the beam profile $Pf_2$ of the multimode laser beam $L_2$ on the thermal recording medium 1.

Figure 15:
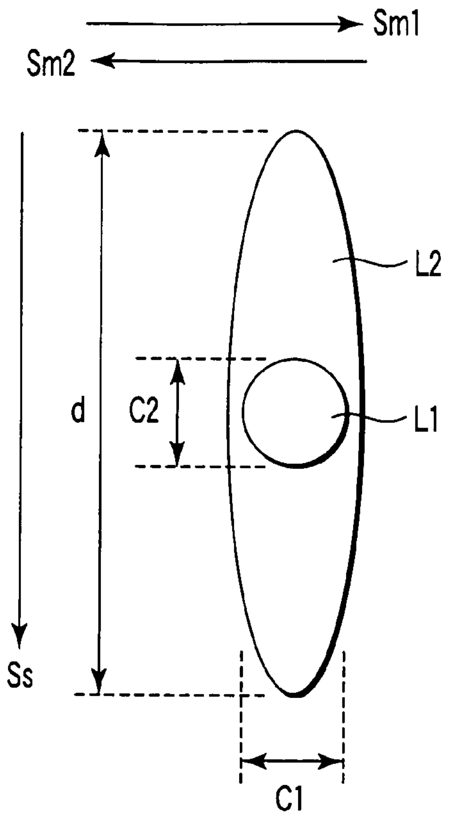
FIG. 15 is a view showing a beam profile of a laser beam formed by combining a single mode laser beam and a multimode laser beam with each other by the contactless optical writing apparatus on a thermal recording medium.
Figure 16:
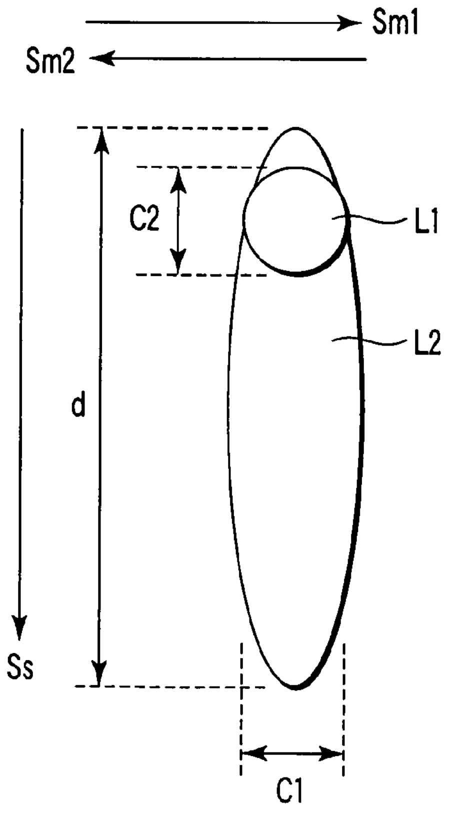
FIG. 16 is a view showing a beam profile of a laser beam formed by combining a single mode laser beam and a multimode laser beam with each other by the contactless optical writing apparatus on a thermal recording medium.

FIGS. 15 and 16 each show the combining position of the single mode laser beam $L_1$ in the oblong beam profile $Pf_2$ of the multimode laser beam $L_2$ on the thermal recording medium 1. FIG. 15 shows that the single mode laser beam $L_1$ having a circular beam profile $Pf_1$ is combined with the multimode laser beam $L_2$ at a position in the oblong beam profile $Pf_2$ of the multimode laser beam $L_2$ and in the center thereof in the main scanning direction Sm. FIG. 16 shows that the single mode laser beam $L_1$ having the circular beam profile $Pf_1$ is combined with the multimode laser beam $L_2$ at a position in the oblong beam profile $Pf_2$ of the multimode laser beam $L_2$ and on the rear side thereof in the sub-scanning direction Ss.

Next, the recording operation performed by the apparatus configured as described above will be described below.

The single mode semiconductor laser 2 outputs a single mode laser beam $L_1$. At the same time, the multimode semiconductor laser 3 outputs a multimode laser beam $L_2$. The polarization beam splitter 5 reflects the multimode laser beam $L_2$ output from the multimode semiconductor laser 3, transmits the single mode laser beam $L_1$ output from the single mode semiconductor laser 2, and outputs a combined laser beam $L_3$ obtained by combining the multimode laser beam $L_2$ and the single mode laser beam $L_1$ with each other.

A deflection scanning mechanism 20 performs the main scanning on the thermal recording medium 1 in the main scanning direction $Sm_1$ of the forward travel, and in the main scanning direction $Sm_2$ of the backward travel by using the combined laser beam $L_3$ in a reciprocating manner by repeatedly swinging the galvano-mirror 21 in the arrow directions g in a reciprocating manner. In this case, in the multimode semiconductor laser 3, the laser emitting section 15 is long in the direction parallel with the pn junction plane 16, and hence it is difficult to condense the multimode laser beam $L_2$. Thus, multimode laser beam $L_2$ is formed into an oblong beam profile $Pf_2$ on the thermal recording medium 1. The oblong shape longitudinal direction of the oblong beam profile $Pf_2$ of the multimode laser beam $L_2$ coincides with the sub-scanning direction Ss on the thermal recording medium 1.

However, the deflection scanning mechanism 20 performs the main scanning in the main scanning direction $Sm_1$ of the forward travel, and in the main scanning direction $Sm_2$ of the backward travel in a reciprocating manner by using the combined laser beam $L_3$. A transfer mechanism 19 transfers the thermal recording medium 1 in the sub-scanning direction at, for example, a constant transfer speed. As a result of this, information such as a character, a mark, a pattern, and the like is recorded on the entire surface of the thermal recording medium 1. The scanning direction of the sub-scanning direction Ss is identical with the upright shape longitudinal direction of the beam profile $Pf_2$ of the multimode laser beam $L_2$ included in the combined laser beam $L_3$. Incidentally, it is represented that the beam profile $Pf_2$ of the multimode laser beam $L_2$ is 'upright' or 'oblong' with respect to the main scanning direction $Sm_1$ or $Sm_2$ of the combined laser beam $L_3$.

As described above, according to the fifth embodiment, the arrangement positions of the single mode semiconductor laser 2 and the multimode semiconductor laser 3 are replaced with each other, and the polarization direction $Sd_1$ of the single mode laser beam $L_1$ and the polarization direction $Sd_2$ of the multimode laser beam $L_2$ are set to be replaced with each other. As a result of this, it is possible to obtain the same advantage as the first embodiment. Further, the combined laser beam $L_3$ is used to perform the main scanning in the main scanning direction $Sm_1$ of the forward travel, and in the main scanning direction $Sm_2$ of the backward travel in a reciprocating manner, and hence the speedup of recording of information on the entire surface of the thermal recording medium 1 can be more enhanced than in the first embodiment.

Next, a sixth embodiment of the present invention will be described below with reference to the accompanying drawings. Incidentally, the same parts as those shown in FIG. 1 are denoted by the same reference symbols, and a detailed description of them is omitted.

Figure 17:
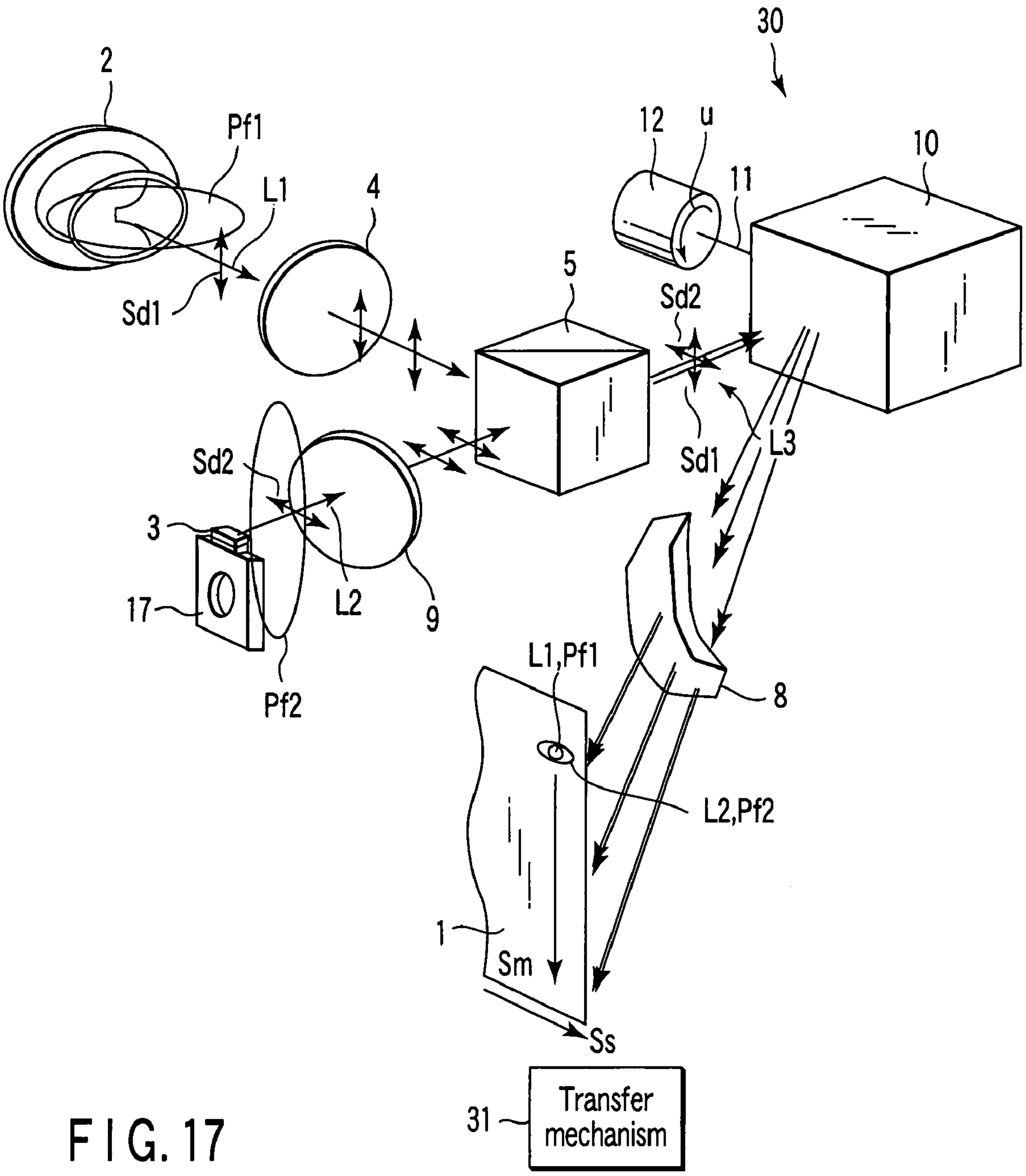
FIG. 17 is a configuration view showing a sixth embodiment of a contactless optical writing apparatus according to the present invention.

FIG. 17 shows a configuration view of a contactless optical writing apparatus. A deflection scanning mechanism 30 includes a polygon mirror 10, and a rotary drive section 12. The rotary drive section 12 is coupled to the polygon mirror 10 through a rotating shaft 11, and rotates the polygon mirror 10 in one direction, e.g., in the arrow direction u. The rotating shaft 11 of the polygon mirror 10 is provided at a position obtained by rotating the direction of the rotating shaft of the rotary drive section 12 in the first embodiment by an angle of, for example, 90° around the traveling direction of the combined laser beam $L_3$ output from the polarization beam splitter 5. As a result, the single mode semiconductor laser 2 is arranged in such a direction that the junction plane direction of the pn junction plane 14 of the laser emitting section 13 is perpendicular to the rotating shaft 11 of the polygon mirror 10. The multimode semiconductor laser 3 is arranged in such a manner that the junction plane direction of the pn junction plane 16 of the laser emitting region is parallel with the rotating shaft 11 of the polygon mirror 10.

The deflection scanning mechanism 30 performs the main scanning on the thermal recording medium 1 by using the combined laser beam $L_3$ output from the polarization beam splitter 5 by the rotation of the polygon mirror 10 in the arrow direction u. Incidentally, the main scanning direction Sm of the deflection scanning mechanism 30 is obtained by rotating the main scanning direction Sm of the deflection scanning mechanism 7 in the first embodiment by, for example, 90°. The multimode semiconductor laser 3 is set in such a direction that the polarization direction $Sd_2$ of the multimode laser beam $L_2$ is parallel with the direction of the rotating shaft 11 of the polygon mirror 10. As a result of this, the deflection scanning mechanism 30 performs the main scanning by using the combined laser beam $L_3$ in the rotating direction for example, 90° as the polarization direction $Sd_2$ of the multimode laser beam $L_2$.

A scanning lens 8 forms an image of the combined laser beam $L_3$ used by the deflection scanning mechanism 30 for the main scanning on the surface of the thermal recording medium 1. That is, the single mode laser beam $L_1$ and the multimode laser beam $L_2$ included in the combined laser beam $L_3$ are respectively condensed by the scanning lens 8. As a result, the image of the combined laser beam $L_3$ is formed on the thermal recording medium 1. The single mode laser beam $L_1$ included in the combined laser beam $L_3$ is formed as a circular beam profile $Pf_1$ on the thermal recording medium 1. The multimode laser beam $L_2$ is formed as an upright beam profile $Pf_2$ on the thermal recording medium 1.

A transfer mechanism 31 transfers the thermal recording medium 1 in the same direction as the sub-scanning direction Ss perpendicular to the main scanning direction Sm at, for example, a constant transfer speed.

Next, the recording operation performed by the apparatus configured as described above will be described below as to the point different from the first embodiment.

The deflection scanning mechanism 30 continuously rotates the polygon mirror 10 in the arrow direction u. As a result, the combined laser beam $L_3$ output from the polarization beam splitter 5 is used to perform the main scanning in the main scanning direction Sm on the thermal recording medium 1. Incidentally, the main scanning direction Sm of the combined laser beam $L_3$ is obtained by rotating the main scanning direction Sm of the deflection scanning mechanism 7 in the first embodiment by, for example, 90°.

The scanning lens 8 forms the image of the combined laser beam $L_3$ used by the deflection scanning mechanism 30 for the main scanning on the surface of the thermal recording medium 1. As a result, the image of the combined laser beam $L_3$ is formed on the thermal recording medium 1. The single mode laser beam $L_1$ included in the combined laser beam $L_3$ is formed as a circular beam profile $Pf_1$ on the thermal recording medium 1. The multimode laser beam $L_2$ is formed as an upright beam profile $Pf_2$ on the thermal recording medium 1.

At this time, the thermal recording medium 1 is transferred by the transfer mechanism 31 in the same direction as the sub-scanning direction Ss perpendicular to the main scanning direction Sm of the combined laser beam $L_3$ at, for example, a constant transfer speed.

When the surface of the thermal recording medium 1 is scanned by using the combined laser beam $L_3$, as in the case described above, first, the surface of the thermal recording medium 1 is irradiated singly with the multimode laser beam $L_2$. Then, the surface of the thermal recording medium 1 is irradiated with superposition of the multimode laser beam $L_2$ and the single mode laser beam $L_1$. Then, the irradiation of the single mode laser beam $L_1$ is terminated, and subsequently, the irradiation of the multimode laser beam $L_2$ is terminated. As a result, information such as an image can be recorded on a part that has been irradiated with the superposition of the multimode laser beam $L_2$ and the single mode laser beam $L_1$. As a result of this, it becomes possible to record information such as a character, a mark, a pattern, and the like on the thermal recording medium 1.

As described above, according to the sixth embodiment, the rotating shaft 11 of the polygon mirror 10 is provided at a position obtained by rotating the direction of the rotating shaft 11 of the rotary drive section 12 in the first embodiment around the traveling direction of the combined laser beam $L_3$ by an angle of, for example, 90°. As a result of this too, the sixth embodiment can obtain the same advantage as the first embodiment.

Next, a seventh embodiment of the present invention will be described below with reference to the accompanying drawings. Incidentally, the same parts as those shown in FIG. 1 are denoted by the same reference symbols, and a detailed description of them is omitted.

Figure 18:
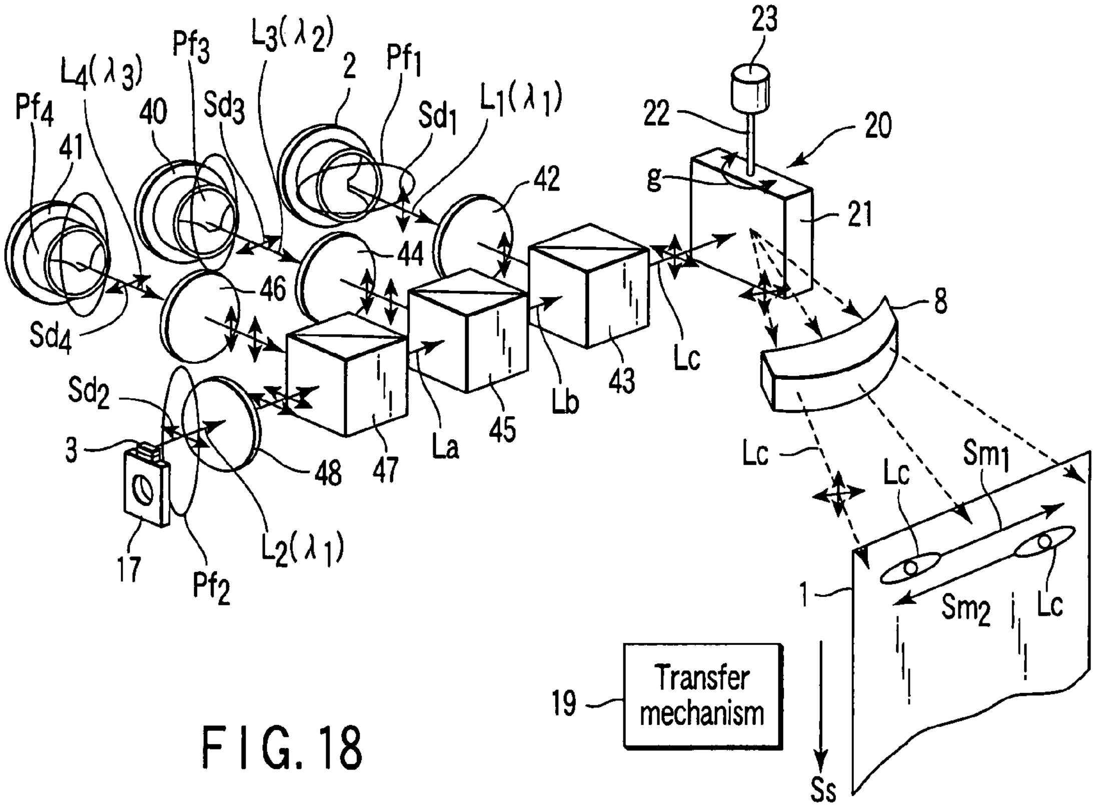
FIG. 18 is a configuration view showing a seventh embodiment of a contactless optical writing apparatus according to the present invention.

FIG. 18 shows a configuration view of a contactless optical writing apparatus. The apparatus comprises a single mode semiconductor laser 2 which is a first semiconductor laser serving as a light source for emitting a laser beam, a multimode semiconductor laser 3 which is a second semiconductor laser, a single mode semiconductor laser 40 which is a third semiconductor laser, and a single mode semiconductor laser 41 which is a fourth semiconductor laser.

Of these lasers, the single mode semiconductor laser 2 outputs a single mode laser beam $L_1$ having a wavelength of, for example, $\lambda_1$ (=808 nm). The multimode semiconductor laser 3 outputs a multimode laser beam $L_2$ having a wavelength of, for example, $\lambda_1$ (=808 nm).

The single mode semiconductor lasers 40 and 41 respectively outputs single mode laser beams $L_3$ and $L_4$ having wavelengths $\lambda_2$ and $\lambda_3$ in the near-infrared region. More specifically, the single mode semiconductor laser 40 outputs a single mode laser beam $L_3$ having an emission wavelength of, for example, $\lambda_2$ (=980 nm). The single mode semiconductor laser 41 outputs a single mode laser beam $L_4$ having an emission wavelength of, for example, $\lambda_3$ (=900 nm).

A collimator lens 42, a polarization beam splitter 43, a deflection scanning mechanism 20, and a scanning lens 8 are provided between the single mode semiconductor laser 2 and a thermal recording medium 1 along a laser light irradiation path.

A collimator lens 44, a dichroic prism 45 serving as a color composition element, a polarization beam splitter 45 serving as a color composition element, the deflection scanning mechanism 20, and the scanning lens 8 are provided between the single mode semiconductor laser 40 and the thermal recording medium 1 along the laser light irradiation path.

A collimator lens 46, two dichroic prisms 47 and 45 each serving as a color composition element, the polarization beam splitter 43, the deflection scanning mechanism 20, and the scanning lens 8 are provided between the single mode semiconductor laser 41 and the thermal recording medium 1 along the laser light irradiation path.

A collimator lens 48, the two dichroic prisms 47 and 45, the polarization beam splitter 43, the deflection scanning mechanism 20, and the scanning lens 8 are provided between the multimode semiconductor laser 3 and the thermal recording medium 1 along the laser light irradiation path.

The deflection scanning mechanism 20 includes a galvano-mirror 21 serving as a deflecting member, and a rotary drive section 23. The galvano-mirror 21 is coupled to the rotary drive section 23 through a rotating shaft 22. The rotary drive section 23 causes the galvano-mirror 21 to perform reciprocating motion in the arrow directions g through the rotating shaft 22.

The single mode semiconductor laser 2 has a pn junction plane (junction plane of active layers) 4 in the laser emitting section 13 thereof as in the case shown in FIG. 2. The single mode semiconductor laser 2 is arranged in such a manner that the junction plane direction of the pn junction plane 14 of the laser emitting section 13 is parallel with the rotating shaft 22 of the galvano-mirror 21. The polarization direction $Sd_1$ of the single mode laser beam $L_1$ is identical with the junction plane direction of the pm junction plane 14. As a result, the polarization direction of the single mode laser beam $L_1$ becomes perpendicular to the polarization beam splitter 43. Accordingly, the single mode laser beam $L_1$ emitted from the laser emitting section 13 of the single mode semiconductor laser 2 is of S-polarization. The light emitting region in the laser emitting section 13 is the same as that shown in FIG. 2, and hence a description thereof is omitted.

The multimode semiconductor laser 3 includes a pn junction plane 16 in the laser emitting section 15 thereof as in the case shown in FIG. 3. The multimode semiconductor laser 3 is so arranged as to allow the junction plane direction of the pn junction plane 16 of the light emitting region to be perpendicular to the rotating shaft 22 of the galvano-mirror 21. The polarization direction $Sd_2$ of the multimode laser beam $L_2$ is the same as the junction plane direction of the pn junction plane 16. As a result, the multimode laser beam $L_2$ emitted from the light emitting region of the multimode semiconductor laser 3 is of P-polarization. The light emitting region in the laser emitting section 15 is the same as that shown in FIG. 3, and hence a description thereof is omitted.

Each single mode semiconductor laser 40 or 41 has a laser emitting section 13 in which a pn junction plane 14 is formed. Each single mode semiconductor laser 40 or 41 is arranged such that the junction plane direction of the pn junction plane 14 of the laser emitting section 13 is perpendicular to the rotating shaft 22 of the galvano-mirror 21.

Each polarization direction $Sd_3$ or $Sd_4$ of each single mode laser beam $L_3$ or $L_4$ is the same direction as the junction plane direction of the pn junction plane 14. However, each polarization direction $Sd_3$ or $Sd_4$ of each single mode laser beam $L_3$ or $L_4$ is in the horizontal direction with respect to the polarization beam splitter 43. As a result, each single mode laser beam $L_3$ or $L_4$ is of P-polarization. Incidentally, each single mode laser beam $L_3$ or $L_4$ emitted from each laser emitting section 13 of each single mode semiconductor laser 40 or 41 spreads with a profile $Pf_3$ or $Pf_4$ as it advances as shown in FIG. 18. Each beam profile Pf3 or Pf4 has a Gaussian distribution.

A size of the light emitting region in each laser emitting section 13 of each single mode semiconductor laser 40 or 41 is, as in the case of the single mode semiconductor laser 2 shown in FIG. 2, about several μm in, for example, the junction plane direction $a_1$ of the pn junction plane 14 and in the direction $b_1$ perpendicular to the junction plane direction $a_1$. More specifically, as for the size of the light emitting region of the laser emitting section 13, for example, a1 in the junction plane direction is about 3 μm, and b1 in the direction perpendicular to the junction plane direction is about 1 μm.

The first collimator lens 42 is provided on the progression optical path of the single mode laser beam $L_1$ output from the single mode semiconductor laser 2. The first collimator lens 42 condenses the single mode laser beam $L_1$ output from the single mode semiconductor laser 2 into a substantially parallel light flux.

The second collimator lens 48 is provided on the progression optical path of the multimode laser beam $L_2$ output from the multimode semiconductor laser 3. The second collimator lens 48 condenses the multimode laser beam $L_2$ output from the multimode semiconductor laser 3 into a substantially parallel light flux.

The third collimator lens 44 is provided on the progression optical path of the single mode laser beam $L_3$ output from the single mode semiconductor laser 40. The third collimator lens 44 condenses the single mode laser beam $L_3$ output from the single mode semiconductor laser 40 into a substantially parallel light flux.

The fourth collimator lens 46 is provided on the progression optical path of the single mode laser beam $L_4$ output from the single mode semiconductor laser 41. The fourth collimator lens 46 condenses the single mode laser beam $L_4$ output from the single mode semiconductor laser 41 into a substantially parallel light flux.

Figure 19:
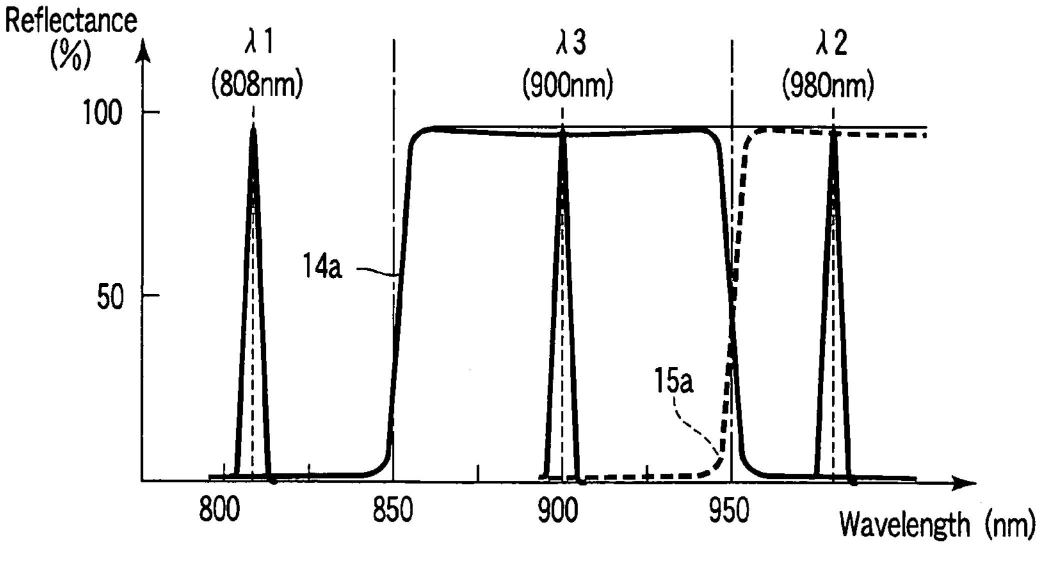
FIG. 19 is a graph showing a wavelength versus reflectance characteristic of a dichroic prism in the contactless optical writing apparatus.

The two dichroic prisms 47 and 45 each serving as a superposition optical system are provided on the progression optical path of the multimode laser beam $L_2$ output from the multimode semiconductor laser 3. FIG. 19 shows reflectance versus wavelength characteristics of the dichroic prisms 47 and 45. The dichroic prism 47 has a characteristic 14*a* in which the reflectance is high only in a region including a wavelength $\lambda_3$ (=900 nm). The dichroic prism 47 is provided at an intersection position at which the progression optical path of the multimode laser beam $L_2$ and the progression optical path of the single mode laser beam $L_4$ output from the single mode semiconductor laser 41 intersect each other. The dichroic prism 47 transmits the multimode laser beam $L_2$ having a wavelength $\lambda_1$ (=808 nm) and output from the multimode semiconductor laser 3, changes the direction of the single mode laser beam $L_4$ having a wavelength $\lambda_3$ (=900 nm) and output from the single mode semiconductor laser 41 by 90°, reflects the resultant single mode laser beam $L_4$, and outputs a laser beam $L_a$ formed by superposing the single mode laser beam $L_4$ on the multimode laser beam $L_2$.

The dichroic prism 45 has a characteristic 15*a* in which the reflectance is high only in a region including a wavelength $\lambda_2$ (=980 nm). The dichroic prism 45 is provided at an intersection position at which the progression optical path of the superposed laser beam $L_a$ output from the dichroic prism 47 and the progression optical path of the single mode laser beam $L_3$ output from the single mode semiconductor laser 40 intersect each other.

The dichroic prism 45 transmits the superposed laser beam $L_a$ having wavelengths $\lambda_1$ and $\lambda_3$ and output from the dichroic prism 47. At the same time, the dichroic prism 45 changes the direction of the single mode laser beam $L_3$ having a wavelength $\lambda_2$ (=980 nm) and output from the single mode semiconductor laser 40 by 90°, and reflects the resultant single mode laser beam $L_3$. As a result of this, the dichroic prism 45 outputs a laser beam $L_b$ formed by superposing the single mode laser beam $L_3$ on the superposed laser beam $L_a$.

The polarization beam splitter 43 is provided at an intersection position at which at which the progression optical path of the single mode laser beam $L_1$ output from the single mode semiconductor laser 2 and the progression optical path of the superposed laser beam $L_b$ output from the dichroic prism 45 intersect each other. The single mode laser beam $L_1$ output from the single mode semiconductor laser 2 and the superposed laser beam $L_b$ output from the dichroic prism 45 are made incident on the polarization beam splitter 43. The polarization beam splitter 43 changes the direction of the single mode laser beam $L_1$ which is output from the single mode semiconductor laser 2, and is of S-polarization by 90°, and reflects the resultant single mode laser beam $L_1$. At the same time, the polarization beam splitter 43 transmits the superposed laser beam $L_b$ output from the dichroic prism 45. As a result of this, the polarization beam splitter 43 combines the single mode laser beam $L_1$ and the superposed laser beam $L_b$ with each other, and outputs the resultant combined laser beam. Incidentally, the superposed laser beam $L_b$ is formed by superposing the multimode laser beam $L_2$ which is of P-polarization with respect to the polarization beam splitter 43, and the single mode laser beams $L_3$ and $L_4$ which are of S-polarization with respect to the polarization beam splitter 43 upon one another.

The deflection scanning mechanism 20 scans the thermal recording medium 1 in the main scanning directions $Sm_1$ and $Sm_2$ in a reciprocating manner by using the combined laser beam $L_c$ output from the polarization beam splitter 43 by the reciprocating motion of the galvano-mirror 21 in the arrow directions g. The multimode semiconductor laser 3 is set in such a direction that the polarization direction $Sd_2$ of the P-polarization of the multimode laser beam $L_2$ is perpendicular to the rotating shaft 22 of the galvano-mirror 21. As a result, the deflection scanning mechanism 20 performs the main scanning in a reciprocating manner by using the combined laser beam $L_c$ in the main scanning direction $Sm_1$ and the main scanning direction $Sm_2$ which coincide with the polarization direction $Sd_2$ of the multimode laser beam $L_2$.

The multimode semiconductor laser 3 is arranged in such a manner that the junction plane direction of the pn junction plane 16 of the laser emitting section 15 is parallel to the main scanning directions $Sm_1$ and $Sm_2$ of the combined laser beam $L_c$ used by the deflection scanning mechanism 20 in the scanning. The single mode semiconductor laser 2 is arranged in such a manner that the junction plane direction of the pn junction plane 14 is perpendicular to the junction plane direction of the pn junction plane 16 of the multimode semiconductor laser 3.

On the other hand, each single mode semiconductor laser 40 or 41 is arranged in such a manner that the junction plane direction of the pn junction plane 14 of the laser emitting section 13 is horizontal with respect to the main scanning directions $Sm_1$ and $Sm_2$ of the combined laser beam $L_c$ used by the deflection scanning mechanism 20 in the scanning.

The scanning lens 8 is provided in the main scanning directions $Sm_1$ and $Sm_2$ of the combined laser beam $L_c$ used by the deflection scanning mechanism 20. The scanning lens 8 forms an image of the combined laser beam $L_c$ used by the deflection scanning mechanism 20 for the main scanning on the surface of the thermal recording medium 1.

Figure 20:
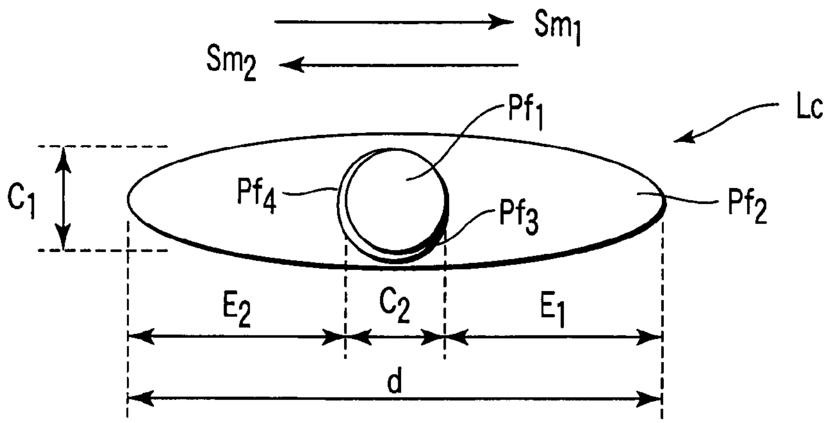
FIG. 20 is a view showing a beam profile of a combined laser beam formed on a thermal recording medium by the contactless optical writing apparatus.

FIG. 20 shows a beam profile of the combined laser beam $L_c$ formed on the thermal recording medium 1. The combined laser beam $L_c$ includes the laser beam $L_1$ having a circular beam profile $Pf_1$, the laser beam $L_2$ having an oblong beam profile $Pf_2$, the laser beam $L_3$ having a circular beam profile $Pf_3$, and the laser beam $L_4$ having a circular beam profile $Pf_4$. The laser beams $L_1$, $L_3$, and $L_4$ are each superposed on the oblong beam profile $Pf_2$. The position at which each of the laser beams $L_1$, $L_3$, and $L_4$ is superposed on the beam profile $Pf_2$ is, for example, approximately the center of the oblong beam profile $Pf_2$ of the laser beam $L_2$.

The laser emitting section 13 of each of the single mode semiconductor lasers 2, 40, and 41 has a length of only about several μm in each direction parallel to or perpendicular to the pn junction plane 14. Accordingly, it is easy to form each of the beam profiles $Pf_1$, $Pf_3$, and $Pf_4$ into a substantially circular shape by condensing each beam profile by means of the scanning lens 8.

Each of the single mode laser beams L1, L3, and L4 can be condensed into, for example, a substantially circular shape of about 100 μm (1/e2). On the other hand, as for the shape/size of the laser emitting section 15 of the multimode semiconductor laser 3, the length thereof in the direction parallel to the pn junction plane 16 is longer than that in the direction perpendicular to the pn junction plane 16 and, furthermore, is about 50 to 200 μm. As a result, it is difficult to condense the multimode laser beam $L_2$ into a substantially circular shape of the beam profile $Pf_2$ by means of the scanning lens 8. The multimode laser beam $L_2$ has an oblong shape elongated in the direction of the pn junction plane 16.

Accordingly, images of the multimode laser beam $L_2$ and the single mode laser beams $L_1$, $L_3$, and $L_4$ are formed on the surface of the thermal recording medium 1 as a form in which the substantially circular beam profiles $Pf_1$, $Pf_3$, and $Pf_4$ are superposed on the oblong beam profile $Pf_2$.

The deflection scanning mechanism 20 performs the main scanning by using the combined laser beam $L_c$ in the same direction as the polarization direction $Sd_2$ of the multimode laser beam $L_2$. As a result, the oblong shape longitudinal direction of the beam profile $Pf_2$ of the multimode laser beam $L_2$ coincides with the main scanning direction $Sm_1$ and the main scanning direction $Sm_2$ on the thermal recording medium 1. Incidentally, each of the single mode laser beams $L_1$, $L_3$, and $L_4$ is combined with the multimode laser beam $L_2$ at a position in the oblong beam profile $Pf_2$ of the multimode laser beam $L_2$ and in the center thereof. Incidentally, although the combining positions of the respective single mode laser beams $L_1$, $L_3$, and $L_4$ are made to coincide with each other, the combining positions are shifted from one another on the drawing for easy understanding of the superposition of the respective single mode laser beams $L_1$, $L_3$, and $L_4$.

The center (peak of power) of each of the single mode laser beams $L_1$, $L_3$, and $L_4$ coincides with the center (peak of power) of the multimode laser beam $L_2$. As long as the combined laser beam is a combination of such single mode laser beams $L_1$, $L_3$, and $L_4$, and such a multimode laser beam $L_2$, it is possible to improve the utilization efficiency of energy by causing the instantaneous power peaks of the respective single mode laser beam $L_1$, $L_3$, and $L_4$ and the instantaneous power peak of the multimode laser beam $L_2$ to coincide with one another. The combining position of each of the single mode laser beams $L_1$, $L_3$, and $L_4$ in the beam profile $Pf_2$ of the multimode laser beam $L_2$ is not limited to the center of the beam profile $Pf_2$, and may be varied depending on the recording conditions or environmental conditions.

Each of the substantially circular beam profiles $Pf_1$, $Pf_3$, and $Pf_4$ used in the scanning of the thermal recording medium 1 is formed into a shape in which both a beam diameter $c_1$ in the vertical direction and a beam diameter $c_2$ in the lateral direction are, for example, about 100 μm as shown in FIG. 20. The oblong beam profile $Pf_2$ is formed into a shape in which a beam length $c_1$ in the vertical direction is, for example, about 100 μm, and a beam length d in the lateral direction is, for example, a little over 1 mm.

Figure 21:
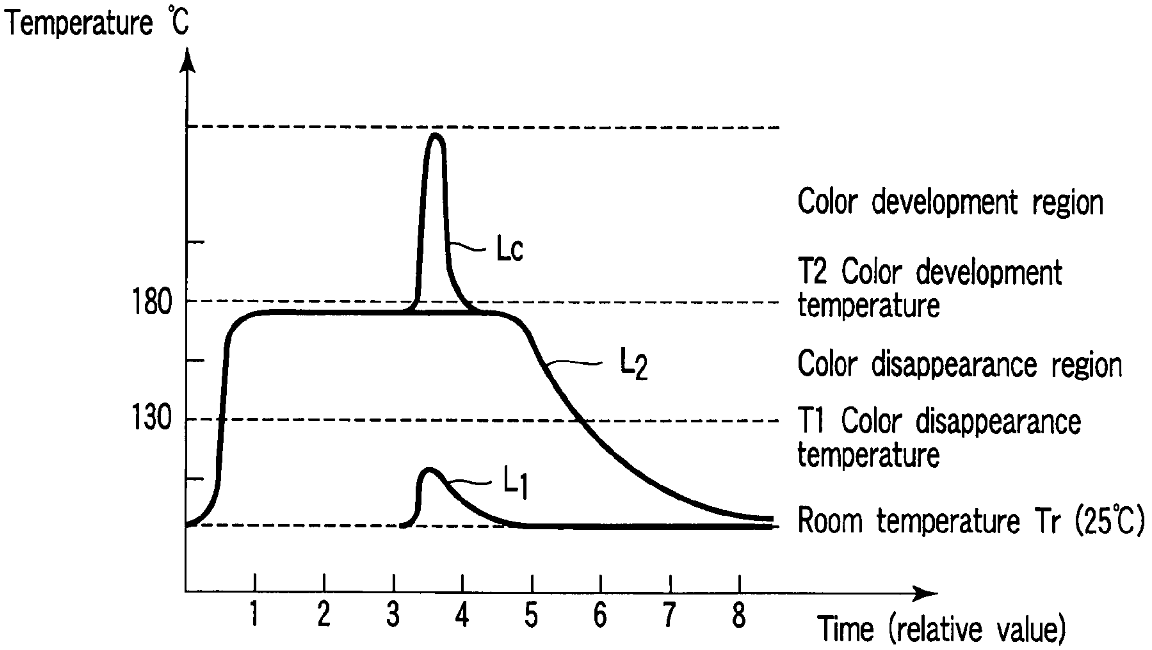
FIG. 21 is a graph showing a relationship between a medium temperature and color development/color disappearance obtained when the thermal recording medium is irradiated with the single mode laser beam and the multimode laser beam of the contactless optical writing apparatus.

FIG. 21 shows a relationship between the temperature on the thermal recording medium 1 and color development/color disappearance obtained when the thermal recording medium 1 is irradiated with the single mode laser beam $L_1$, multimode laser beam $L_2$, or combined laser beam $L_c$. The single mode laser beam $L_1$ has only output power capable of heating the printing layer of the thermal recording medium 1 up to a temperature equal to or lower than the color disappearance temperature $T_1$ when the thermal recording medium 1 is irradiated singly with the single mode laser beam $L_1$. As a result, the thermal recording medium 1 does not develop a color.

On the other hand, the multimode laser beam $L_2$ has output power capable of heating the printing layer of the thermal recording medium 1 up to the color disappearance temperature $T_1$, although the temperature $T_1$ is lower than the color development temperature $T_2$, when the thermal recording medium 1 is irradiated singly with the multimode laser beam $L_2$. As a result, the temperature rise obtained when the thermal recording medium is irradiated singly with the multimode laser beam $L_2$ is equal to or higher than the color disappearance temperature $T_1$ and equal to or lower than the color development temperature $T_2$, and the temperature of the thermal recording medium 1 is raised to the color disappearance region in which the developed color of the thermal recording medium 1 can be disappeared.

Then, when the thermal recording medium 1 is irradiated with the combined laser beam $L_c$ formed by combining each of the single mode laser beams $L_1$, $L_3$, and $L_4$ and the multimode laser beam $L_2$ with one another, the printing layer of the thermal recording medium 1 is further heated quickly from a state where it is heated up to the color disappearance temperature $T_1$ to the color development temperature $T_2$. As a result, by irradiating the thermal recording medium 1 with the combined laser beam $L_c$, it is made possible to raise the temperature of the thermal recording medium 1 to a temperature equal to or higher than the color development temperature $T_2$, and record information on the thermal recording medium 1. That is, combing each of the single mode laser beams $L_1$, $L_3$, and $L_4$ with the multimode laser beam $L_2$ enhances the recording power level.

Next, the recording operation performed by the apparatus configured as described above will be described below.

The single mode semiconductor laser 2 outputs a single mode laser beam $L_1$ having a wavelength $\lambda_1$ (=808 nm) from the laser emitting section 13. The single mode laser beam $L_1$ has a polarization direction $Sd_1$ in the same direction as the junction plane direction of the pn junction plane 14. The single mode laser beam $L_1$ is condensed into a substantially parallel light flux by the first collimator lens 42, and is made incident on the polarization beam splitter 43.

On the other hand, the multimode semiconductor laser 3 outputs a multimode laser beam $L_2$ having a wavelength $\lambda_1$ (=808 nm) from the laser emitting section 15. The multimode laser beam $L_2$ has a polarization direction $Sd_2$ in the same direction as the junction plane direction of the pn junction plane 16. The multimode laser beam $L_2$ is condensed into a substantially parallel light flux by the second collimator lens 48, and is made incident on the dichroic prism 47.

At the same time, the single mode semiconductor laser 40 outputs a single mode laser beam $L_3$ having a wavelength $\lambda_2$ (=980 nm) from the laser emitting section 13. The single mode laser beam $L_3$ has a polarization direction $Sd_3$ in the same direction as the junction plane direction of the pn junction plane 14. The single mode laser beam $L_3$ is condensed into a substantially parallel light flux by the third collimator lens 44, and is made incident on the dichroic prism 45.

The single mode semiconductor laser 41 outputs a single mode laser beam $L_4$ having a wavelength $\lambda_3$ (=900 nm) from the laser emitting section 13. The single mode laser beam $L_4$ has a polarization direction $Sd_4$ in the same direction as the junction plane direction of the pn junction plane 14. The single mode laser beam $L_4$ is condensed into a substantially parallel light flux by the fourth collimator lens 46, and is made incident on the dichroic prism 47.

The dichroic prism 47 transmits the multimode laser beam $L_2$ output from the multimode semiconductor laser 3, at the same time, reflects the single mode laser beam $L_4$ output from the single mode semiconductor laser 41, and outputs a laser beam $L_a$ obtained by superposing the single mode laser beam $L_4$ on the multimode laser beam $L_2$.

The dichroic prism 45 transmits the superposed laser beam $L_a$ output from the dichroic prism 47, reflects the single mode laser beam $L_3$ output from the single mode semiconductor laser 40, and outputs a laser beam $L_b$ obtained by superposing the single mode laser beam $L_3$ on the superposed laser beam $L_a$. As a result, the single mode laser beam $L_1$ output from the single mode semiconductor laser 2, and the laser beam $L_b$ output from the dichroic prism 45 are made incident on the polarization beam splitter 43.

The polarization beam splitter 43 reflects the single mode laser beams $L_1$, $L_3$, and $L_4$, and transmits the multimode laser beam $L_2$ as shown in, for example, FIG. 20. The combined laser beam $L_c$ output from the polarization beam splitter 43 is made incident on the deflection scanning mechanism 20.

The deflection scanning mechanism 20 continuously rotates the galvano-mirror 21 in a reciprocating manner in the arrow directions g by the drive of the rotary drive section 23 through the rotating shaft 22. As a result, the deflection scanning mechanism 20 performs the main scanning on the thermal recording medium 1 in the main scanning directions $Sm_1$ and $Sm_2$ by using the combined laser beam $L_c$ output from the polarization beam splitter 43.

The scanning lens 8 forms an image of the combined laser beam $L_c$ used by the deflection scanning mechanism 20 for the main scanning on the surface of the thermal recording medium 1. As a result, the image of the combined laser beam $L_c$ is formed on the surface of the thermal recording medium 1 as a form in which substantially circular beam profiles Pf1, Pf3, and Pf4 of the single mode laser beams $L_1$, $L_3$, and $L_4$ are superposed on an oblong beam profile $Pf_2$ of the multimode laser beam $L_2$ as shown in FIG. 20.

The rotating shaft 22 of the galvano-mirror 21 is provided parallel to each polarization direction $Sd_1$, $Sd_3$, or $Sd_4$ of each single mode laser beam $L_1$, $L_3$, or L4, and perpendicular to the polarization direction $Sd_2$ of the multimode laser beam $L_2$. As a result, the combined laser beam $L_c$ is used by the deflection scanning mechanism 20 to perform the main scanning in the same direction as the polarization direction $Sd_2$ of the multimode laser beam $L_2$, i.e., in the main scanning direction $Sm_1$ or $Sm_2$ which coincides with the oblong shape longitudinal direction of the multimode laser beam $L_2$ formed into an oblong beam profile $Pf_2$.

First, in the main scanning direction $Sm_1$ of the forward travel, a forward travel head region $E_1$ in the beam profile $Pf_2$ of the multimode laser beam $L_2$ included in the combined laser beam $L_c$ is irradiated singly as shown in FIG. 20. The forward travel head region $E_1$ is a region on the head side in the main scanning direction $Sm_1$ of the forward travel. Although the temperature on the surface of the thermal recording medium 1 observed when the medium 1 is irradiated singly with the multimode laser beam $L_2$ is equal to or lower than the color development temperature $T_2$ as shown in FIG. 21, the surface of the medium 1 is quickly heated up to the color disappearance temperature $T_1$, and hence the temperature is raised.

Then, the surface of the thermal recording medium 1 is irradiated with a combination of the multimode laser beam $L_2$ included in the combined laser beam $L_c$ and each of the single mode laser beams $L_1$, $L_3$, and $L_4$. As for the temperature on the surface of the thermal recording medium 1 at this time, the surface of the medium 1 is quickly heated up to the color development temperature $T_2$ from the state where the surface is heated up to the color disappearance temperature $T_1$, and hence the temperature on the surface of the medium 1 is raised. As a result, it becomes possible to record information on the thermal recording medium 1.

Then, the irradiation of the single mode laser beams $L_1$, $L_3$, and $L_4$ is terminated, and when the irradiation of the multimode laser beam $L_2$ is subsequently terminated, the printing layer of the thermal recording medium 1 is quickly cooled. As a result, a part of the printing layer of the thermal recording medium 1 irradiated singly with the multimode laser beam $L_2$ is color-disappeared if there is a black part already color-developed. Further, a part of the printing layer of the thermal recording medium 1 that has been irradiated with the combination of the multimode laser beam $L_2$ and the single mode laser beam $L_1$ is color-developed black.

Accordingly, by simultaneously turning on/off the output of the single mode laser beams $L_1$, $L_3$, and $L_4$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

Then, in the main scanning direction $Sm_2$ of the backward travel, the backward travel head region $E_2$ in the beam profile $Pf_2$ of the multimode laser beam $L_2$ included in the combined laser beam $L_c$ is singly irradiated as shown in FIG. 20. The backward travel head region $E_2$ is the region on the head side in the main scanning direction $Sm_2$ of the backward travel of the combined laser beam $L_c$. Although the temperature on the surface of the thermal recording medium 1 observed when the medium 1 is irradiated singly with the multimode laser beam $L_2$ is equal to or lower than the color development temperature $T_2$ as shown in FIG. 21, the thermal recording medium 1 is quickly heated up to the color disappearance temperature $T_1$, and the temperature is raised.

Then, the surface of the thermal recording medium 1 is irradiated with a combination of the multimode laser beam $L_2$ and the single mode laser beams $L_1$, $L_3$, and $L_4$ which are included in the combined laser beam $L_c$. The thermal recording medium 1 is further heated quickly up to the color development temperature $T_2$ from the state where the medium 1 is heated up to the color disappearance temperature $T_1$, and hence the temperature on the surface of the thermal recording medium 1 is raised at this time. As a result of this, it becomes possible to record information on the thermal recording medium 1.

Then, the irradiation of the single mode laser beams $L_1$, $L_3$, and $L_4$ is terminated, and subsequently, when the irradiation of the multimode laser beam $L_2$ is terminated, the printing layer of the thermal recording medium 1 is quickly cooled. As a result, a part of the printing layer of the thermal recording medium 1 already color-developed black and irradiated singly with the multimode laser beam $L_2$ is color-disappeared. Further, a part of the printing layer of the thermal recording medium 1 that has been irradiated with the combination of the multimode laser beam $L_2$ and the single mode laser beams $L_1$, $L_3$, and $L_4$ is color-developed black.

Accordingly, by turning on/off the output of the single mode laser beams $L_1$, $L_3$, and $L_4$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

As described above, according to the seventh embodiment, the single mode semiconductor laser 2 and the multimode semiconductor laser 3 both having the same wavelength $\lambda_1$ are provided, the single mode semiconductor lasers 40 and 41 respectively having wavelengths $\lambda_2$ and $\lambda_3$ which are different from the wavelength $\lambda_1$ are provided, the single mode laser beams $L_3$ and $L_4$, and the multimode laser beam $L_2$ are superposed upon one another by using the dichroic prisms 47 and 45, the superposed laser beam $L_b$ and the single mode laser beam $L_1$ are combined with each other by the polarization beam splitter 43, and the resultant combined laser beam $L_c$ is used by the deflection scanning mechanism 20 to perform the main scanning on the surface of the thermal recording medium 1.

As a result, superposing the single mode laser beams $L_1$, $L_3$, and $L_4$ on the multimode laser beam $L_2$ enables recording of high resolution. Power of the laser beam is effectively utilized, whereby deficiency of power at the time of recording information on the thermal recording medium 1 can be settled. A printing speed at the same level as that of, for example, a printer using a thermal head can be assured, and a speedup of the recording speed can be realized.

That is, by irradiating the thermal recording medium 1 with a multimode laser beam $L_2$ formed into an oblong beam profile $Pf_2$, the thermal recording medium 1 is heated in the color disappearance mode. In the state where the thermal recording medium 1 is heated in the color disappearance mode, the thermal recording medium 1 is irradiated with superposition of the single mode laser beams $L_1$, $L_3$, and $L_4$ which are formed into substantially circular beam profiles $Pf_1$, $Pf_3$, and $Pf_4$. As a result, the thermal recording medium 1 can be reliably heated in the color development mode. Recording of high resolution can be performed on the thermal recording medium 1.

Further, by irradiating the thermal recording medium 1 with the single mode laser beams $L_1$, $L_3$, and $L_4$, and the multimode laser beam $L_2$, heat is efficiently given to the thermal recording medium 1. Power of one single mode semiconductor laser 2 is small, and information such as an image cannot be recorded on the thermal recording medium 1 singly by the single mode semiconductor laser 2. The temperature of the thermal recording medium 1 can only be raised to the color disappearance region singly by one multimode semiconductor laser 3. Even under such conditions, for example, the single mode semiconductor lasers 40 and 41 are provided, the multimode laser beam $L_2$ and the single mode laser beams $L_1$, $L_3$, and $L_4$ are combined with one another, and the main scanning is performed on the thermal recording medium 1 by using the combined laser beam $L_c$. As a result, even when recording cannot be performed by singly using the single mode semiconductor laser 2, recording on the thermal recording medium 1 can be performed by the laser power obtained by, for example, combining the multimode laser beam $L_2$ and the single mode laser beams $L_1$, $L_3$, and $L_4$ with one another.

Superposing the single mode laser beam $L_1$, $L_3$, and $L_4$ on the multimode laser beam $L_2$ can be easily realized by using the dichroic prisms 47 and 45, and the polarization beam splitter 43.

Information and the like can be recorded on the thermal recording medium 1 in a contactless manner. As a result, the life of the thermal recording medium 1 can be remarkably prolonged. However, unlike the conventional case where a thermal head is used, and the thermal head is brought into contact with the thermal recording medium 1 at the time of recording, deterioration of the recording quality due to the contact of the thermal head with the thermal recording medium 1 is not caused. The problem of deficiency in the laser beam energy in the conventional laser writing system can be solved. Further, recording on the thermal recording medium 1 can be performed at a recording speed at the same level as the case where a line-type thermal head is used in recording.

The dichroic prisms 45 and 47, and the polarization beam splitter 43 are used by utilizing the difference in the polarization and wavelength to superpose the single mode laser beams $L_1$, $L_3$, and $L_4$ on the multimode laser beam $L_2$. Even when recording cannot be performed by singly using the single mode semiconductor laser 2, recording on the thermal recording medium 1 can be performed by the high laser power obtained by, for example, combining the multimode laser beam $L_2$ and the single mode laser beams $L_1$, $L_3$, and $L_4$ with one another. The problem of deficiency in energy in the single use of a laser beam can be solved.

Each of the single mode semiconductor lasers 2, 40, and 41 includes a laser emitting section 13 having a length of about several μm in each of directions parallel to and perpendicular to the pn junction plane 14. As a result, it is easy to condense the single mode laser beams $L_1$, $L_3$, and $L_4$. The single mode semiconductor lasers 2, 40, and 41 are suitably used for recording of information such as an image.

On the other hand, in the multimode semiconductor laser 3, the length of the laser emitting section in the direction parallel with the pn junction plane 16 is about 100 μ which is relatively long, and the multimode laser beam $L_2$ can hardly be condensed in the direction parallel to the pn junction plane 16 on the scanning surface. However, the multimode laser beam $L_2$ output from the multimode semiconductor laser 3 is formed into an oblong beam profile $Pf_2$ on the thermal recording medium 1. As a result, the multimode laser beam $L_2$ can be used for color disappearance and preheating. Thus, by effectively utilizing the merits of the single mode semiconductor lasers 2, 40, and 41, and the multimode semiconductor laser 3, it is possible to record information on the thermal recording medium 1.

The single mode laser beams $L_1$, $L_3$, and $L_4$, and the multimode laser beam $L_2$ each have substantially the same vertical beam length $c_1$ in the sub-scanning direction Ss. Each of the single mode laser beams $L_1$, $L_3$, and $L_4$ is combined with the multimode laser beam $L_2$ in the oblong beam profile $Pf_2$ of the multimode laser beam $L_2$ and at a position in the center thereof in the main scanning directions $Sm_1$ and $Sm_2$ as shown in FIG. 20. As a result, the power of the multimode laser beam $L_2$ can be effectively utilized.

When the surface of the thermal recording medium 1 is scanned, the surface of the thermal recording medium 1 is first irradiated singly with the multimode laser beam $L_2$. Then, the surface of the thermal recording medium 1 is irradiated with the superposition of the multimode laser beam $L_2$ and the single mode laser beams $L_1$, $L_3$, and $L_4$. Then, the irradiation of the single mode laser beams $L_1$, $L_3$, and $L_4$ is terminated, and subsequently, the irradiation of the multimode laser beam $L_2$ is terminated. As a result, information such as an image can be recorded on a part that has been irradiated with the superposition of the multimode laser beam $L_2$ and the single mode laser beams $L_1$, $L_3$, and $L_4$. Further, by irradiating the surface of the thermal recording medium 1 singly with the multimode laser beam $L_2$, the information on the surface of the thermal recording medium 1 can be erased. By irradiating the surface of the thermal recording medium 1 singly with the multimode laser beam $L_2$, and by subsequently irradiating the surface of the thermal recording medium 1 with the superposition of the multimode laser beam $L_2$ and the single mode laser beams $L_1$, $L_3$, and $L_4$, information on the surface of the thermal recording medium 1 can be erased, and new information can be recorded thereon. That is, information can be rewritten.

Further, when the surface of the thermal recording medium 1 is irradiated with only the multimode laser beam $L_2$, and is not irradiated with the combined laser beam obtained by combining the multimode laser beam $L_2$ and the single mode laser beams $L_1$, $L_3$, and L4 with one another, in formation on the surface of the thermal recording medium 1 can be erased.

Accordingly, when the surface of the thermal recording medium 1 is irradiated singly with the multimode laser beam $L_2$, information on the surface of the thermal recording medium 1 can be erased. When the surface of the thermal recording medium 1 is irradiated singly with the multimode laser beam $L_2$, and then, the surface of the thermal recording medium 1 is irradiated with the superposition of the multimode laser beam $L_2$ and the single mode laser beams $L_1$, $L_3$, and L4, information on the surface of the thermal recording medium 1 can be erased, and new information can be recorded thereon. That is, information can be rewritten.

Next, an eighth embodiment of the present invention will be described below with reference to the accompanying drawings. Incidentally, the same parts as those shown in FIG. 18 are denoted by the same reference symbols, and a detailed description of them is omitted.

Figure 22:
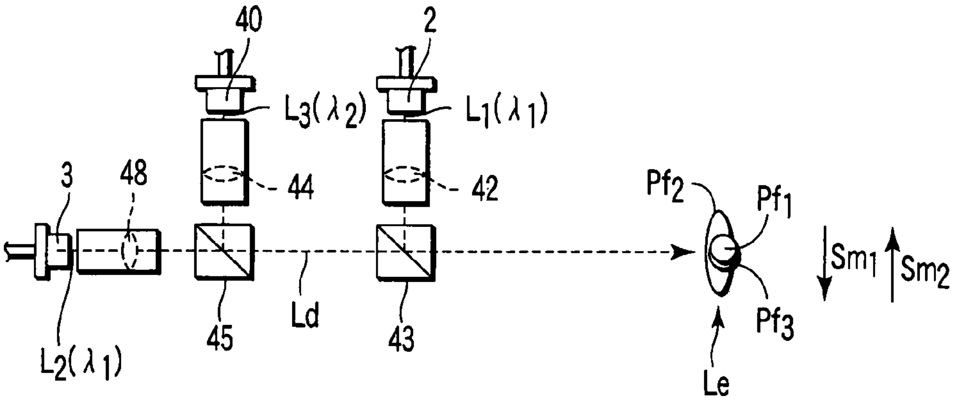
FIG. 22 is a configuration view showing an eighth embodiment of a contactless optical writing apparatus according to the present invention.

FIG. 22 shows a configuration view of a contactless optical writing apparatus. In FIG. 22, in order to clarify the configuration of the contactless optical writing apparatus, the thermal recording medium 1, scanning lens 8, transfer mechanism 19, and deflection scanning mechanism 7 in FIG. 1 are omitted from the drawing.

In this embodiment, two beams having wavelengths ($\lambda_1$, $\lambda_2$) are combined, and the configuration is that of the apparatus shown in FIG. 18 from which the single mode semiconductor laser 41, fourth collimator lens 46, and dichroic prism 47 are omitted.

Next, the recording operation performed by the apparatus configured as described above will be described below.

A single mode semiconductor laser 2 outputs a single mode laser beam $L_1$ having a wavelength $\lambda_1$ (=808 nm) from a laser emitting section 13. The single mode laser beam $L_1$ is condensed into a substantially parallel light flux by a first collimator lens 42, and is made incident on a polarization beam splitter 43.

On the other hand, a multimode semiconductor laser 3 outputs a multimode laser beam $L_2$ having a wavelength $\lambda_1$ (=808 nm) from a laser emitting section 15. The multimode laser beam $L_2$ is condensed into a substantially parallel light flux by a second collimator lens 48, and is made incident on a dichroic prism 45.

At the same time, a single mode semiconductor laser 40 outputs a single mode laser beam $L_3$ having a wavelength $\lambda_2$ (=980 nm) from a laser emitting section 13. The single mode laser beam $L_3$ is condensed into a substantially parallel light flux by a third collimator lens 44, and is made incident on the dichroic prism 45.

The dichroic prism 45 transmits the multimode laser beam $L_2$ output from the multimode semiconductor laser 3, reflects the single mode laser beam $L_3$ output from the single mode semiconductor laser 40, and outputs a laser beam $L_d$ obtained by superposing the single mode laser beam $L_3$ on the multimode laser beam $L_2$.

The single mode laser beam $L_1$ output from the single mode semiconductor laser 2 and the laser beam $L_d$ output from the dichroic prism 45 are made incident on the polarization beam splitter 43. The polarization beam splitter 43 reflects the single mode laser beam $L_1$, transmits the laser beam $L_d$, and outputs a combined laser $L_e$.

The deflection scanning mechanism 20 continuously turns a galvano-mirror 21 in the arrow directions f in a reciprocating manner by the drive of a rotary drive section 23 through a rotating shaft 22. As a result, the deflection scanning mechanism 20 performs the main scanning on the surface of the thermal recording medium 1 in the main scanning directions $Sm_1$ and $Sm_2$ by using the combined laser beam $L_e$ output from the polarization beam splitter 43.

A scanning lens 8 forms an image of the combined laser beam $L_e$ used by the deflection scanning mechanism 20 for the main scanning on the surface of the thermal recording medium 1. As a result, the image is formed on the surface of the thermal recording medium 1 as a form in which substantially circular beam profiles $Pf_1$ and $Pf_3$ of the single mode laser beams $L_1$ and $L_3$ are superposed on an oblong beam profile $Pf_2$ of the multimode laser beam $L_2$.

First, in the main scanning direction $Sm_1$ of the forward travel, a forward travel head region in the beam profile $Pf_2$ of the multimode laser beam $L_2$ included in the combined laser beam $L_e$ is singly irradiated. The temperature on the surface of the thermal recording medium 1 observed when the medium 1 is irradiated singly with the multimode laser beam $L_2$ is equal to or lower than the color development temperature $T_2$ as shown in FIG. 21, the thermal recording medium 1 is quickly heated up to the color disappearance temperature $T_1$, and hence the temperature is raised.

Then, the surface of the thermal recording medium 1 is irradiated with superposition of the multimode laser beam $L_2$ and the single mode laser beams $L_1$ and $L_3$ included in the combined laser beam $L_e$. The thermal recording medium 1 is further quickly heated up to the color development temperature $T_2$ from the state where it is heated up to the color disappearance temperature $T_1$, and hence the temperature on the surface of the thermal recording medium 1 observed at this time is raised. As a result, it becomes possible to record information on the thermal recording medium 1.

Then, the irradiation of the single mode laser beams $L_1$ and $L_3$ is terminated, and when the irradiation of the multimode laser beam $L_2$ is subsequently terminated, the printing layer of the thermal recording medium 1 is quickly cooled. As a result, a part of the printing layer of the thermal recording medium 1 irradiated singly with the multimode laser beam $L_2$ and is color-developed black is color-disappeared. Further, a part of the printing layer of the thermal recording medium 1 that has been irradiated with the superposition of the multimode laser beam $L_2$ and the single mode laser beams $L_1$ and $L_3$ is color-developed black.

Accordingly, by simultaneously turning on/off the output of the single mode laser beams $L_1$ and $L_3$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

Then, in the main scanning direction $Sm_2$ of the backward travel, the operation of recording information such as a character, a mark, a pattern, and the like on the thermal recording medium 1 is the same as that in the main scanning direction $Sm_1$ of the forward travel except for that what is first irradiated on the surface of the thermal recording medium is a backward head region in the beam profile $Pf_2$ of the multimode laser beam $L_2$ included in the combined laser beam $L_e$, and hence a description thereof is omitted.

As described above, according to the eighth embodiment, the single mode laser beam $L_3$ output from the single mode semiconductor laser 40 and the multimode laser beam $L_2$ output from the multimode semiconductor laser 3 both having the same wavelength $\lambda_1$ are combined with each other by the dichroic prism 45, the combined laser beam $L_d$ and the single mode laser beam $L_1$ are combined with each other by the polarization beam splitter 43, and the combined laser beam $L_e$ is used by the deflection scanning mechanism 20 to perform the main scanning on the surface of the thermal recording medium 1 in the main scanning directions $Sm_1$ and $Sm_2$.

As a result of this, in the eighth embodiment, as in the case of the seventh embodiment, superposing each of the single mode laser beams $L_1$ and $L_3$ on the multimode laser beam $L_2$ enables recording of high resolution. Power of the laser beam is effectively utilized, whereby deficiency of power at the time of recording information on the thermal recording medium 1 in a thermosensitive manner can be settled. A printing speed at the same level as that of, for example, a printer using a thermal head can be assured, and aspeedup of the recording speed can be realized.

Next, a ninth embodiment of the present invention will be described below with reference to the accompanying drawings. Incidentally, the same parts as those shown in FIG. 18 are denoted by the same reference symbols, and a detailed description of them is omitted.

Figure 23:
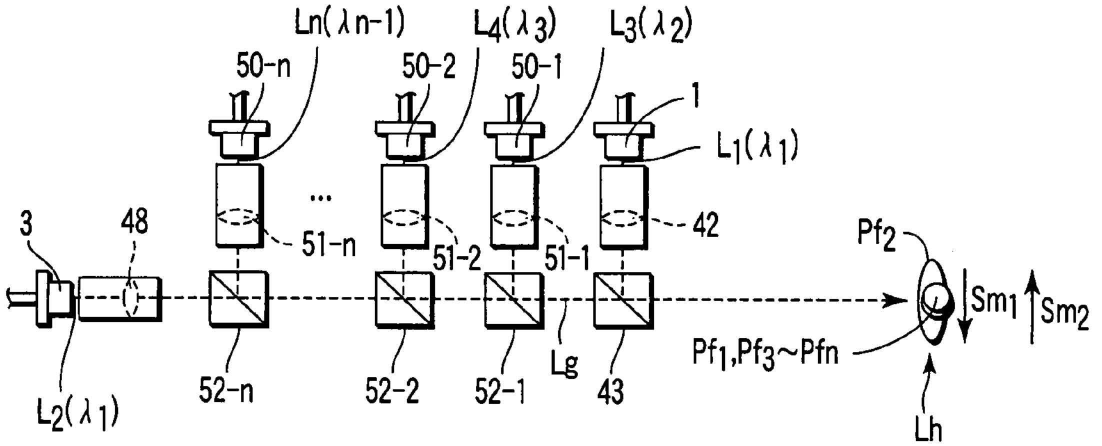
FIG. 23 is a configuration view showing a ninth embodiment of a contactless optical writing apparatus according to the present invention.

FIG. 23 shows a configuration view of a contactless optical writing apparatus. In FIG. 23, in order to clarify the configuration of the contactless optical writing apparatus, the thermal recording medium 1, scanning lens 8, transfer mechanism 19, and deflection scanning mechanism 20 in FIG. 18 are omitted from the drawing.

In this embodiment, a plurality of beams having wavelengths ($\lambda_1$ to $\lambda_{n-1}$) are combined, and a plurality of single mode semiconductor lasers 50-1 to 50-n are provided in the apparatus shown in FIG. 1. The respective single mode semiconductor lasers 50-1 to 50-n output single mode laser beams $L_3$ to $L_n$ having wavelengths $\lambda_2$ to $\lambda_{n-1}$ different from each other.

On the progression optical paths of the single mode laser beams $L_3$ to $L_n$ output from the respective single mode semiconductor lasers 50-1 to 50-n, dichroic prisms 52-1 to 52-n are provided through collimator lenses 51-1 to 51-n. The dichroic prism 52-1 has a characteristic in which the reflectance is high only in a region including a wavelength $\lambda_2$ (=980 nm). The dichroic prism 52-2 has a characteristic in which the reflectance is high only in a region including a wavelength $\lambda_3$ (=900 nm). Each of the dichroic prisms 52-1 to 52-*n* has a characteristic in which the reflectance is high only in a region including each of wavelengths $\lambda_3$ to $\lambda_{n-1}$.

Next, the recording operation performed by the apparatus configured as described above will be described below.

A single mode semiconductor laser 1 outputs a single mode laser beam $L_1$. The single mode laser beam $L_1$ is condensed into a substantially parallel light flux by a first collimator lens 42, and is made incident on a polarization beam splitter 43.

On the other hand, a multimode semiconductor laser 3 outputs a multimode laser beam $L_2$. The multimode laser beam $L_2$ is condensed into a substantially parallel light flux by a second collimator lens 48, and is made incident on the dichroic prism 52-n.

At the same time, the single mode semiconductor lasers 50-1 to 50-n output single mode laser beams $L_3$ to $L_n$ having different wavelengths $\lambda_2$ to $\lambda_{n-1}$ Each of the dichroic prisms 52-1 to 52-n transmits the multimode laser beam $L_2$ output from the multimode semiconductor laser 3 and superposes each of the single mode laser beams $L_3$ to $L_n$ output from each of the single mode semiconductor lasers 50-1 to 50-n on a laser beam incident thereon in the progression direction of the multimode laser beam $L_2$, and outputs the superposed laser beam $L_g$.

The single mode laser beam $L_1$ output from the single mode semiconductor laser 2 and the laser beam $L_g$ output from the dichroic prism 52-1 are made incident on a polarization beam splitter 43. At the same time, the polarization beam splitter 43 reflects the single mode laser beam $L_1$ and transmits the single mode laser beams $L_3$ to $L_n$ included in the laser beam $L_g$. At this time, the polarization beam splitter 43 combines the multimode laser beam $L_2$ and the single mode laser beams $L_1$ and $L_3$ to $L_n$ with one another, and outputs the combined laser beam $L_h$.

The deflection scanning mechanism 20 performs the main scanning on the thermal recording medium 1 in the main scanning directions $Sm_1$ and $Sm_2$ by using the combined laser beam $L_h$ output from the polarization beam splitter 43. As a result, information such as a character, a mark, a pattern, and the like is recorded on the thermal recording medium 1 as described previously.

The scanning lens 8 forms an image of the combined laser beam $L_h$ used by the deflection scanning mechanism 20 for the main scanning on the surface of the thermal recording medium 1. As a result, the image of the combined laser beam $L_h$ is formed on the surface of the thermal recording medium 1 as a form in which substantially circular beam profiles $Pf_1$, and $Pf_3$ to $Pf_n$ of the single mode laser beams $L_1$ and $L_3$ to $L_n$ are each superposed on an oblong beam profile $Pf_2$ of the multimode laser beam $L_2$.

First, in the main scanning direction Sm1 of the forward travel, a forward travel head region in the beam profile $Pf_2$ of the multimode laser beam $L_2$ included in the combined laser beam $L_h$ is irradiated singly. Although the temperature on the surface of the thermal recording medium 1 observed when the medium 1 is irradiated singly with the multimode laser beam $L_2$ is equal to or lower than the color development temperature $T_2$ as shown in FIG. 21, the surface of the medium 1 is quickly heated up to the color disappearance temperature $T_1$, and hence the temperature is raised.

Then, the surface of the thermal recording medium 1 is irradiated with a combination of the multimode laser beam $L_2$ included in the combined laser beam $L_h$ and each of the single mode laser beams $L_1$, and $L_3$ to $L_n$. As for the temperature on the surface of the thermal recording medium 1 at this time, the surface of the medium 1 is quickly heated up to a temperature equal to or higher than the color development temperature $T_2$ from the state where the surface is heated up to the color disappearance temperature $T_1$, and hence the temperature on the surface of the medium 1 is raised. As a result, it becomes possible to record information on the thermal recording medium 1.

Then, the irradiation of the single mode laser beams $L_1$, and $L_3$ to $L_n$ is terminated, and when the irradiation of the multimode laser beam $L_2$ is subsequently terminated, the printing layer of the thermal recording medium 1 is quickly cooled. As a result, a part of the printing layer of the thermal recording medium 1 irradiated singly with the multimode laser beam $L_2$ is color-disappeared if there is a black part already color-developed. Further, a part of the printing layer of the thermal recording medium 1 that has been irradiated with the combination of the multimode laser beam $L_2$ and the single mode laser beam $L_1$ is color-developed black.

Accordingly, by simultaneously turning on/off the output of the single mode laser beams $L_1$, and $L_3$ to $L_n$ in accordance with information such as a character, a mark, a pattern, and the like, it becomes possible to record information such as a character, a mark, a pattern, and the like on the thermal recording medium 1. The color to be developed on the thermal recording medium 1 is not limited to black, and an arbitrary color can be developed depending on the stain used.

Then, in the main scanning direction $Sm_2$ of the backward travel, the operation of recording information such as a character, a mark, a pattern, and the like on the thermal recording medium 1 is the same as that in the main scanning direction $Sm_1$ of the forward travel except for that what is first irradiated on the surface of the thermal recording medium is a backward head region in the beam profile $Pf_2$ of the multimode laser beam $L_2$ included in the combined laser beam $L_h$, and hence a description thereof is omitted.

As described above, according to the ninth embodiment, a plurality of single mode semiconductor lasers 50-1 to 50-n are provided, and a plurality of beams having wavelengths ($\lambda_1$ to $\lambda_{n-1}$) are combined with each other. As a result, as in the case of the seventh embodiment, superposing each of the single mode laser beams $L_1$ and $L_3$ on the multimode laser beam $L_2$ enables recording of high resolution. Power of the laser beam is effectively utilized, whereby deficiency of power at the time of recording information on the thermal recording medium 1 can be settled. A printing speed at the same level as that of, for example, a printer using a thermal head can be assured, and a speedup of the recording speed can be realized.

Next, a tenth embodiment of the present invention will be described below with reference to the accompanying drawings. Incidentally, the same parts as those shown in FIG. 18 are denoted by the same reference symbols, and a detailed description of them is omitted.

Figure 24:
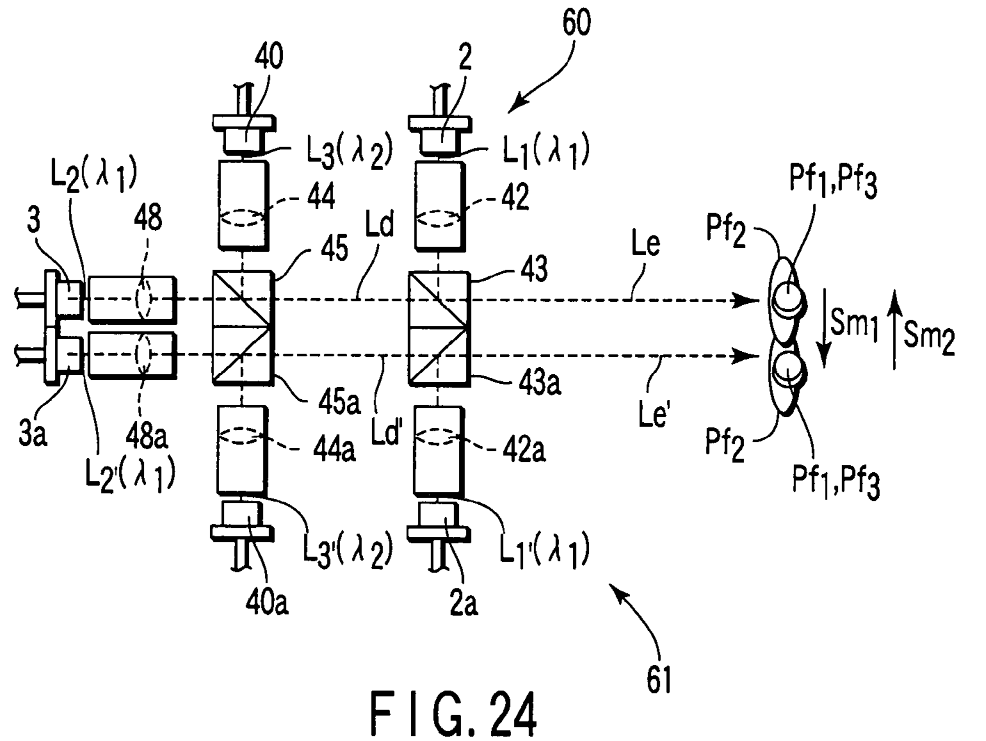
FIG. 24 is a configuration view showing a tenth embodiment of a contactless optical writing apparatus according to the present invention.

FIG. 24 shows a configuration view of a contactless optical writing apparatus. In FIG. 24, in order to clarify the configuration of the contactless optical writing apparatus, the thermal recording medium 1, scanning lens 8, transfer mechanism 19, and deflection scanning mechanism 20 in FIG. 18 are omitted from the drawing.

This embodiment has a configuration in which two semiconductor laser beam output systems 60 and 61 are provided in parallel with each other. The one semiconductor laser beam output system 60 has the same configuration as that of the contactless optical writing apparatus shown in FIG. 22. That is, the semiconductor laser beam output system 60 includes a single mode semiconductor laser 2, multimode semiconductor laser 3, single mode semiconductor laser 40, first collimator lens 42, second collimator lens 48, third collimator lens 44, dichroic prism 45, and polarization beam splitter 43.

The other semiconductor laser beam output system 61 also has the same configuration as that of the contactless optical writing apparatus shown in FIG. 22, and includes a single mode semiconductor laser 2*a*, multimode semiconductor laser 3*a*, single mode semiconductor laser 40*a*, first collimator lens 42*a*, second collimator lens 48*a*, third collimator lens 44*a*, dichroic prism 45*a*, and polarization beam splitter 43*a*.

The semiconductor laser beam output systems 60 and 61 are provided such that their optical axes are parallel to each other. That is, the two multimode semiconductor lasers 3 and 3*a* are arranged in such a manner that their output end sections outputting multimode laser beams $L_2$ and $L_2$' are disposed at the same position in parallel with each other. The multimode semiconductor lasers 3 and 3*a* are juxtaposed with each other such that optical axes of the multimode laser beams $L_2$ and $L_2$' each having a wavelength $\lambda_1$ output from the multimode semiconductor lasers 3 and 3*a* are parallel to each other.

The configuration of the one semiconductor laser beam output system 60 is as follows. The dichroic prism 45 is provided at an intersection position at which the optical path of the multimode laser beam $L_2$ output from the multimode semiconductor laser 3 and the optical path of the single mode laser beam $L_3$ output from the single mode semiconductor laser 40 intersect each other.

The polarization beam splitter 43 is provided at an intersection position at which the optical path of the multimode laser beam $L_2$ output from the multimode semiconductor laser 3 and the optical path of the single mode laser beam $L_1$ output from the single mode semiconductor laser 2 intersect each other.

The configuration of the other semiconductor laser beam output system 61 is as follows. The dichroic prism 45*a* is provided at an intersection position at which the optical path of the multimode laser beam L2' output from the multimode semiconductor laser 3*a* and the optical path of the single mode laser beam L3' output from the single mode semiconductor laser 40*a* intersect each other.

The polarization beam splitter 43*a* is provided at an intersection position at which the optical path of the multimode laser beam L2' output from the multimode semiconductor laser 3*a* and the optical path of the single mode laser beam L1' output from the single mode semiconductor laser 2*a* intersect each other.

However, the single mode semiconductor lasers 40 and 40*a* are arranged so as to be opposed to each other through the dichroic prisms 45 and 45*a*. The single mode semiconductor lasers 2 and 2$a$ are arranged so as to be opposed to each other through the dichroic prisms 43 and 43$a$.

Next, the recording operation performed by the apparatus configured as described above will be described below.

The one semiconductor laser beam output system 60 outputs a combined laser beam $L_e$ of two wavelengths $\lambda_1$ and $\lambda_2$ from the polarization beam splitter 43 as in the case of the contactless optical writing apparatus shown in FIG. 22. The combined laser beam $L_e$ is formed by combining the single mode laser beam $L_1$ with the laser beam $L_d$ formed by superposing the single mode laser beam $L_3$ on the multimode laser beam $L_2$.

The other semiconductor laser beam output system 61, as the one semiconductor laser beam output system 60, outputs a combined laser beam $L_e'$ of two wavelengths $\lambda_1$ and $\lambda_2$ from the polarization beam splitter 43$a$.The combined laser beam $L_e'$ is formed by combining the single mode laser beam $L_1'$ with the laser beam $L_d'$ formed by superposing the single mode laser beam $L_3'$ on the multimode laser beam $L_2'$.

The combined laser beams $L_e$ and $L_e'$ advance in parallel with each other.

The deflection scanning mechanism 20 continuously rotates the galvano-mirror 21 in a reciprocating manner in the arrow directions f by the drive of, for example, the rotary drive section 23 through the rotating shaft 22. As a result, the deflection scanning mechanism 20 performs the main scanning on the surface of thermal recording medium 1 in the main scanning directions $Sm_1$ and $Sm_2$ by using the combined laser beams $L_e$ and $L_e'$ output from the polarization beam splitters 43 and 43$a$, respectively. The scanning lens 8 forms images of the combined laser beams $L_e$ and $L_e'$ used by the deflection scanning mechanism 20 for the main scanning on the surface of the thermal recording medium 1.

Thus, the image of the combined laser beam $L_e$ is formed on the surface of the thermal recording medium 1 as a form in which substantially circular beam profiles $Pf_1$ and $Pf_3$ of the single mode laser beams $L_1$ and $L_3$ are superposed on an oblong beam profile $Pf_2$ of the multimode laser beam $L_2$.

The operation of recording information such as an image on the surface of the thermal recording medium 1 by performing the main scanning in the main scanning directions $Sm_1$ and $Sm_2$ using the combined laser beams $L_e$ and $L_e'$ is performed in the same manner as described above. That is, first, the surface of the thermal recording medium 1 is irradiated singly with the multimode laser beam $L_2$. Then, the surface of the thermal recording medium 1 is irradiated with superposition of the multimode laser beam $L_2$ and the single mode laser beams $L_1$ and $L_3$. Then, the irradiation of the single mode laser beams $L_1$ and $L_3$ is terminated. Subsequently, the irradiation of the multimode laser beam $L_2$ is terminated. As a result, information such as an image can be recorded on a part that has been irradiated with the superposition of the multimode laser beam $L_2$ and the single mode laser beams $L_1$ and $L_3$.

As described above, according to the tenth embodiment, the two semiconductor laser beam output systems 60 and 61 are provided in parallel with each other, and the main scanning is performed on the thermal recording medium 1 in the main scanning directions $Sm_1$ and $Sm_2$ by using the two combined laser beams $L_e$ and $L_e'$ having the two wavelengths. As a result, as in the case of the eighth embodiment, recording of high resolution is enabled. Power of the laser beam is effectively utilized, whereby deficiency of power at the time of recording information on the thermal recording medium 1 in a thermosensitive manner can be settled. A printing speed at the same level as that of, for example, a printer using a thermal head can be assured, and a speedup of the recording speed can be realized.

Next, an eleventh embodiment of the present invention will be described below with reference to the accompanying drawings. Incidentally, the same parts as those shown in FIG. 18 are denoted by the same reference symbols, and a detailed description of them are omitted.

Figure 25:
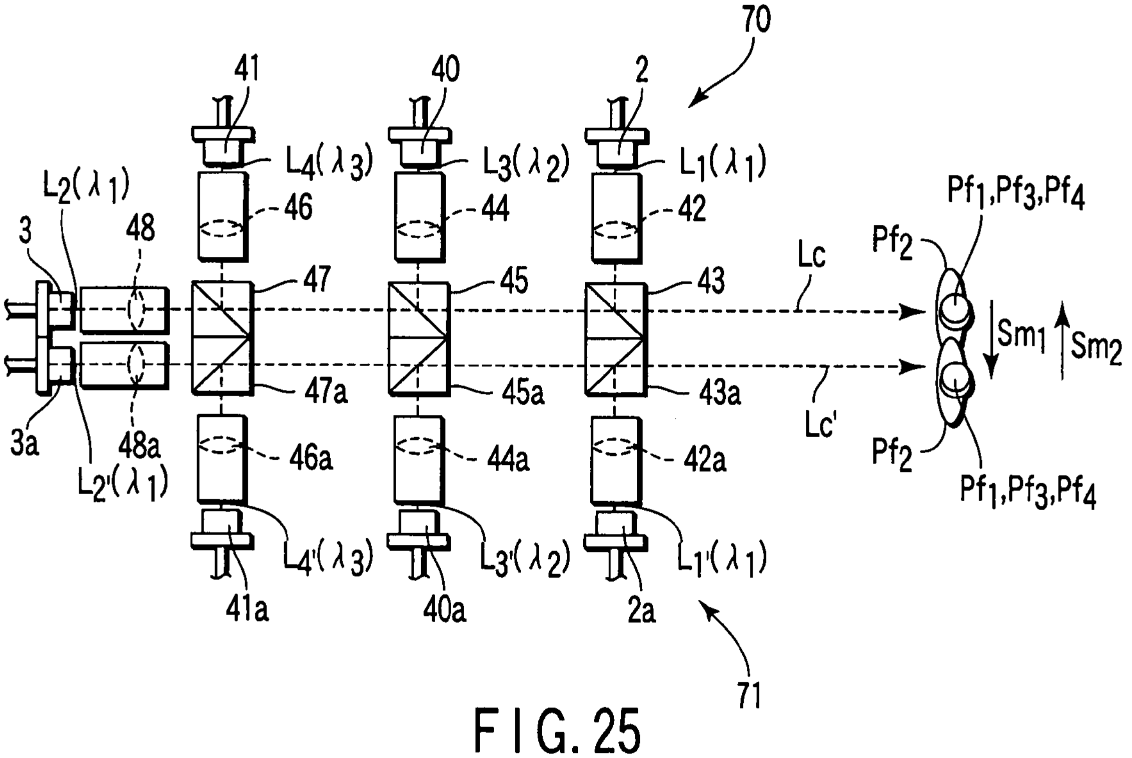
FIG. 25 is a configuration view showing an eleventh embodiment of a contactless optical writing apparatus according to the present invention.

FIG. 25 shows a configuration view of a contactless optical writing apparatus. In FIG. 25, in order to clarify the configuration of the contactless optical writing apparatus, the thermal recording medium 1, scanning lens 8, transfer mechanism 19, and deflection scanning mechanism 20 in FIG. 18 are omitted from the drawing.

This embodiment has a configuration in which two semiconductor laser beam output systems 70 and 71 are provided in parallel with each other. The one semiconductor laser beam output system 70 has the same configuration as that of the contactless optical writing apparatus shown in FIG. 18. That is, the semiconductor laser beam output system 70 includes a single mode semiconductor laser 2, a multimode semiconductor laser 3, single mode semiconductor lasers 40 and 41, a first collimator lens 42, a second collimator lens 48, a third collimator lens 44, a fourth collimator lens 46, dichroic prisms 47 and 45, and a polarization beam splitter 43.

The other semiconductor laser beam output system 71 also has the same configuration as that of the contactless optical writing apparatus shown in FIG. 18. That is, the other semiconductor laser beam output system 71 includes a single mode semiconductor laser 2$a$, a multimode semiconductor laser 3$a$, single mode semiconductor lasers 40$a$ and 41$a$, a first collimator lens 42$a$, a second collimator lens 48$a$, a third collimator lens 44$a$, a fourth collimator lens 46$a$, dichroic prisms 47$a$ and 45$a$, and a polarization beam splitter 43$a$.

The semiconductor laser beam output systems 70 and 71 are provided such that their optical axes are parallel to each other. That is, the two multimode semiconductor lasers 3 and 3$a$ are arranged in such a manner that their output end sections outputting multimode laser beams $L_2$ and $L_2'$ are disposed at the same position in parallel with each other. The multimode semiconductor lasers 3 and 3$a$ are juxtaposed with each other such that optical axes of the multimode laser beam $L_2$ and $L_2'$ each having a wavelength $\lambda_1$ output from the multimode semiconductor lasers 3 and 3$a$ are parallel to each other.

The configuration of the one semiconductor laser beam output system 70 is as follows. The dichroic prism 47 is provided at an intersection position at which the optical path of the multimode laser beam $L_2$ output from the multimode semiconductor laser 3 and the optical path of the single mode laser beam $L_4$ output from the single mode semiconductor laser 41 intersect each other.

The dichroic prism 45 is provided at an intersection position at which the optical path of the multimode laser beam $L_2$ output from the multimode semiconductor laser 3 and the optical path of the single mode laser beam L3 output from the single mode semiconductor laser 40 intersect each other.

The polarization beam splitter 43 is provided at an intersection position at which the optical path of the multimode laser beam $L_2$ output from the multimode semiconductor laser 3 and the optical path of the single mode laser beam $L_1$ output from the single mode semiconductor laser 2 intersect each other.

The configuration of the other semiconductor laser beam output system 71 is as follows. The dichroic prism 47$a$ is provided at an intersection position at which the optical path of the multimode laser beam $L_2'$ output from the multimode semiconductor laser 3$a$ and the optical path of the single mode laser beam $L_4$' output from the single mode semiconductor laser 41*a* intersect each other.

The dichroic prism 45*a* is provided at an intersection position at which the optical path of the multimode laser beam $L_2$' output from the multimode semiconductor laser 3*a* and the optical path of the single mode laser beam L3' output from the single mode semiconductor laser 40*a* intersect each other.

The polarization beam splitter 43*a* is provided at an intersection position at which the optical path of the multimode laser beam $L_2$' output from the multimode semiconductor laser 3*a* and the optical path of the single mode laser beam $L_1$' output from the single mode semiconductor laser 2*a* intersect each other.

However, the single mode semiconductor lasers 41 and 41*a* are arranged so as to be opposed to each other through the dichroic prisms 47 and 47*a*. The single mode semiconductor lasers 40 and 40*a* are arranged so as to be opposed to each other through the dichroic prisms 45 and 45*a*. The single mode semiconductor lasers 2 and 2*a* are arranged so as to be opposed to each other through the dichroic prisms 43 and 43*a*.

Next, the recording operation performed by the apparatus configured as described above will be described below.

The one semiconductor laser beam output system 70 outputs a combined laser beam $L_c$ of three wavelengths $\lambda_3$, $\lambda_2$, and $\lambda_1$ from the polarization beam splitter 43 as in the case of the contactless optical writing apparatus shown in FIG. 18. The combined laser beam $L_c$ is formed by combining each of the single mode laser beams $L_4$, $L_3$, and $L_1$ with the multimode laser beam $L_2$.

The other semiconductor laser beam output system 71, as the one semiconductor laser beam output system 70, outputs a combined laser beam $L_c$' of three wavelengths $\lambda_3$, $\lambda_2$, and $\lambda_1$ from the polarization beam splitter 43*a*. The combined laser beam $L_c$' is formed by combining each of the single mode laser beams $L_4$', $L_3$', and $L_1$' with the multimode laser beam $L_2$'.

The combined laser beams $L_c$ and $L_c$' advance in parallel with each other.

The deflection scanning mechanism 20 continuously rotates the galvano-mirror 21 in a reciprocating manner in the arrow directions f by the drive of, for example, the rotary drive section 23 through the rotating shaft 22. As a result, the deflection scanning mechanism 20 performs the main scanning on the surface of thermal recording medium 1 in the main scanning directions $Sm_1$ and $Sm_2$ by using the combined laser beams $L_c$ and $L_c$' output from the polarization beam splitters 43 and 43*a*, respectively. The scanning lens 8 forms images of the combined laser beams $L_c$ and $L_c$' used by the deflection scanning mechanism 20 for the main scanning on the surface of the thermal recording medium 1.

Thus, the image of the combined laser beam $L_c$ is formed on the surface of the thermal recording medium 1 as a form in which substantially circular beam profiles $Pf_4$, $Pf_3$, and $Pf_1$ of the single mode laser beams $L_4$, $L_3$, and $L_1$ are superposed on an oblong beam profile $Pf_2$ of the multimode laser beam $L_2$.

The operation of recording information such as an image on the surface of the thermal recording medium 1 by performing the main scanning in the main scanning directions $Sm_1$ and $Sm_2$ using the combined laser beams $L_c$ and $L_c$' is performed in the same manner as described above. That is, first, the surface of the thermal recording medium 1 is irradiated singly with the multimode laser beam $L_2$. Then, the surface of the thermal recording medium 1 is irradiated with superposition of the multimode laser beam $L_2$ and the single mode laser beams $L_4$, $L_3$, and $L_1$. Then, the irradiation of the single mode laser beams $L_4$, $L_3$, and $L_1$ is terminated. Subsequently, the irradiation of the multimode laser beam $L_2$ is terminated. As a result, information such as an image can be recorded on a part that has been irradiated with the superposition of the multimode laser beam $L_2$ and the single mode laser beams $L_4$, $L_3$, and $L_1$.

As described above, according to the eleventh embodiment, the two semiconductor laser beam output systems 70 and 71 are provided in parallel with each other, and the main scanning is performed on the thermal recording medium 1 in the main scanning directions $Sm_1$ and $Sm_2$ by using the two combined laser beams $L_c$ and $L_c$' having the three wavelengths. As a result, in the eleventh embodiment, as in the case of the seventh embodiment, recording of high resolution is enabled. Power of the laser beam is effectively utilized, whereby deficiency of power at the time of recording information on the thermal recording medium 1 in a thermosensitive manner can be settled. A printing speed at the same level as that of, for example, a printer using a thermal head can be assured, and a speedup of the recording speed can be realized.

Next, a twelfth embodiment of the present invention will be described below with reference to the accompanying drawings. Incidentally, the same parts as those shown in FIG. 18 are denoted by the same reference symbols, and a detailed description of them is omitted.

Figure 26:
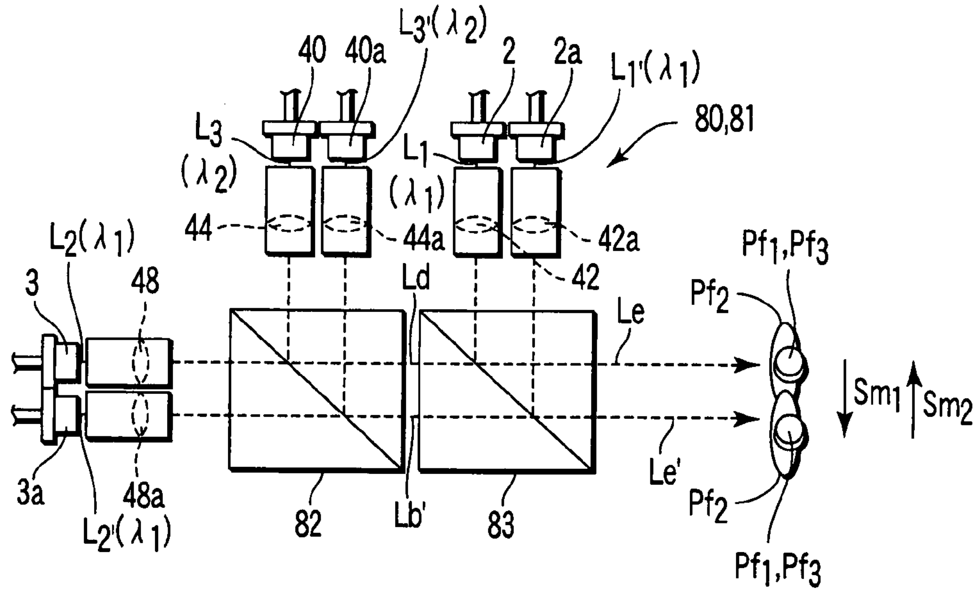
FIG. 26 is a configuration view showing a twelfth embodiment of a contactless optical writing apparatus according to the present invention.

FIG. 26 shows a configuration view of a contactless optical writing apparatus. In FIG. 26, in order to clarify the configuration of the contactless optical writing apparatus, the thermal recording medium 1, scanning lens 8, transfer mechanism 19, and deflection scanning mechanism 7 in FIG. 1 are omitted from the drawing.

This embodiment has a configuration in which two semiconductor laser beam output systems 80 and 81 are provided in parallel with each other. The one semiconductor laser beam output system 80 includes a single mode semiconductor laser 2, a multimode semiconductor laser 3, a single mode semiconductor laser 40, a first collimator lens 42, a second collimator lens 48, a third collimator lens 44, a dichroic prism 82, and a polarization beam splitter 83.

The other semiconductor laser beam output system 81 includes a single mode semiconductor laser 2*a*, a multimode semiconductor laser 3*a*, a single mode semiconductor laser 40*a*, a first collimator lens 42*a*, a second collimator lens 48*a*, a third collimator lens 44*a*, the dichroic prism 82, and the polarization beam splitter 83.

The semiconductor laser beam output systems 80 and 81 are provided such that their optical axes are parallel to each other. That is, the two multimode semiconductor lasers 3 and 3*a* are arranged in such a manner that their output end sections outputting multimode laser beams $L_2$ and $L_2$' are disposed at the same position in parallel with each other. The multimode semiconductor lasers 3 and 3*a* are juxtaposed with each other such that optical axes of the multimode laser beam $L_2$ and $L_2$' each having a wavelength $\lambda_1$ output from the multimode semiconductor lasers 3 and 3*a* are parallel to each other.

The dichroic prism 82 is shared by the two semiconductor laser beam output systems 80 and 81. That is, the multimode laser beams $L_2$ and $L_2$' output from the multimode semiconductor lasers 3 and 3*a*, and the single mode laser beams $L_3$' and $L_3$' output from the single mode semiconductor lasers 40 and 40*a* are made incident on the dichroic prism 82. The dichroic prism 82 is formed into such a size that the multimode laser beams $L_2$ and $L_2$', and the single mode laser beams $L_3$ and $L_3$' can be made incident thereon.

The dichroic prism 82 has a characteristic 15*a* in which the reflectance is high only in a region including a wavelength $\lambda_2$ (=980 nm). The dichroic prism 82 transmits the multimode laser beams $L_2$ and $L_2$' output from the multimode semiconductor lasers 3 and 3*a*. The dichroic prism 82 changes the direction of each of the single mode laser beams $L_3$ and $L_3$' output from the single mode semiconductor lasers 40 and 40*a* by 90°, and reflects the resultant single mode laser beams $L_3$ and $L_3$'. As a result, the dichroic prism 82 outputs a laser beam $L_d$ formed by superposing the single mode laser beam $L_3$ on the multimode laser beam $L_2$. At the same time, the dichroic prism 82 outputs a laser beam formed by superposing the single mode laser beam $L_3$' on the multimode laser beam $L_2$'.

The polarization beam splitter 83 is shared by the semiconductor laser beam output systems 80 and 81. That is, the single mode laser beams $L_1$ and $L_1$' parallel to each other output from the single mode semiconductor lasers 2 and 2*a*, and the laser beams $L_d$ and $L_d$' output from the dichroic prism 82 are made incident on the polarization beam splitter 83. The polarization beam splitter 83 is formed into such a size that the single mode laser beams $L_1$ and $L_1$', and the laser beams $L_d$ and $L_d$' can be made incident thereon.

The single mode laser beam $L_1$ and $L_1$' output from the single mode semiconductor lasers 2 and 2*a* are made incident on the polarization beam splitter 83, and the polarization beam splitter 83 changes the direction of each of the single mode laser beams $L_1$ and $L_1$' by 90°, and reflects the resultant single mode laser beams $L_1$ and $L_1$'. At the same time the laser beams $L_d$ and $L_d$' output from the dichroic prism 82 are made incident on the polarization beam splitter 83, and the polarization beam splitter 83 transmits the laser beams $L_d$ and $L_d$'. As a result, polarization beam splitter 83 combines each of the single mode laser beams $L_1$ and $L_1$' with each of the superposed laser beams $L_d$ and $L_d$', and outputs the resultant combined laser beams $L_e$ and $L_e$'.

Next, the recording operation performed by the apparatus configured as described above will be described below.

The single mode semiconductor lasers 2 and 2*a* output single mode laser beams $L_1$ and $L_1$' each having a wavelength $\lambda_1$ in parallel with each other. The single mode laser beams $L_1$ and $L_1$' are made incident on the polarization beam splitter 83.

On the other hand, the multimode semiconductor lasers 3 and 3*a* output multimode laser beams $L_2$ and $L_2$' each having a wavelength $\lambda_1$ in parallel with each other. The multimode laser beams $L_2$ and $L_2$' are made incident on the dichroic prism 82.

At the same time, the single mode semiconductor lasers 40 and 40*a* output single mode laser beams $L_3$ and $L_3$' each having a wavelength $\lambda_2$ in parallel with each other. The single mode laser beams $L_3$ and $L_3$' are made incident on the dichroic prism 82.

The dichroic prism 82 transmits the multimode laser beams $L_2$ and $L_2$' output from the multimode semiconductor lasers 3 and 3*a*, changes the direction of each of the single mode laser beams $L_3$ and $L_3$' output from the single mode semiconductor lasers 40 and 40*a* by 90°, and reflects the resultant single mode laser beams $L_3$ and $L_3$'. At this time, the dichroic prism 82 superposes the single mode laser beam $L_3$ on the multimode laser beam $L_2$, and outputs the resultant laser beam as a laser beam $L_d$. At the same time, the dichroic prism 82 superposes the single mode laser beam $L_3$' on the multimode laser beam $L_2$', and outputs the resultant laser beam as a laser beam $L_d$'.

The single mode laser beams $L_1$ and $L_1$' output from the single mode semiconductor lasers 2 and 2*a* and the laser beams $L_d$ and $L_d$' output from the dichroic prism 82 are made incident on the polarization beam splitter 83. The polarization beam splitter 83 changes the direction of the single mode laser beam $L_1$ output from the single mode semiconductor laser 2 by 90°, and reflects the resultant single mode laser beam $L_1$. At the same time, the polarization beam splitter 83 transmits the laser beam $L_d$ output from the dichroic prism 82. As a result, the polarization beam splitter 83 outputs s laser beam $L_e$ obtained by superposing the single mode laser beam $L_1$ on the laser beam $L_d$.

At the same time, the polarization beam splitter 83 changes the direction of the single mode laser beam $L_1$' output from the single mode semiconductor laser 2*a* by 90°, and reflects the resultant single mode laser beam $L_1$'. At the same time, the polarization beam splitter 83 transmits the laser beam $L_d$' output from the dichroic prism 82. As a result, the polarization beam splitter 83 outputs s laser beam $L_e$' obtained by superposing the single mode laser beam $L_1$' on the laser beam $L_d$'.

The deflection scanning mechanism 20 continuously rotates the galvano-mirror 21 in a reciprocating manner in the arrow directions f by the drive of, for example, the rotary drive section 23 through the rotating shaft 22. As a result, the deflection scanning mechanism 20 performs the main scanning on the surface of thermal recording medium 1 in the main scanning directions $Sm_1$ and $Sm_2$ by using the combined laser beams $L_e$ and $L_e$' output from the polarization beam splitter 83, respectively. The scanning lens 8 forms images of the combined laser beams $L_e$ and $L_e$' used by the deflection scanning mechanism 20 for the main scanning on the surface of the thermal recording medium 1.

Thus, the image of the combined laser beam $L_e$ is formed on the surface of the thermal recording medium 1 as a form in which substantially circular beam profiles $Pf_3$ and $Pf_1$ of the single mode laser beams $L_3$ and $L_1$ are superposed on an oblong beam profile $Pf_2$ of the multimode laser beam $L_2$.

The operation of recording information such as an image on the surface of the thermal recording medium 1 by performing the main scanning in the main scanning directions $Sm_1$ and $Sm_2$ using the combined laser beams $L_e$ and $L_e$' is performed in the same manner as described above. That is, first, the surface of the thermal recording medium 1 is irradiated singly with the multimode laser beam $L_2$. Then, the surface of the thermal recording medium 1 is irradiated with superposition of the multimode laser beam $L_2$ and the single mode laser beams $L_3$ and $L_1$. Then, the irradiation of the single mode laser beams $L_3$ and $L_1$ is terminated. Subsequently, the irradiation of the multimode laser beam $L_2$ is terminated. As a result, information such as an image can be recorded on a part that has been irradiated with the superposition of the multimode laser beam $L_2$ and the single mode laser beams $L_3$ and $L_1$.

As described above, according to the twelfth embodiment, the two semiconductor laser beam output systems 80 and 81 are provided in parallel with each other, and the main scanning is performed on the thermal recording medium 1 in the main scanning directions $Sm_1$ and $Sm_2$ by using the two combined laser beams $L_e$ and $L_e$' having the two wavelengths. As a result, in the twelfth embodiment, as in the case of the first embodiment, recording of high resolution is enabled. Power of the laser beam is effectively utilized, whereby deficiency of power at the time of recording information on the thermal recording medium 1 in a thermosensitive manner can be settled. A printing speed at the same level as that of, for example, a printer using a thermal head can be assured, and a speedup of the recording speed can be realized.

Next, a thirteenth embodiment of the present invention will be described below with reference to the accompanying drawings. Incidentally, the same parts as those shown in FIG. 26 are denoted by the same reference symbols, and a detailed description of them is omitted.

Figure 27:
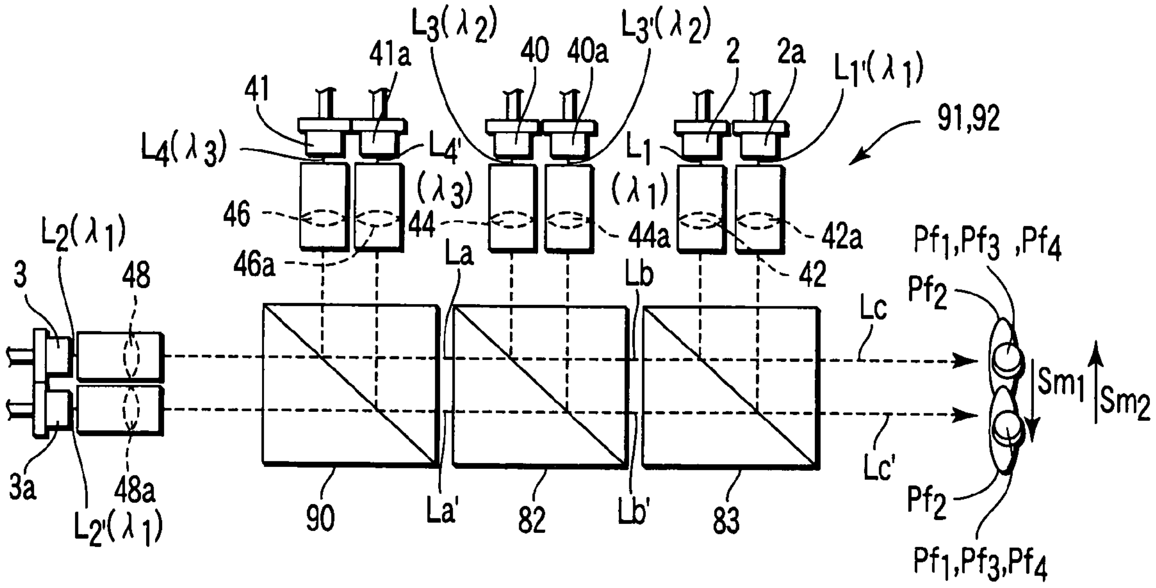
FIG. 27 is a configuration view showing a thirteenth embodiment of a contactless optical writing apparatus according to the present invention.

FIG. 27 shows a configuration view of a contactless optical writing apparatus. In FIG. 27, in order to clarify the configuration of the contactless optical writing apparatus, the thermal recording medium 1, scanning lens 8, transfer mechanism 19, and deflection scanning mechanism 20 in FIG. 18 are omitted from the drawing.

This embodiment has a configuration in which two single mode semiconductor lasers 41 and 41*a*, a fourth collimator lens 46 and 46*a*, and a dichroic prism 90 are added to the contactless optical writing apparatus shown in FIG. 26. Further, in this embodiment, two semiconductor laser beam output systems 91 and 92 are provided in parallel with each other.

The one semiconductor laser beam output system 91 includes a single mode semiconductor laser 2, a multimode semiconductor laser 3, two single mode semiconductor lasers 40 and 41, a first collimator lens 42, a second collimator lens 48, a third collimator lens 44, a fourth collimator lens 46, dichroic prisms 82 and 90, and a polarization beam splitter 83.

The other semiconductor laser beam output system 92 includes a single mode semiconductor laser 2*a*, a multimode semiconductor laser 3*a*, two single mode semiconductor lasers 40*a* and 41*a*, a first collimator lens 42*a*, a second collimator lens 48*a*, a third collimator lens 44*a*, a fourth collimator lens 46*a*, the dichroic prisms 82 and 90, and the polarization beam splitter 83.

The dichroic prisms 82 and 90, and the polarization beam splitter 83 are shared by the semiconductor laser beam output systems 91 and 92.

The single mode semiconductor lasers 41 and 41*a* are arranged in such a manner that their output end sections outputting single mode laser beams L4 and L4' are disposed at the same position in parallel with each other. The single mode semiconductor lasers 41 and 41*a* are juxtaposed with each other such that optical axes of the single mode laser beams L4 and L4' each having a wavelength $\lambda_3$ output from the single mode semiconductor lasers 41 and 41*a* are parallel to each other.

The dichroic prism 90 transmits multimode laser beams $L_2$ and $L_2'$ output from the multimode semiconductor lasers 3 and 3*a*. At the same time, the dichroic prism 90 changes the direction of each of the single mode laser beams $L_4$ and $L_4'$ output from the two single mode semiconductor lasers 41 and 41*a* by 90°, and reflects the resultant single mode laser beams $L_4$ and $L_4'$. As a result, the dichroic prism 90 superposes each of the single mode laser beams $L_4$ and $L_4'$ on each of the multimode laser beams $L_2$ and $L_2'$, and outputs the resultant laser beams $L_a$ and $L_a'$.

The dichroic prism 82 transmits the superposed laser beams $L_a$ and $L_a'$ output from the dichroic prism 90. The dichroic prism 82 changes the direction of each of the single mode laser beams $L_3$ and $L_3'$ output from the single mode semiconductor lasers 40 and 40*a* by 90°, and reflects the resultant single mode laser beams $L_3$ and $L_3'$. As a result, the dichroic prism 82 outputs a laser beam $L_b$ formed by superposing the single mode laser beam $L_3$ on the superposed laser beam $L_a$. At the same time, the dichroic prism 82 outputs a laser beam $L_b'$ formed by superposing the single mode laser beam $L_3'$ on the superposed laser beam $L_a'$.

The single mode laser beams $L_1$ and $L_1'$ output from the single mode semiconductor lasers 2 and 2*a* are made incident on the polarization beam splitter 83, the polarization beam splitter 83 changes the direction of each of the single mode laser beams $L_1$ and $L_1'$ by 90°, and reflects the resultant single mode laser beam $L_1$ and $L_1'$. At the same time, the laser beams $L_b$ and $L_b'$ output from the dichroic prism 82 are made incident on the polarization beam splitter 83, and the polarization beam splitter 83 transmits the laser beams $L_b$ and $L_b'$. As a result, the polarization beam splitter 83 combines each of the single mode laser beams $L_1$ and $L_1'$ and each of the laser beams $L_b$ and $L_b'$ with each other, and outputs the combined laser beams $L_c$ and $L_c'$.

Next, the recording operation performed by the apparatus configured as described above will be described below the multimode semiconductor lasers 3 and 3*a* output multimode laser beams $L_2$ and $L_2'$ each having a wavelength $\lambda_1$ in parallel with each other. The multimode laser beams $L_2$ and $L_2'$ are made incident on the dichroic prism 90.

The single mode semiconductor lasers 41 and 41*a* output single mode laser beams $L_4$ and $L_4'$ each having a wavelength $\lambda_3$ in parallel with each other. The single mode laser beams $L_4$ and $L_4'$ are made incident on the dichroic prism 90.

The dichroic prism 90 transmits the multimode laser beams $L_2$ and $L_2'$ output from the multimode semiconductor lasers 3 and 3*a*, changes the direction of each of the single mode laser beams $L_4$ and $L_4'$ output from the single mode semiconductor lasers 41 and 41*a* by 90°, and reflects the resultant single mode laser beams $L_4$ and $L_4'$. As a result, the dichroic prism 90 superposes each of the single mode laser beams $L_4$ and $L_4'$ on each of the multimode laser beams $L_2$ and $L_2'$, and outputs the resultant laser beams $L_a$ and $L_a'$.

Further, the single mode semiconductor lasers 40 and 40*a* output single mode laser beams $L_3$ and $L_3'$ each having a wavelength $\lambda_2$ in parallel with each other. The single mode laser beams $L_3$ and $L_3'$ are made incident on the dichroic prism 82.

The dichroic prism 82 transmits the laser beams $L_a$ and $L_a'$ output from the dichroic prism 90, at the same time, changes the direction of each of the single mode laser beams $L_3$ and $L_3'$ output from the single mode semiconductor lasers 40 and 40*a* by 90°, and reflects the resultant single mode laser beams $L_3$ and $L_3'$. As a result, the dichroic prism 82 outputs a laser beam $L_b$ formed by superposing the single mode laser beam $L_3$ on the laser beam $L_a$, and outputs a laser beam $L_b'$ formed by superposing the single mode laser beam $L_3'$ on the laser beam $L_a'$.

Further, the single mode semiconductor lasers 2 and 2*a* output single mode laser beams $L_1$ and $L_1'$ each having a wavelength $\lambda_1$ in parallel with each other. The single mode laser beams $L_1$ and $L_1'$ are made incident on the dichroic prism 83.

The single mode laser beams $L_1$ and $L_1'$ output from the single mode semiconductor lasers 2 and 2*a* are made incident on the polarization beam splitter 83, the polarization beam splitter 83 changes the direction of each of the single mode laser beams $L_1$ and $L_1'$ by 90°, and reflects the resultant single mode laser beams $L_1$ and $L_1'$. At the same time, the laser beams $L_b$ and $L_b'$ output from the dichroic prism 82 are made incident on the polarization beam splitter 83, and the polarization beam splitter 83 transmits the laser beams $L_b$ and $L_b'$. As a result, the polarization beam splitter 83 combines each of the single mode laser beams $L_1$ and $L_1'$ and each of the laser beams $L_b$ and $L_b'$ with each other, and outputs resultant laser beams $L_c$ and $L_c'$.

The deflection scanning mechanism 20 continuously rotates the galvano-mirror 21 in a reciprocating manner in the arrow directions f by the drive of, for example, the rotary drive section 23 through the rotating shaft 22. As a result, the deflection scanning mechanism 20 performs the main scanning on the surface of thermal recording medium 1 in the main scanning directions $Sm_1$ and $Sm_2$ by using the combined laser beams $L_c$ and $L_c'$ output from the polarization beam splitter 83, respectively. The scanning lens 8 forms images of the combined laser beams $L_c$ and $L_c'$ used by the deflection scanning mechanism 20 for the main scanning on the surface of the thermal recording medium 1.

Thus, the image of the combined laser beam $L_c$ is formed on the surface of the thermal recording medium 1 as a form in which substantially circular beam profiles $Pf_4$, $Pf_3$, and $Pf_1$ of the single mode laser beams $L_4$, $L_3$, and $L_1$ are superposed on an oblong beam profile $Pf_2$ of the multimode laser beam $L_2$.

The operation of recording information such as an image on the surface of the thermal recording medium 1 by performing the main scanning in the main scanning directions $Sm_1$ and $Sm_2$ using the combined laser beams $L_c$ and $L_c'$ is performed in the same manner as described above. That is, first, the surface of the thermal recording medium 1 is irradiated singly with the multimode laser beam $L_2$. Then, the surface of the thermal recording medium 1 is irradiated with superposition of the multimode laser beam $L_2$ and the single mode laser beams $L_4$, $L_3$, and $L_1$. Then, the irradiation of the single mode laser beams $L_4$, $L_3$, and $L_1$ is terminated. Subsequently, the irradiation of the multimode laser beam $L_2$ is terminated. As a result, information such as an image can be recorded on a part that has been irradiated with the superposition of the multimode laser beam $L_2$ and the single mode laser beams $L_4$, $L_3$, and $L_1$.

As described above, according to the thirteenth embodiment, the two semiconductor laser beam output systems 90 and 91 are provided in parallel with each other, and the main scanning is performed on the thermal recording medium 1 in the main scanning directions $Sm_1$ and $Sm_2$ by using the two combined laser beams $L_c$ and $L_c'$ having the three wavelengths. As a result, in the thirteenth embodiment, as in the case of the seventh embodiment, recording of high resolution is enabled. Power of the laser beam is effectively utilized, whereby deficiency of power at the time of recording information on the thermal recording medium 1 in a thermosensitive manner can be settled. A printing speed at the same level as that of, for example, a printer using a thermal head can be assured, and a speedup of the recording speed can be realized.

Next, a fourteenth embodiment of the present invention will be described below with reference to the accompanying drawings. Incidentally, the same parts as those shown in FIG. 18 are denoted by the same reference symbols, and a detailed description of them is omitted.

Figure 28:
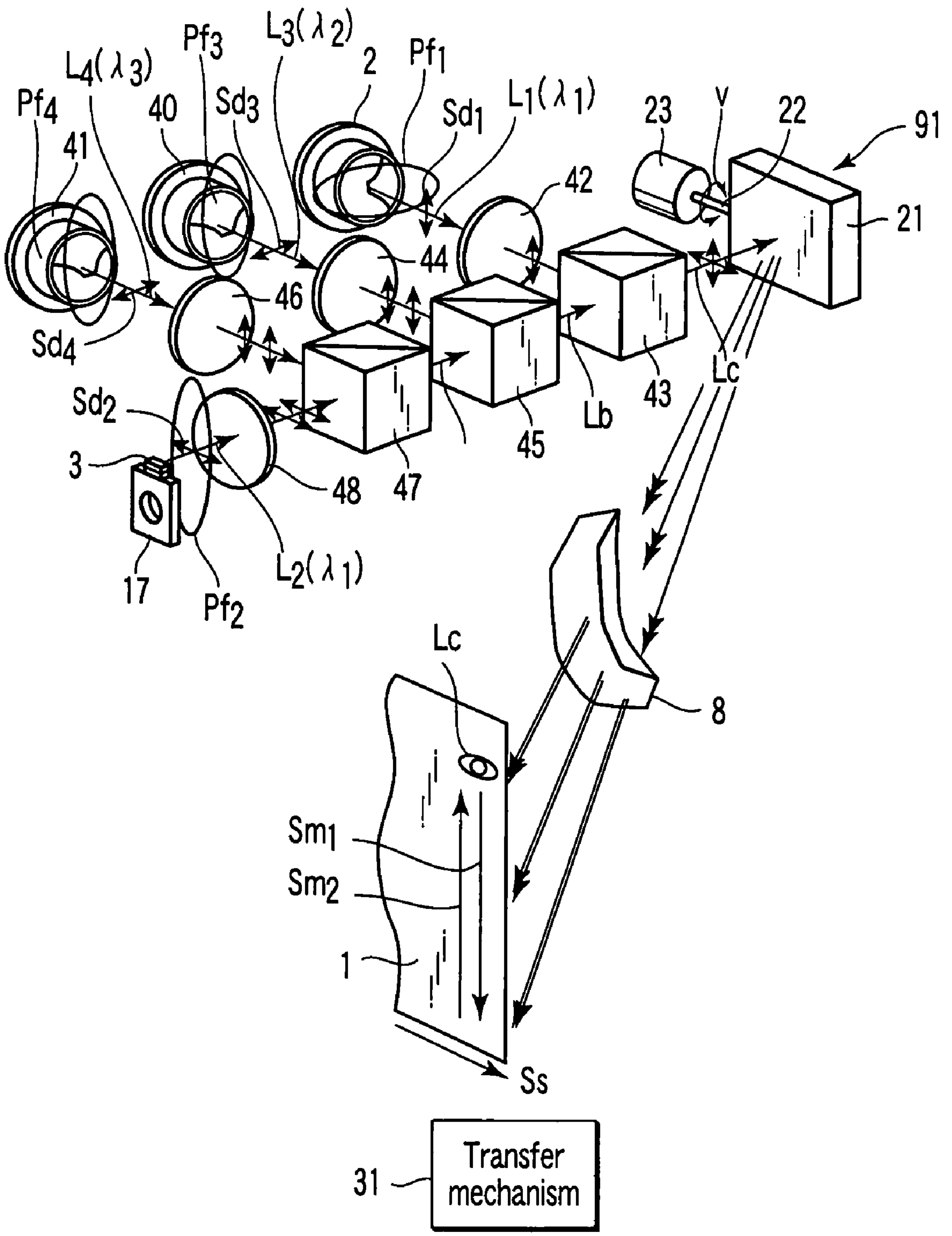
FIG. 28 is a configuration view showing a fourteenth embodiment of a contactless optical writing apparatus according to the present invention.

FIG. 28 shows a configuration view of a contactless optical writing apparatus. A deflection scanning mechanism 91 includes a galvano-mirror 21, a rotating shaft 22, and a rotary drive section 23. The rotating shaft 22 of the galvano-mirror 21 is provided at a position obtained by rotating the rotating shaft 22 of the rotary drive section 23 in the seventh embodiment shown in FIG. 18 by an angle of, for example, 90°. The rotational direction of the rotating shaft 22 is obtained by rotating the rotational direction in FIG. 18 around the progression direction of the combined laser beam $L_c$ output from the polarization beam splitter 43 by an angle of, for example, 90°. As a result, a single mode semiconductor laser 2 is arranged in such a manner that a junction plane direction of a pn junction plane 14 of the laser emitting section 13 is perpendicular to the rotating shaft 22 of the galvano-mirror 21. A multimode semiconductor laser 3 is arranged in such a manner that a junction plane direction of a pn junction plane 16 of the light emitting region is parallel with the rotating shaft 22 of the galvano-mirror 21.

The deflection scanning mechanism 91 performs the main scanning on the thermal recording medium 1 in the main scanning direction $Sm_1$ of the forward travel and in the main scanning direction Sm2 of the backward travel in a reciprocating manner using the combined laser beam $L_c$ by repeatedly swinging the galvano-mirror 21 in the arrow directions v in a reciprocating manner. The multimode semiconductor laser 3 is set in such a manner that the polarization direction $Sd_2$ of the multimode laser beam $L_2$ is parallel to the rotating shaft 22 of the galvano-mirror 21. As a result, the deflection scanning mechanism 91 performs the main scanning in a reciprocating manner in the main scanning directions $Sm_1$ and $Sm_2$ coinciding with the polarization direction $Sd_2$ of the multimode laser beam $L_2$ by using the combined laser beam $L_c$.

Then, the recording operation performed by the apparatus configured as described above will be described below as to the point different from the seventh embodiment described previously.

The deflection scanning mechanism 91 repeatedly swings the galvano-mirror 21 in a reciprocating manner in the arrow directions v. As a result, the combined laser beam $L_c$ is used to perform the main scanning in a reciprocating manner on the thermal recording medium 1 in the main scanning direction $Sm_1$ of the forward travel and in the main scanning direction $Sm_2$ of the backward travel. The scanning lens 8 forms an image of the combined laser beam $L_c$ used by the deflection scanning mechanism 91 for the main scanning on the surface of the thermal recording medium 1. As a result, images of the single mode laser beams $L_1$, $L_3$, and $L_4$ included in the combined laser beam $L_c$ are formed on the thermal recording medium 1 as circular beam profiles $Pf_1$, $Pf_3$, and $Pf_4$. An image of the multimode laser beam $L_2$ is formed on the thermal recording medium 1 as an upright beam profile $Pf_2$.

When the surface of the thermal recording medium 1 is scanned by using the combined laser beam $L_c$, as in the case described above, first, the surface of the thermal recording medium 1 is irradiated singly with the multimode laser beam $L_2$. Then, the surface of the thermal recording medium 1 is irradiated with superposition of the multimode laser beam $L_2$ and the single mode laser beams $L_1$, $L_3$, and $L_4$. Then, the irradiation of the single mode laser beams $L_1$, $L_3$, and $L_4$ is terminated and, subsequently, the irradiation of the multimode laser beam $L_2$ is terminated. As a result, information such as an image can be recorded on a part that has been irradiated with the superposition of the multimode laser beam $L_2$ and the single mode laser beams $L_1$, $L_3$, and $L_4$. As a result of this, it becomes possible to record information such as a character, a mark, a pattern, and the like on the thermal recording medium 1.

As described above, according to the fourteenth embodiment, the rotating shaft 22 of the galvano-mirror 21 is provided at a position obtained by the rotation by an angle of 90°. As a result of this too, the same advantage as the seventh embodiment can be obtained.

Next, a fifteenth embodiment of the present invention will be described below with reference to the accompanying drawings. Incidentally, the same parts as those shown in FIG. 18 are denoted by the same reference symbols, and a detailed description of them is omitted.

Figure 29:
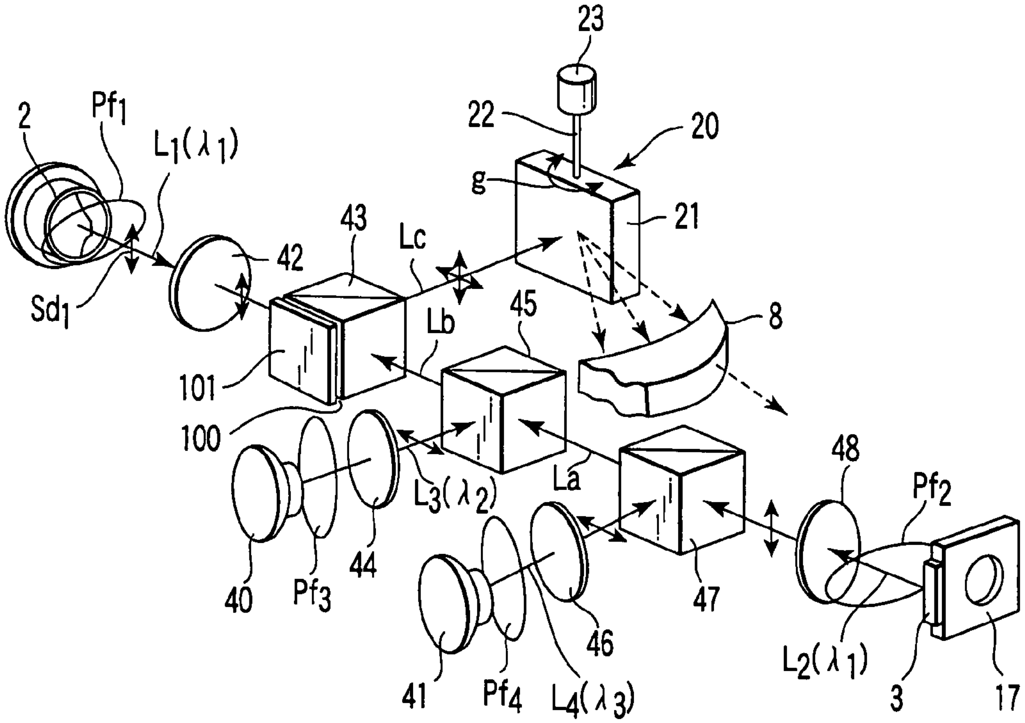
FIG. 29 is a configuration view showing a fifteenth embodiment of a contactless optical writing apparatus according to the present invention.

FIG. 29 shows a configuration view of a contactless optical writing apparatus. In this embodiment, all of the multimode semiconductor laser 3, the single mode semiconductor lasers 40 and 41, the collimator lenses 44 and 46, the dichroic prisms 45 and 47, and the collimator lens 48 shown in FIG. 18 are arranged so as to allow them to be opposed to the single mode semiconductor laser 2 through the polarization beam splitter 43.

The single mode semiconductor laser 2 is arranged in such a manner that the junction plane direction of the pn junction plane 14 of the laser emitting section 13 is parallel to the rotating shaft 22 of the galvano-mirror 21. The polarization direction $Sd_1$ of the single mode laser beam $L_1$ output from the single mode semiconductor laser 2 is parallel to the junction plane direction of the pn junction plane 14. The polarization direction $Sd_1$ of the single mode laser beam $L_1$ is vertical to the polarization beam splitter 43. As a result, the single mode laser beam $L_1$ is of s-polarization with respect to the polarization beam splitter 43.

The polarization direction $Sd_2$ of the multimode laser beam $L_2$ is the same as the junction plane direction of the pn junction plane 16. The polarization direction $Sd_2$ of the multimode laser beam $L_2$ is parallel to the rotating shaft 22 of the galvano-mirror 21. The polarization direction $Sd_2$ of the multimode laser beam $L_2$ is horizontal direction to the polarization beam splitter 5. Accordingly, the multimode laser beam $L_2$ is of s-polarization with respect to the polarization beam splitter 5.

The polarization beam splitter 43 is provided with a λ/2 reflecting plate 100, and a reflecting plate 101. The polarization beam splitter 43 changes the progression direction of the single mode laser beam $L_1$ of P-polarization output from the single mode semiconductor laser 2 by 90°, and reflects the resultant single mode laser beam $L_1$. At the same time, the polarization beam splitter 43 changes the progression direction of the superposed laser beam $L_b$ output from the dichroic prism 45 by 90°, and reflects the resultant laser beam $L_b$ to the λ/2 reflecting plate 100 side and the reflecting plate 101 side. As a result, the superposed laser beam $L_b$ is transmitted through the λ/2 reflecting plate 100, reflected by the reflecting plate 101, and transmitted through the λ/2 reflecting plate 100 again. As a result, the phase of the superposed laser beam $L_b$ is rotated by 90°, becomes horizontally polarized light. And the phase of the superposed laser beam $L_b$ is of p-polarization with respect to the polarization beam splitter 5. However, the superposed laser beam $L_b$ is transmitted through the polarization beam splitter 43. As a result, the single mode laser beam $L_1$ is superposed on the superposed laser beam $L_b$. The polarization beam splitter 43 combines the single mode laser beam $L_1$ and the superposed laser beam $L_b$ with each other, and outputs the resultant laser beam.

The deflection scanning mechanism 20 continuously rotates the galvano-mirror 21 in a reciprocating manner in the arrow directions g by the drive of the rotary drive section 23 through the rotating shaft 22. As a result, the deflection scanning mechanism 20 performs the main scanning on the thermal recording medium 1 in the main scanning directions $Sm_1$ and $Sm_2$ by using the combined laser beam $L_c$ output from the polarization beam splitter 43.

The scanning lens 8 forms an image of the combined laser beams $L_c$ used by the deflection scanning mechanism 20 for the main scanning on the surface of the thermal recording medium 1. Thus, the image of the combined laser beam $L_c$ is formed on the surface of the thermal recording medium 1 as a form in which substantially circular beam profiles $Pf_1$, $Pf_3$, and $Pf_4$ of the single mode laser beams $L_1$, $L_3$, and $L_4$ are superposed on an oblong beam profile $Pf_2$ of the multimode laser beam $L_2$ as shown in FIG. 20. The oblong beam profile $Pf_2$ of the multimode laser beam $L_2$ has an oblong shape in the main scanning directions $Sm_1$ and $Sm_2$ on the thermal recording medium 1.

As described above, according to the fifteenth embodiment, all of the multimode semiconductor laser 3, the single mode semiconductor lasers 40 and 41, the collimator lenses 44 and 46, the dichroic prisms 45 and 47, and the collimator lens 48 are arranged so as to allow them to be opposed to the single mode semiconductor laser 2 through the polarization beam splitter 43. As a result of this too, it is needless that the same advantage as the seventh embodiment can be obtained.

Incidentally, the present invention is not limited to the above-mentioned embodiments as they are, and may be modified in the following manner.

Further, the present invention is not limited to the above-mentioned embodiments as they are, and the constituent elements may be modified to be concretized in the implementation stage within the scope not deviating from the gist of the invention. Further, by appropriately combining a plurality of constituent elements disclosed in the embodiments described above, various inventions can be formed. For example, some of the constituent elements may be deleted from the entire constituent elements disclosed in the embodiments. Further, constituent elements of different embodiments may be appropriately combined.

Figure 30:
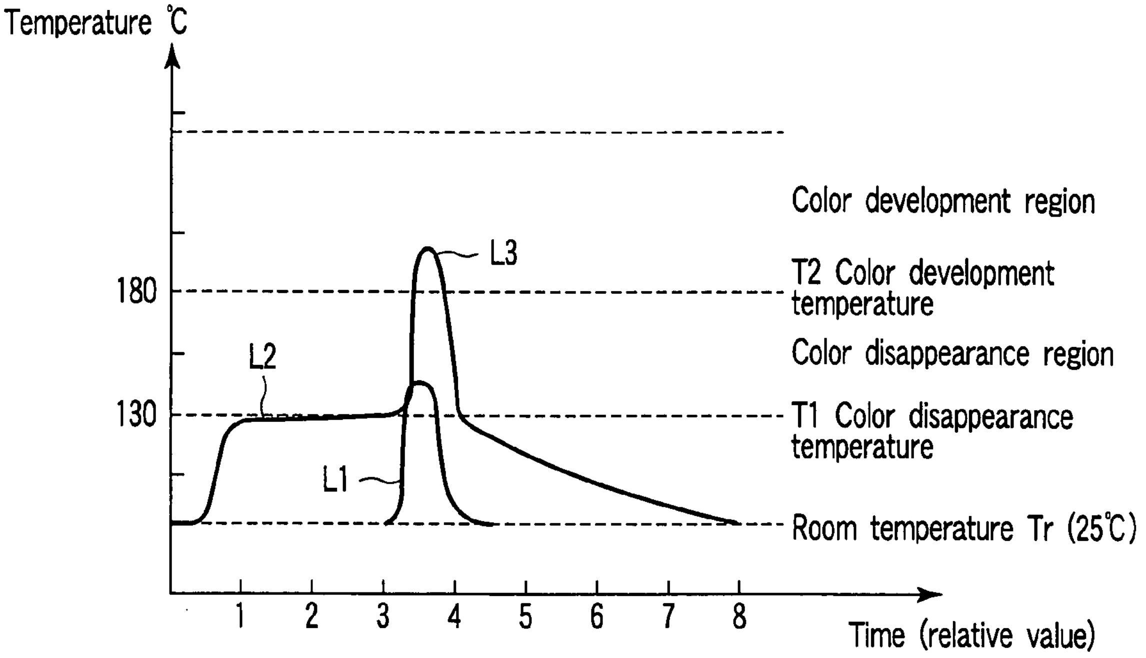
FIG. 30 is a graph showing another relationship between a medium temperature and color development/color disappearance obtained when the thermal recording medium is irradiated with the single mode laser beam and the multimode laser beam of the contactless optical writing apparatus of the present invention.

For example, in the first embodiment described previously, the relationship between the medium temperature and the color development/color disappearance obtained when the thermal recording medium 1 is irradiated with the single mode laser beam $L_1$ and the combined laser beam $L_2$ may be set as follows. FIG. 30 shows a relationship between the medium temperature and the color development/color disappearance obtained when the thermal recording medium 1 is irradiated with the single mode laser beam $L_1$ and the multimode laser beam $L_2$. The single mode laser beam $L_1$ singly has power and a beam diameter capable of heating the thermal recording medium 1 up to a temperature in the color disappearance region by irradiating the thermal recording medium 1 therewith. As a result, the temperature rise obtained when the thermal recording medium 1 is irradiated singly with the single mode laser beam $L_1$ is equal to or higher than the color disappearance temperature $T_1$ and equal to or lower than the color development temperature $T_2$.

On the other hand, the multimode laser beam $L_2$ singly has power and a beam diameter capable of heating the thermal recording medium 1 up to a temperature equal to or lower than the color disappearance temperature $T_1$ by irradiating the thermal recording medium 1 therewith. As a result, the temperature rise obtained when the thermal recording medium 1 is irradiated singly with the multimode laser beam $L_2$ is equal to or lower than the color disappearance temperature $T_1$.

Accordingly, when the thermal recording medium 1 is irradiated with the combined laser beam $L_3$ obtained by combining the single mode laser beam $L_1$ and the multimode laser beam $L_2$ with each other, the thermal recording medium 1 is heated up to a temperature equal to or higher than the color development temperature $T_2$. As a result, it becomes possible to record information such as an image on the thermal recording medium 1.

In the third and fourth embodiment described previously, the two single mode semiconductor lasers 2*a* and 2*b* are provided, and the two multimode semiconductor lasers 3*a* and 3*b* are provided. However, the present invention is not limited thereto. Needless to say, two or more single mode semiconductor lasers 2 and multimode semiconductor lasers 3 may be provided.

A polygon mirror 10 is used as the deflection scanning mechanism 7. A galvano-mirror is used as the deflection scanning mechanism 20. However, the present invention is not limited thereto. Other deflection mechanisms may be used as the deflection scanning mechanism 7 or 20.

For example, the single mode semiconductor lasers 40, 40*a*, 41, 41*a*, and 50-1 to 50-n are of the single mode. The present invention is not limited thereto. They may be replaced with multimode semiconductor lasers. In this case, for example, in FIG. 18, the polarization beam splitter 43 reflects or transmits the single mode laser beam $L_1$ output from the single mode semiconductor laser 2, and transmits or reflects the superposed laser beam $L_b$ output from the dichroic prism 45, whereby the single mode laser beam $L_1$ is superposed on the superposed laser beam $L_b$, and a combined laser beam is formed. The scanning lens 8 forms an image of the combined laser beam $L_c$ supplied from the deflection scanning mechanism 20 on the thermal recording medium 1, whereby the beam profiles of the superposed laser beam $L_b$ are formed into an oblong shape or an upright shape in which a beam profile of the single mode laser beam $L_1$ is formed in the beam profile.

Further, the dichroic prisms 47, 45, 45*a*, 52-1 to 52-n, 82, and 84 may be replaced with dichroic mirrors.

In FIGS. 24 to 27, two semiconductor laser beam output systems 60 and 61, 70 and 71, 80 and 81, and 91 and 92 are provided, respectively. However, two or more semiconductor laser beam output systems may be provided.

In FIGS. 26 and 27, two single mode semiconductor lasers 2 and 2*a*, 40 and 40*a*, and 41 and 41*a*, and two multimode semiconductor lasers 3 and 3*a* are provided. However, two or more single mode semiconductor lasers and two or more multimode semiconductor lasers may be provided.

In each of the above-mentioned embodiments, the collimator lenses 4, 9, 42, 42*a*, 44, 44*a*, 48, 48*a*, and 51-1 to 51-n condense laser beams such as a single mode laser beam $L_1$ and multimode laser beam $L_2$ into laser beams in a substantially parallel state. However, the present invention is not limited thereto. The collimator lenses 4, 9, 42, 42*a*, 44, 44*a*, 48, 48*a*, and 51-1 to 51-n may condense the laser beams to form the images of the laser beams on the thermal recording medium 1. In this case, the scanning lens 8 may not be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A contactless optical writing apparatus comprising:

a first semiconductor laser for outputting a first semiconductor laser beam;

a first condensing lens for condensing the first semiconductor laser beam;

a second semiconductor laser for outputting a second semiconductor laser beam;

a second condensing lens for condensing the second semiconductor laser beam;

a laser beam combining element for combining the first semiconductor laser beam condensed by the first condensing lens and the second semiconductor laser beam condensed by the second condensing lens with each other, and outputting the combined semiconductor laser beam; and a deflection scanning mechanism for scanning a surface of a thermal recording medium which when heated to a color development temperature higher than the normal temperature, develops a color, and when heated to a color disappearance temperature lower than the color development temperature while the thermal recording medium is kept in a color development state at the normal temperature, disappears the color by using the combined semiconductor laser beam output from the laser beam combining element, wherein the first semiconductor laser has a junction plane of active layers for outputting the first semiconductor laser beam, the second semiconductor laser has a junction plane of active layers for outputting the second semiconductor laser beam, a junction plane direction of the first semiconductor laser and a junction plane direction of the second semiconductor laser are perpendicular to or parallel to a direction of the scanning performed by the deflection scanning mechanism by using the combined semiconductor laser beam, the first semiconductor laser beam has one of output power capable of heating the thermal recording medium to a temperature equal to or lower than the color disappearance temperature by irradiating the thermal recording medium therewith and output power capable of heating the thermal recording medium up to the color disappearance temperature, the second semiconductor laser beam has one of output power capable of heating the thermal recording medium up to the color disappearance temperature by irradiating the thermal recording medium therewith and output power capable of heating the thermal recording medium to a temperature equal to or lower than the color disappearance temperature, and the apparatus has output power capable of heating the thermal recording medium up to the color development temperature by combining the first semiconductor laser beam and the second semiconductor laser beam into a combined semiconductor laser beam and irradiating the thermal recording medium with the combined semiconductor laser beam.

2. The contactless optical writing apparatus according to claim 1, wherein the laser beam combining element includes a polarization beam splitter for transmitting or reflecting the first semiconductor laser beam output from the first semiconductor laser and the second semiconductor laser beam output from the second semiconductor laser, combining the first semiconductor laser beam and the second semiconductor laser beam with each other, and outputting the combined semiconductor laser beam.

3. The contactless optical writing apparatus according to claim 2, wherein the first semiconductor laser is a single mode semiconductor laser, the second semiconductor laser is a multimode semiconductor laser, and the polarization beam splitter transmits or reflects the first semiconductor laser beam output from the first semiconductor laser, and the second semiconductor laser beam output from the second semiconductor laser, and the first semiconductor laser beam and the second semiconductor laser beam are combined with each other by superposing a beam profile of the first semiconductor laser beam on a beam profile of the second semiconductor laser beam having an oblong shape or an upright shape with respect to a scanning direction of the deflection scanning mechanism.

4. The contactless optical writing apparatus according to claim 2, wherein the first semiconductor laser is a single mode semiconductor laser, the second semiconductor laser is a multimode semiconductor laser, the first semiconductor laser is provided in such a manner that the junction plane direction thereof is perpendicular to the scanning direction of the combined semiconductor laser beam used by the deflection scanning mechanism for the scanning, the second semiconductor laser is provided in such a manner that the junction plane direction thereof is parallel to the scanning direction of the combined semiconductor laser beam used by the deflection scanning mechanism for the scanning, the polarization beam splitter reflects the first semiconductor laser beam, and transmits the second semiconductor laser beam, whereby the first semiconductor laser beam and the second semiconductor laser beam are combined with each other by superposing a beam profile of the first semiconductor laser beam on a beam profile of the second semiconductor laser beam having an oblong shape with respect to the scanning direction of the deflection scanning mechanism, and the deflection scanning mechanism performs the scanning by using the combined semiconductor laser beam output from the polarization beam splitter in the same direction as a polarization direction of the second semiconductor laser beam.

5. The contactless optical writing apparatus according to claim 1, further comprising:

a beam spot position varying mechanism for varying a combining position of a beam profile of the first semiconductor laser beam in an oblong beam profile formed by a scanning lens on the thermal recording medium.

6. The contactless optical writing apparatus according to claim 1, wherein the deflection scanning mechanism first irradiates the surface of the thermal recording medium singly with the second semiconductor laser beam included in the combined semiconductor laser beam, then irradiates the surface of the thermal recording medium with superposition of the first and the second semiconductor laser beams included in the combined semiconductor laser beam, then terminates the irradiation of the first semiconductor laser beam, and then terminates the irradiation of the second semiconductor laser beam by scanning the surface of the thermal recording medium by using the combined semiconductor laser beam through a scanning lens.

7. The contactless optical writing apparatus according to claim 1, further comprising:

at least one third semiconductor laser for outputting a third semiconductor laser beam having a wavelength different from those of the first and the second semiconductor laser beams, wherein the first semiconductor laser outputs the first semiconductor laser beam having the same wavelength as that of the second semiconductor laser beam output from the second semiconductor laser, the third semiconductor laser has a junction plane of active layers for outputting the third semiconductor laser beam, the junction plane direction in the first semiconductor laser, the junction plane direction in the second semiconductor laser, and the junction plane direction in the third semiconductor laser are parallel to or perpendicular to the scanning direction of the combined semiconductor laser beam used by the deflection scanning mechanism, the laser beam combining element includes a color combining element, and a polarization beam splitter, the color combining element superposes the third semiconductor laser beam output from the third semiconductor laser on the second semiconductor laser beam output from the second semiconductor laser, and outputs the superposed semiconductor laser, and the polarization beam splitter reflects or transmits the first semiconductor having the same wavelength as that of the second semiconductor laser beam, and the semiconductor laser beam output from the color combining element, and combines the first semiconductor laser beam output from the first semiconductor laser and the semiconductor laser beam output from the color combining element with each other.

8. The contactless optical writing apparatus according to claim 7, wherein the color combining element includes at least one dichroic prism or a dichroic mirror.

9. The contactless optical writing apparatus according to claim 8, wherein the dichroic prism or the dichroic mirror has high reflectance with respect to the wavelength of the third semiconductor laser beam output from the third semiconductor laser, transmits the second semiconductor laser beam output from the second semiconductor laser, and reflects the third semiconductor laser beam output from the third semiconductor laser, thereby superposing the third semiconductor laser beam on the second semiconductor laser beam, and outputting the resultant semiconductor laser beam.

10. The contactless optical writing apparatus according to claim 9, wherein a plurality of the third semiconductor lasers are provided, each of the third semiconductor lasers outputs the third semiconductor laser beam having a wavelength different from the wavelengths of the first and the second semiconductor laser beams, and the plural dichroic prisms or dichroic mirrors have high reflectance with respect to one of the wavelengths of the plural third semiconductor laser beams.

11. The contactless optical writing apparatus according to claim 7, wherein the second semiconductor laser is a multimode semiconductor laser, the first semiconductor laser which outputs the first semiconductor laser beam having the same wavelength as that of the second semiconductor laser beam is a single mode semiconductor laser, the third semiconductor laser which outputs the third semiconductor laser beam having a wavelength different from the wavelengths of the first and the second semiconductor laser beams is a single mode semiconductor laser, the color combining element transmits the second semiconductor laser beam output from the second semiconductor laser, reflects the third semiconductor laser beam output from the third semiconductor laser, superposes a beam profile of the third semiconductor laser beam on a beam profile of the second semiconductor laser beam having an oblong shape or an upright shape with respect to the scanning direction of the deflection scanning mechanism, and outputs the resultant semiconductor laser beam, and the polarization beam splitter reflects or transmits the first semiconductor laser beam and the semiconductor laser beam output from the color combining element, superposes a beam profile of the first semiconductor laser beam on a beam profile of the second semiconductor laser beam in the semiconductor laser beam output from the color combining element, the beam profile of the second semiconductor laser beam having an oblong shape or an upright shape, thereby combining the first semiconductor laser beam and the second semiconductor laser beam with each other.

12. The contactless optical writing apparatus according to claim 7, wherein a plurality of semiconductor laser beam output systems each of which is constituted of the first semiconductor laser, the second semiconductor laser, the third semiconductor laser, the color combining element, and the polarization beam splitter, and the plural semiconductor laser beam output systems output a plurality of the combined semiconductor laser beams in parallel with each other.

13. The contactless optical writing apparatus according to claim 12, wherein the plural semiconductor laser beam output systems output the combined semiconductor laser beams in parallel with each other in the same direction as the scanning direction of the deflection scanning mechanism.

14. The contactless optical writing apparatus according to claim 7, wherein the first semiconductor lasers, the second semiconductor lasers, and the third semiconductor lasers are provided in such a manner that at least two of these semiconductor lasers are juxtaposed in close proximity to each other, the color combining element includes at least one dichroic prism or a dichroic mirror, the dichroic prisms or the dichroic mirrors transmit or reflect the second semiconductor laser beams output from the second semiconductor lasers and the third semiconductor laser beams output from the third semiconductor lasers on different optical axes, thereby superposing each of the third semiconductor laser beams on each of the second semiconductor laser beams, and the polarization beam splitters reflect or transmit the first semiconductor laser beams output from the first semiconductor lasers and the semiconductor laser beams output from the color combining elements on different optical axes, thereby combining the first to third semiconductor laser beams with each other and outputting the resultant semiconductor laser beams on the different optical axes.

* * * * *